United States Patent [19]

Lindsay et al.

[11] Patent Number: 6,085,076
[45] Date of Patent: Jul. 4, 2000

[54] ANTENNA DIVERSITY FOR WIRELESS COMMUNICATION SYSTEM

[75] Inventors: Charles L. Lindsay, Monument; Kenneth S. Moore, Colorado Springs; Ryan N. Jensen, Monument, all of Colo.

[73] Assignee: Omnipoint Corporation, Bethesda, Md.

[21] Appl. No.: 08/826,773

[22] Filed: Apr. 7, 1997

[51] Int. Cl.[7] ................................................. H04B 7/00
[52] U.S. Cl. .................. 455/277.1; 455/133; 455/137
[58] Field of Search ............................. 455/277.1, 277.2, 455/133, 137, 134, 135, 278.1; 342/367

[56] References Cited

U.S. PATENT DOCUMENTS

| | | | |
|---|---|---|---|
| 4,797,947 | 1/1989 | Labedz | 455/33 |
| 4,829,554 | 5/1989 | Barnes et al. | 379/58 |
| 5,097,484 | 3/1992 | Akaiwa | 375/40 |
| 5,200,956 | 4/1993 | Pudney et al. | 370/95.1 |
| 5,202,903 | 4/1993 | Okanoue | 375/100 |
| 5,212,689 | 5/1993 | Eriksson | 370/106 |
| 5,241,690 | 8/1993 | Larsson et al. | 455/54.1 |
| 5,280,472 | 1/1994 | Gilhousen et al. | 370/18 |
| 5,299,198 | 3/1994 | Kay et al. | 370/95.3 |
| 5,303,287 | 4/1994 | Laborde | 379/59 |
| 5,363,373 | 11/1994 | Nakahara et al. | 370/95.1 |
| 5,390,342 | 2/1995 | Takayama et al. | 455/134 |
| 5,392,459 | 2/1995 | Baba et al. | 455/69 |
| 5,420,851 | 5/1995 | Seshadri et al. | 370/29 |
| 5,444,696 | 8/1995 | Petranovich | 370/17 |
| 5,446,727 | 8/1995 | Bruckert et al. | 370/18 |
| 5,446,922 | 8/1995 | Siwiak et al. | 455/277.2 |
| 5,455,822 | 10/1995 | Dixon et al. | 370/18 |
| 5,465,271 | 11/1995 | Hladik et al. | 375/267 |
| 5,481,533 | 1/1996 | Honig et al. | 370/18 |
| 5,483,676 | 1/1996 | Mahany et al. | 455/67.4 |
| 5,499,397 | 3/1996 | Wadin et al. | 455/277.1 |
| 5,515,378 | 5/1996 | Roy, III et al. | 370/95.1 |
| 5,530,926 | 6/1996 | Rozanski | 455/277.2 |
| 5,548,837 | 8/1996 | Hess et al. | 455/278.1 |
| 5,561,673 | 10/1996 | Takai et al. | 455/277.2 |
| 5,610,940 | 3/1997 | Durrant et al. | 375/208 |
| 5,648,992 | 7/1997 | Wright et al. | 375/347 |
| 5,671,219 | 9/1997 | Jensen et al. | 370/280 |
| 5,694,417 | 12/1997 | Andren et al. | 375/206 |
| 5,859,880 | 1/1999 | Ljungberg et al. | 375/349 |
| 5,870,681 | 2/1999 | Myer | 455/582 |
| 5,883,921 | 3/1999 | Andren et al. | 375/208 |

OTHER PUBLICATIONS

Nanda, Sanjiv et al., "Variable Partition Duplexing For Wireless Communications," IEEE, GlobeCom '91:1147–1153, 1991.

Radio Equipment and Systems (RES); Digital European Cordless Telecommunications (DECT) Common interface Part 9: Public access profile, ETS 300 175–9, Oct. 1992.

Primary Examiner—Reinhard J. Eisenzopf
Assistant Examiner—Duc Nguyen
Attorney, Agent, or Firm—Lyon & Lyon LLP

[57] ABSTRACT

A receiver and antenna selection system located at a base station preferably comprises a plurality of radio units, each connected to its own antenna. Each radio unit receives a radio message and independently derives quality metrics based on the reception quality of the radio message, as indicated, for example, by a received signal strength indication, cyclic redundancy check result, preamble correlation magnitude, and other factors. Each radio unit transfers the quality metrics as serial data to an antenna selector. The antenna selector, simultaneously for each radio unit, converts and formats the serial data into individual data words and/or bits corresponding to the quality metrics, then applies the data words and/or bits to an antenna scoring block for determining an antenna score for each antenna. A comparison block compares the antenna scores and selects the best antenna for reception and/or transmission. In a preferred embodiment, the antenna selector weights the importance of each of the received quality metrics, such that certain parameters influence the antenna selection more than other parameters. If no antenna is clearly superior, the antenna selector may rotate the antennas each communication period until a suitable antenna is determined, so that the handset has an opportunity to listen to each of the antennas.

23 Claims, 51 Drawing Sheets

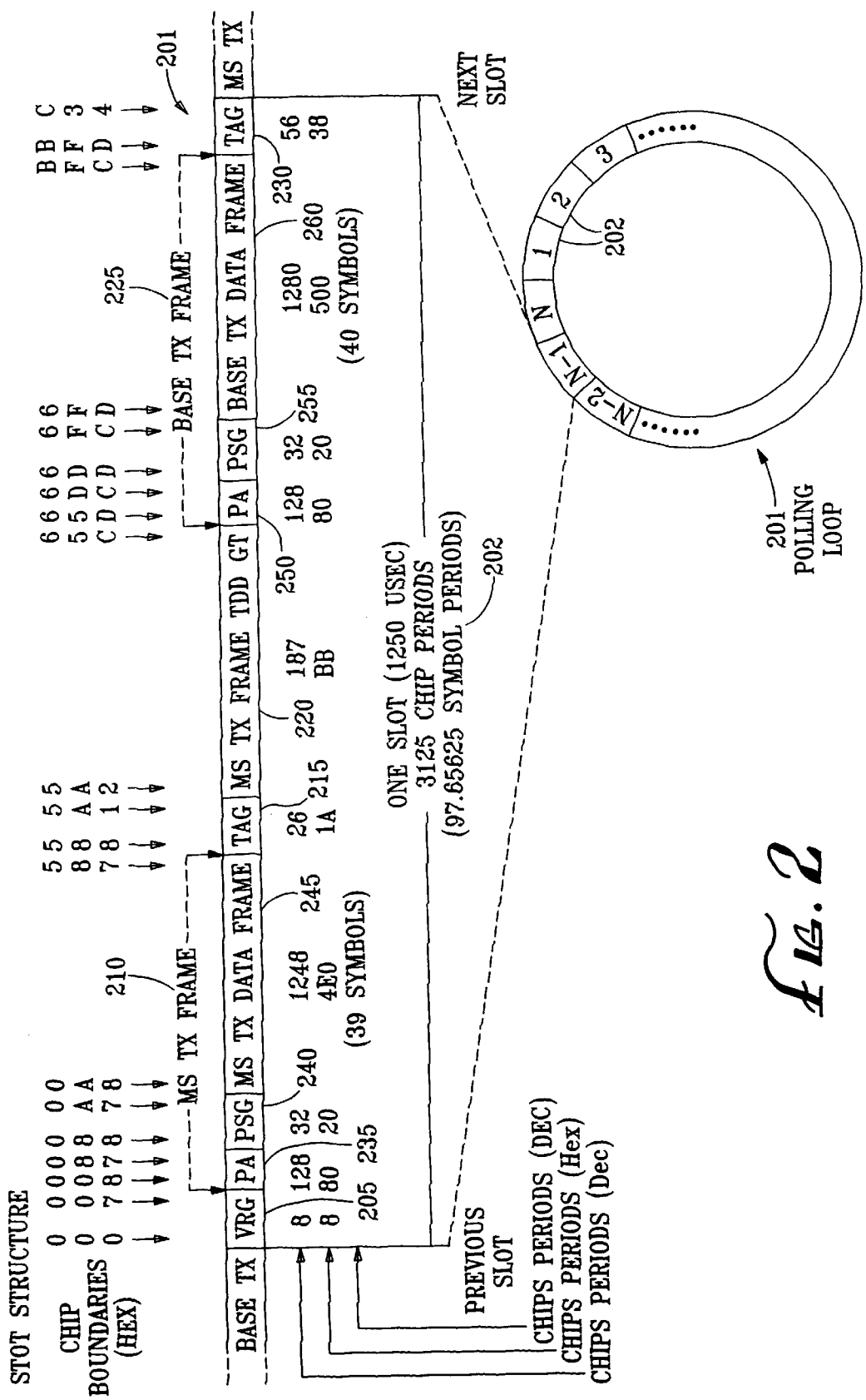

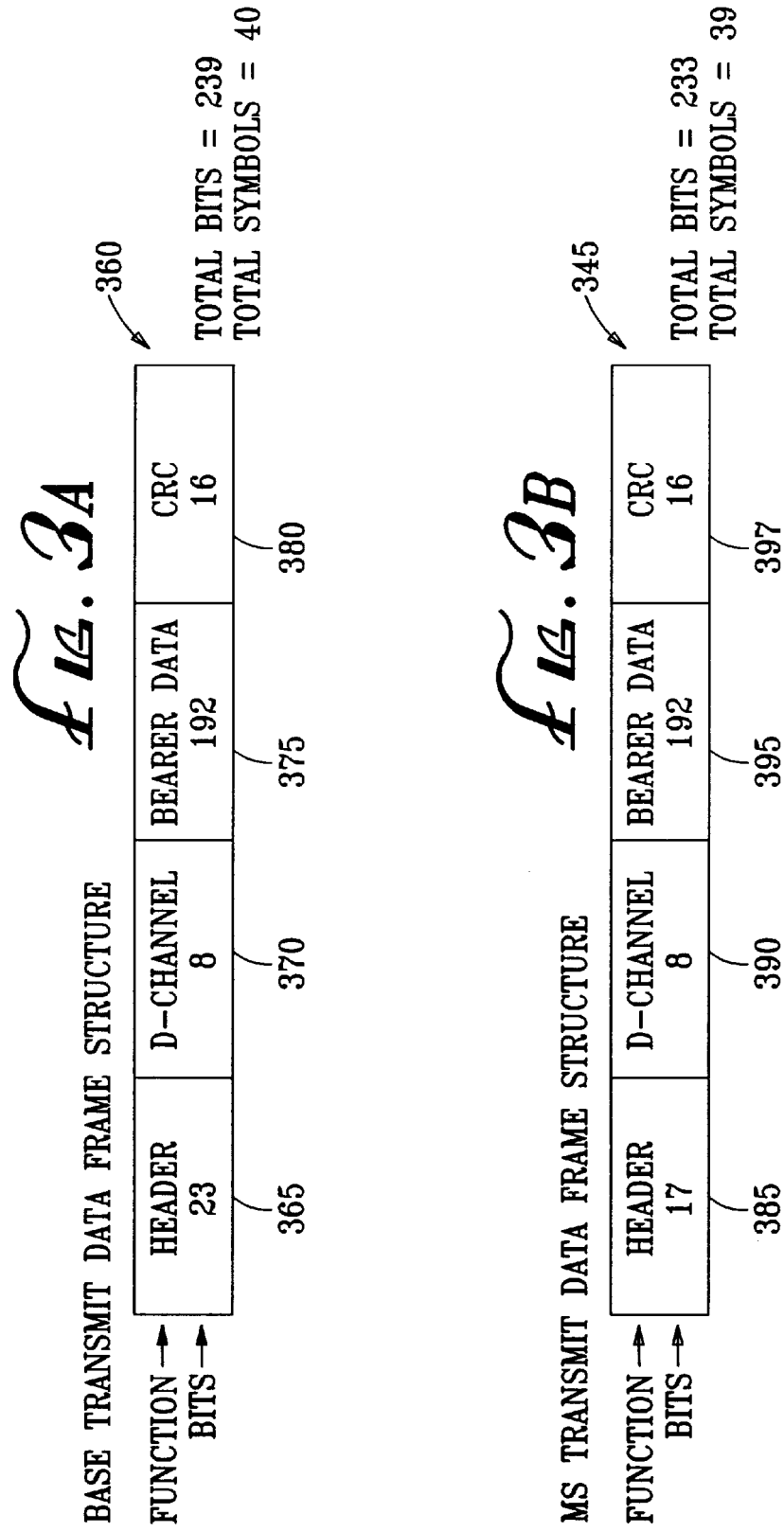

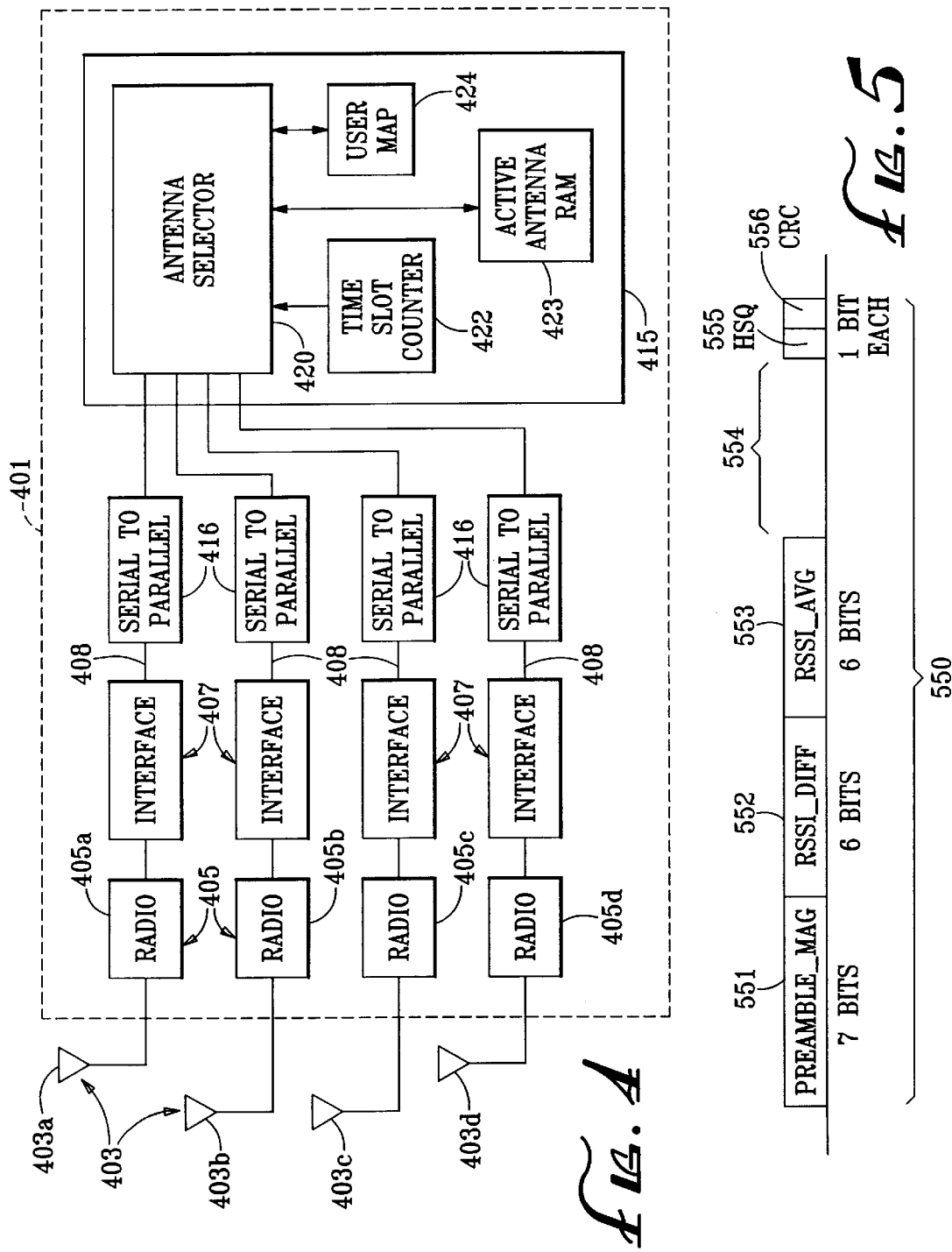

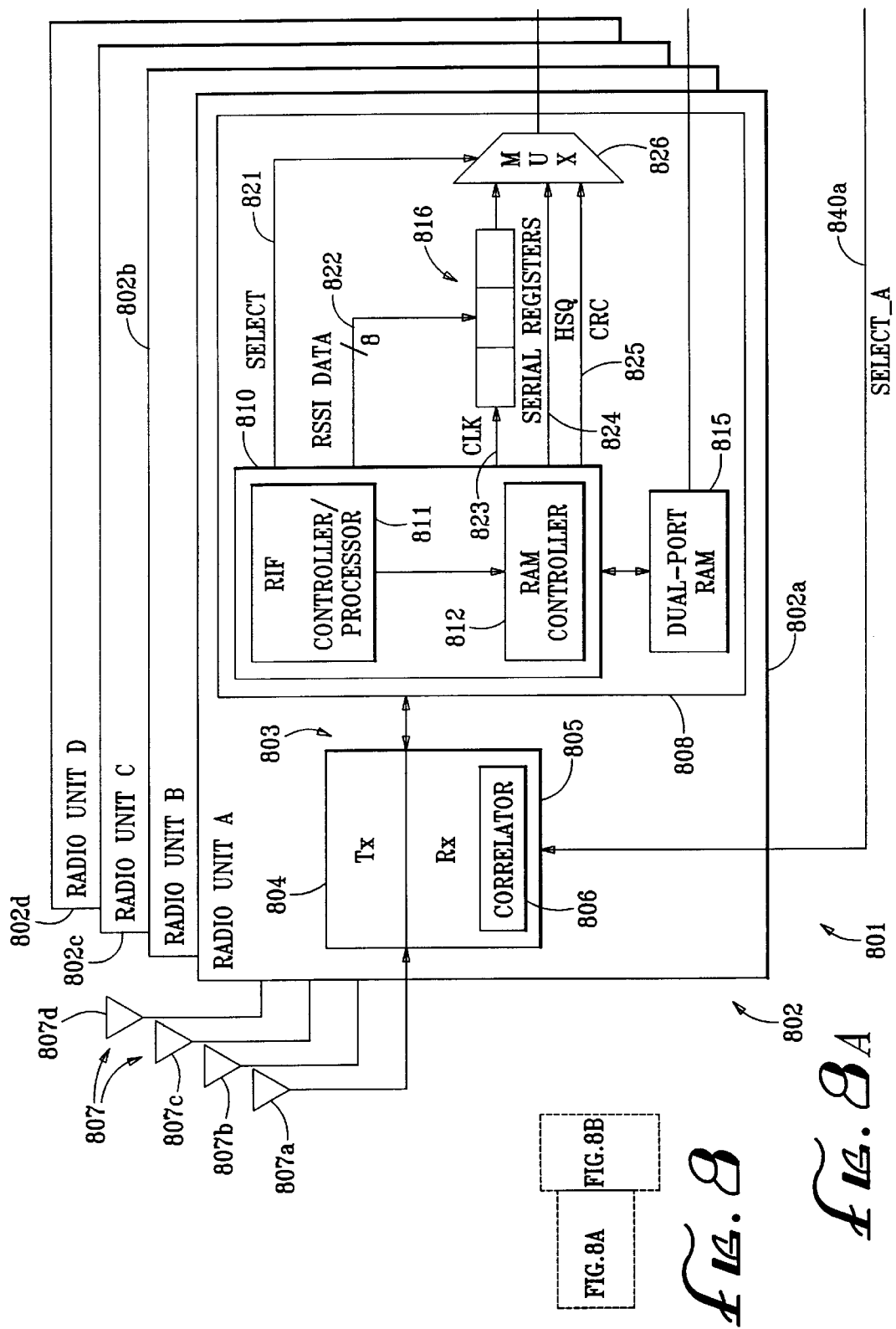

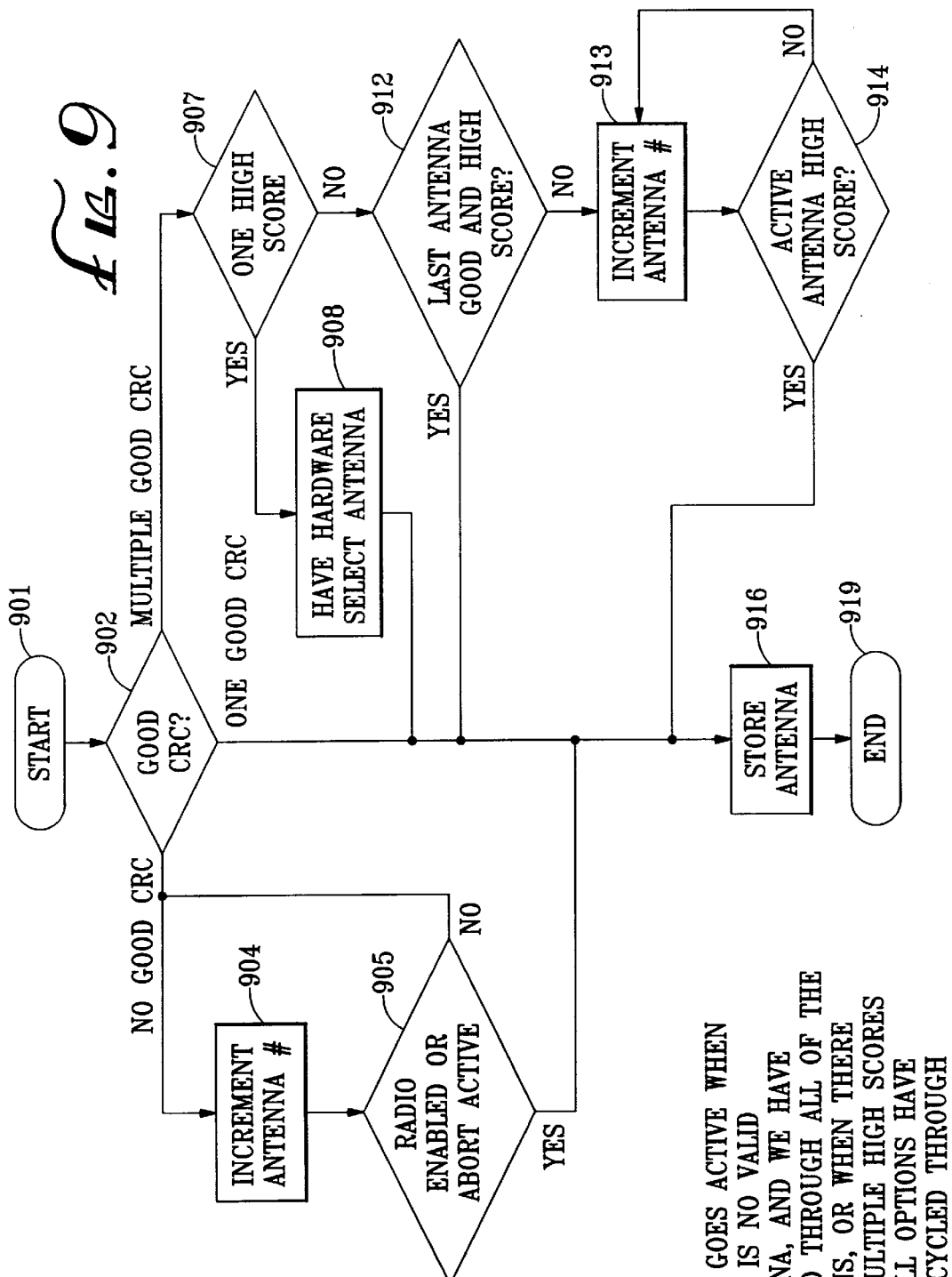

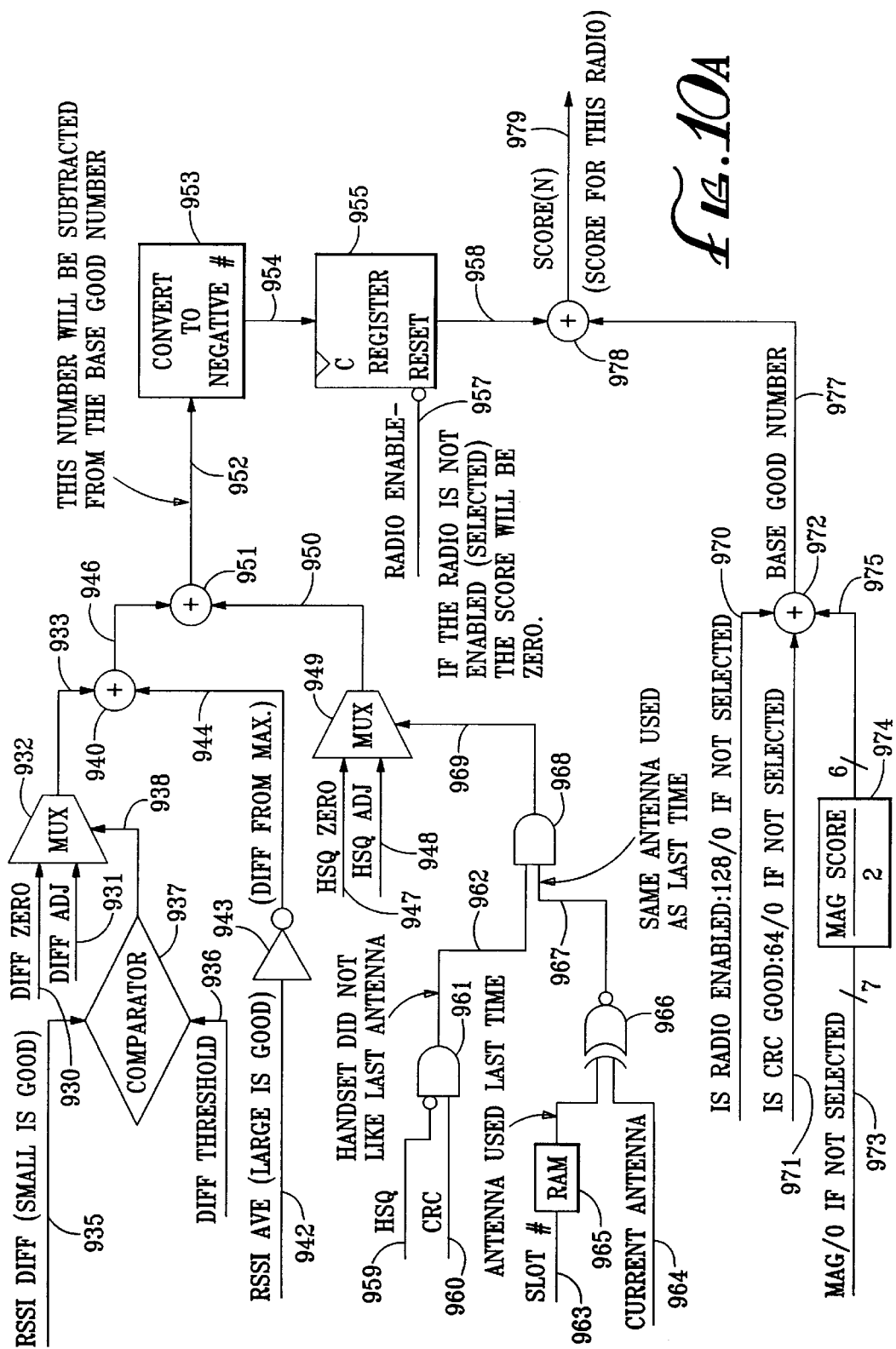

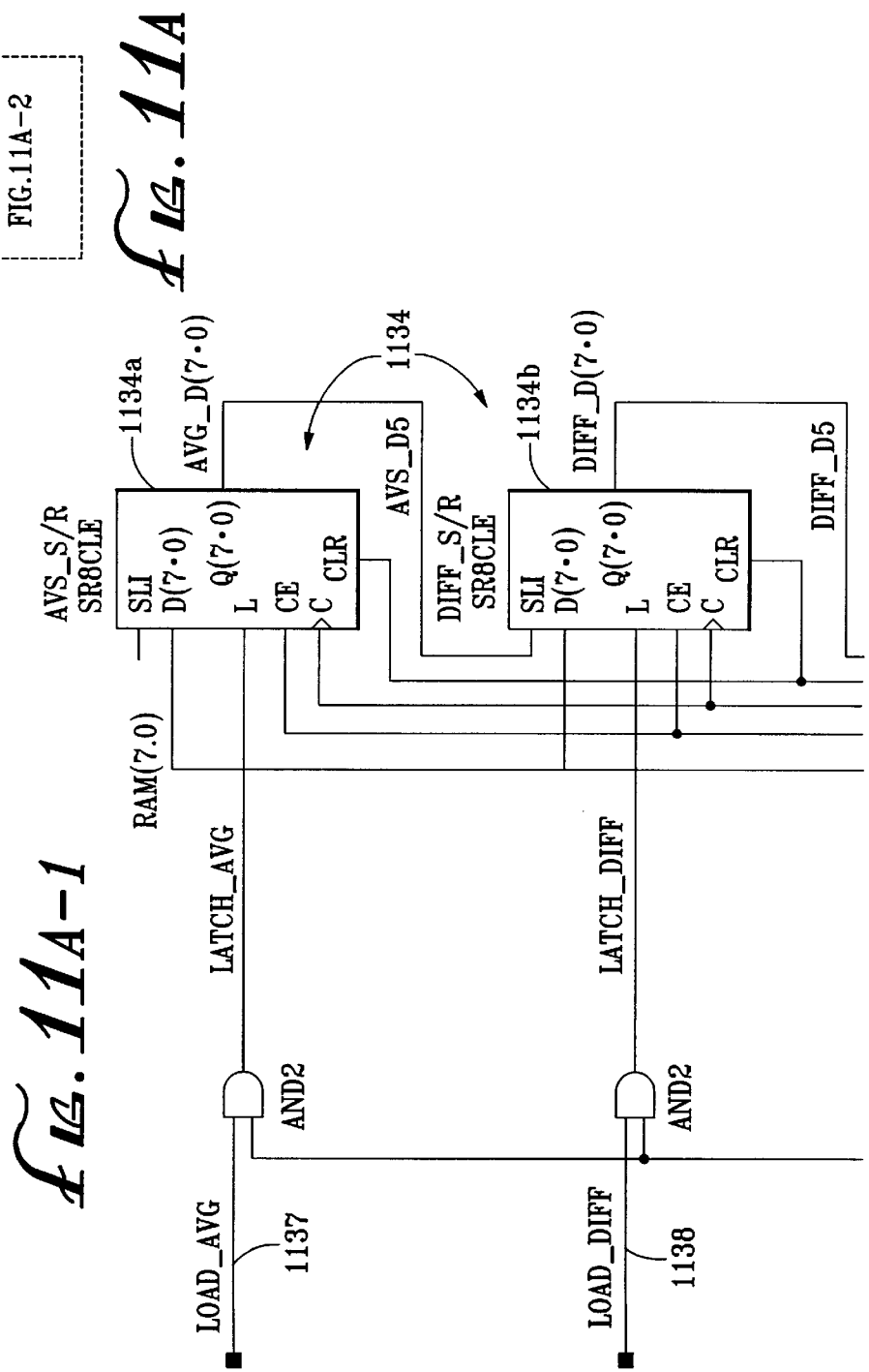

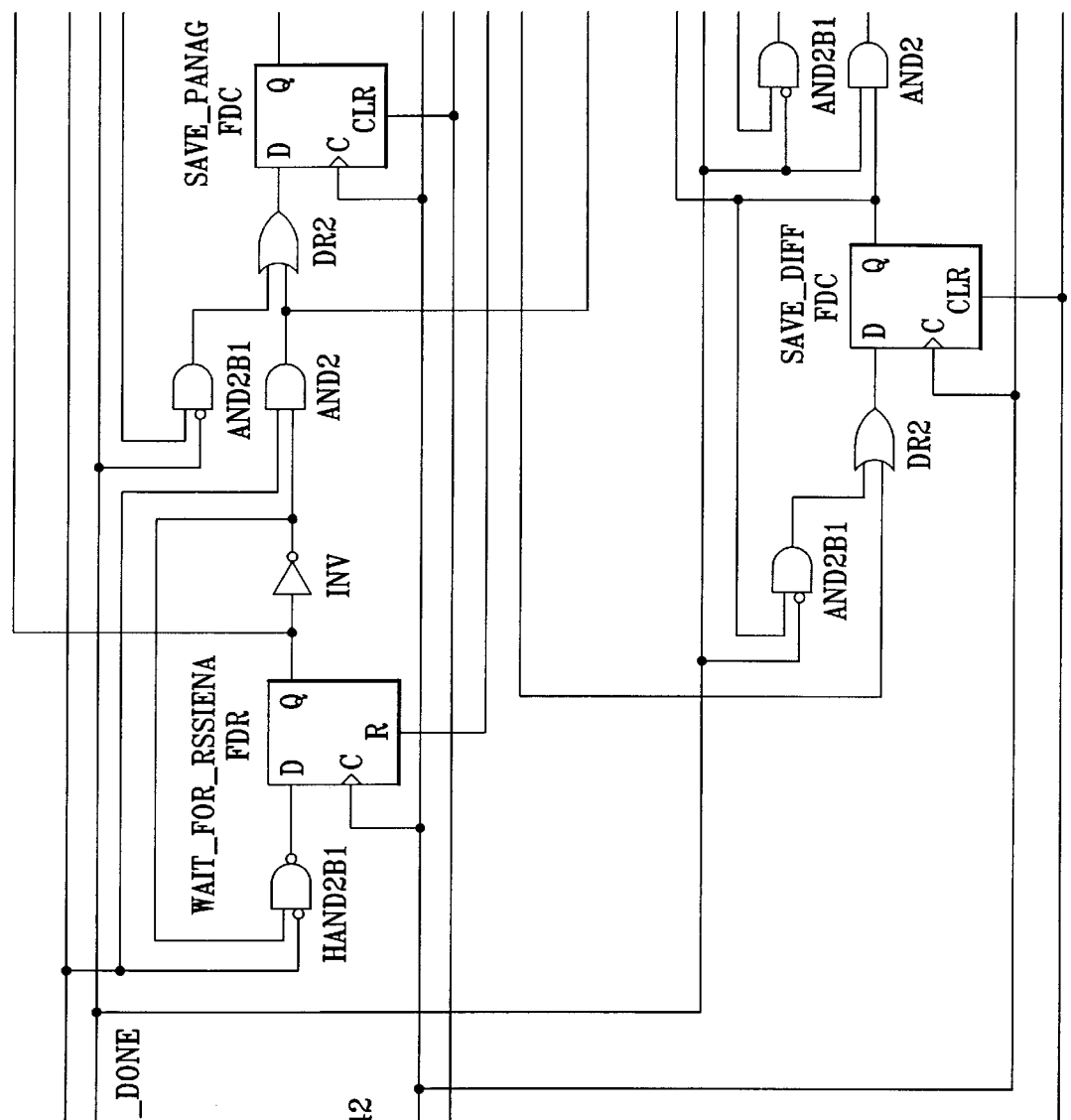

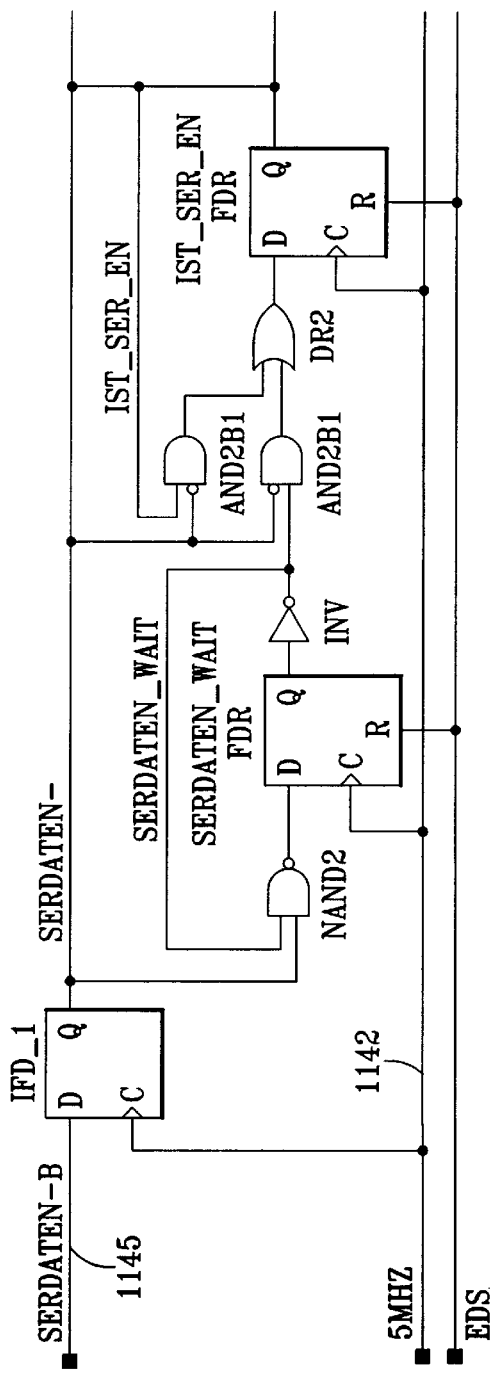

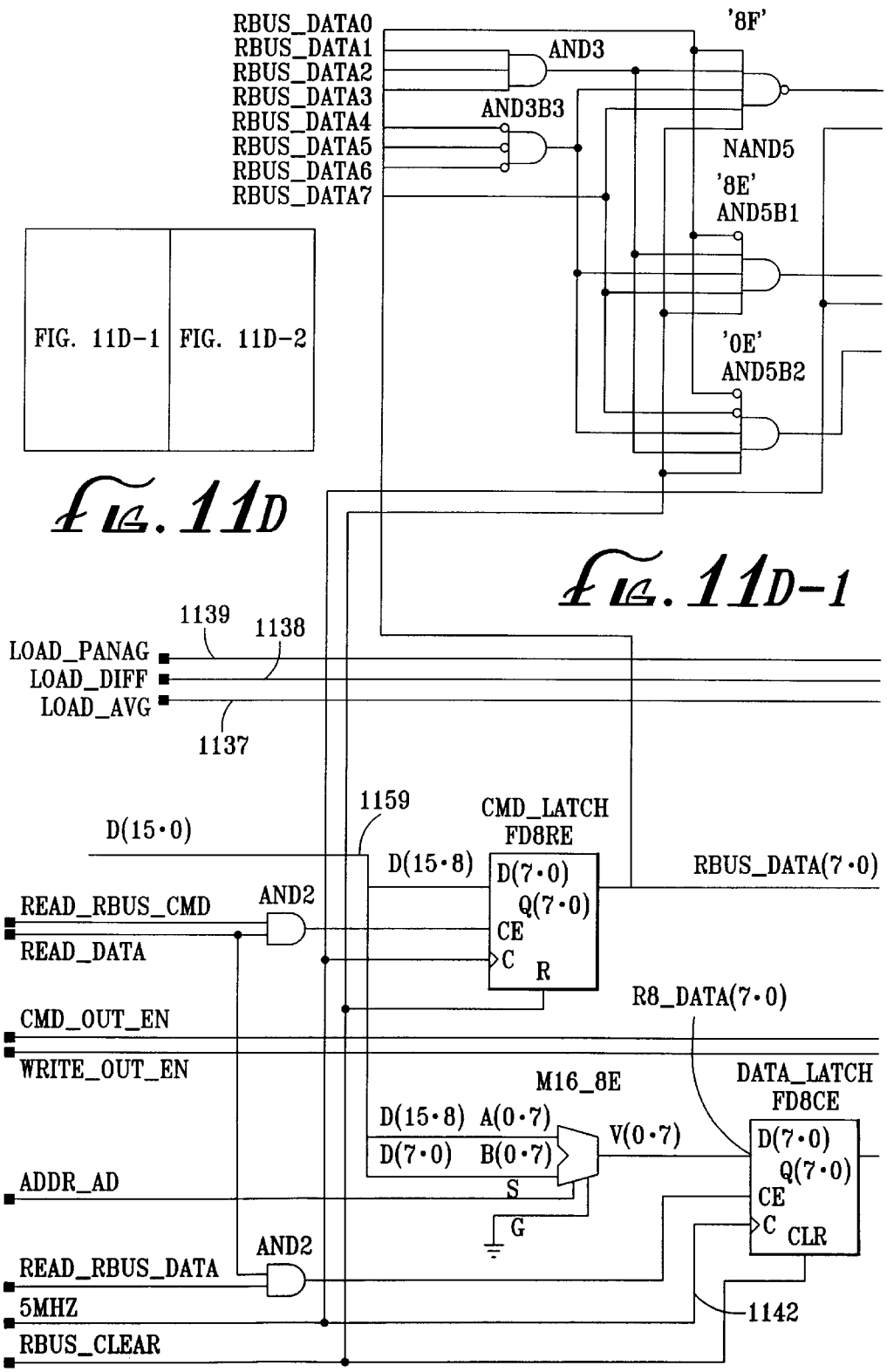

| FIG. 11F-1 | FIG. 11F-2 |

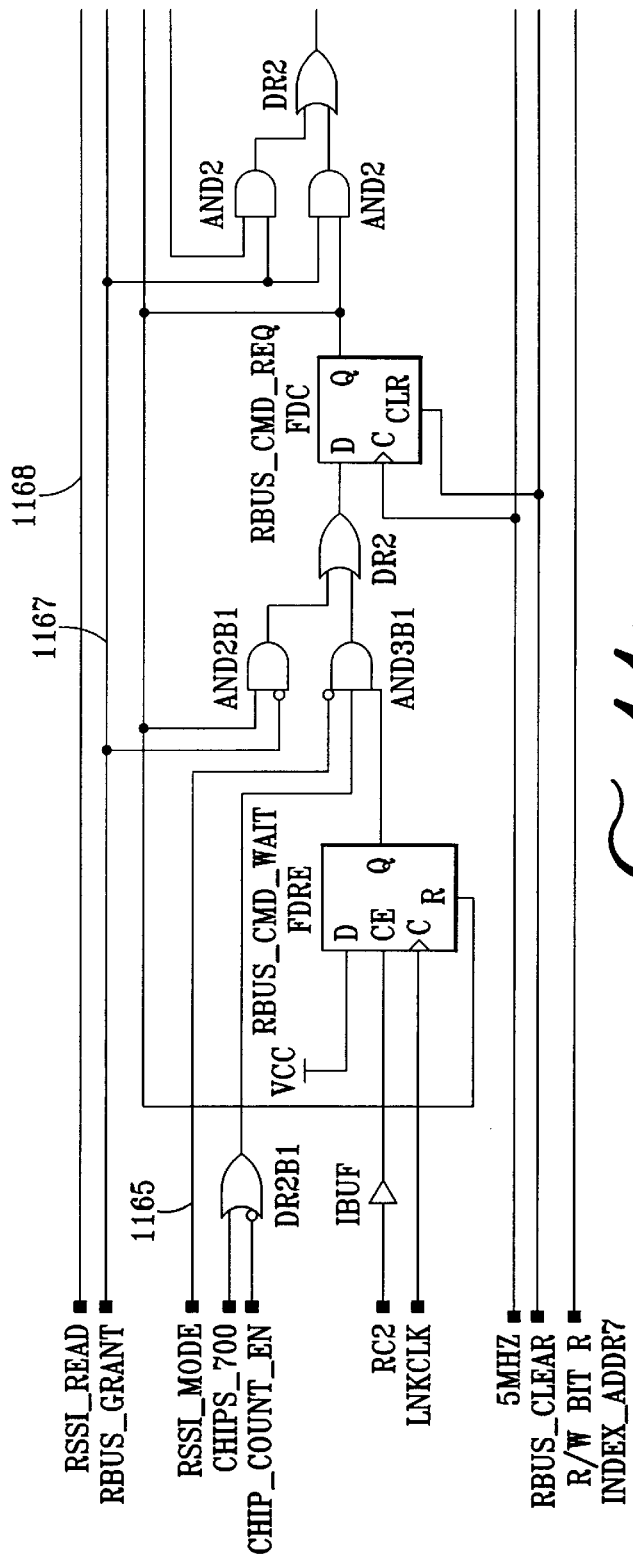

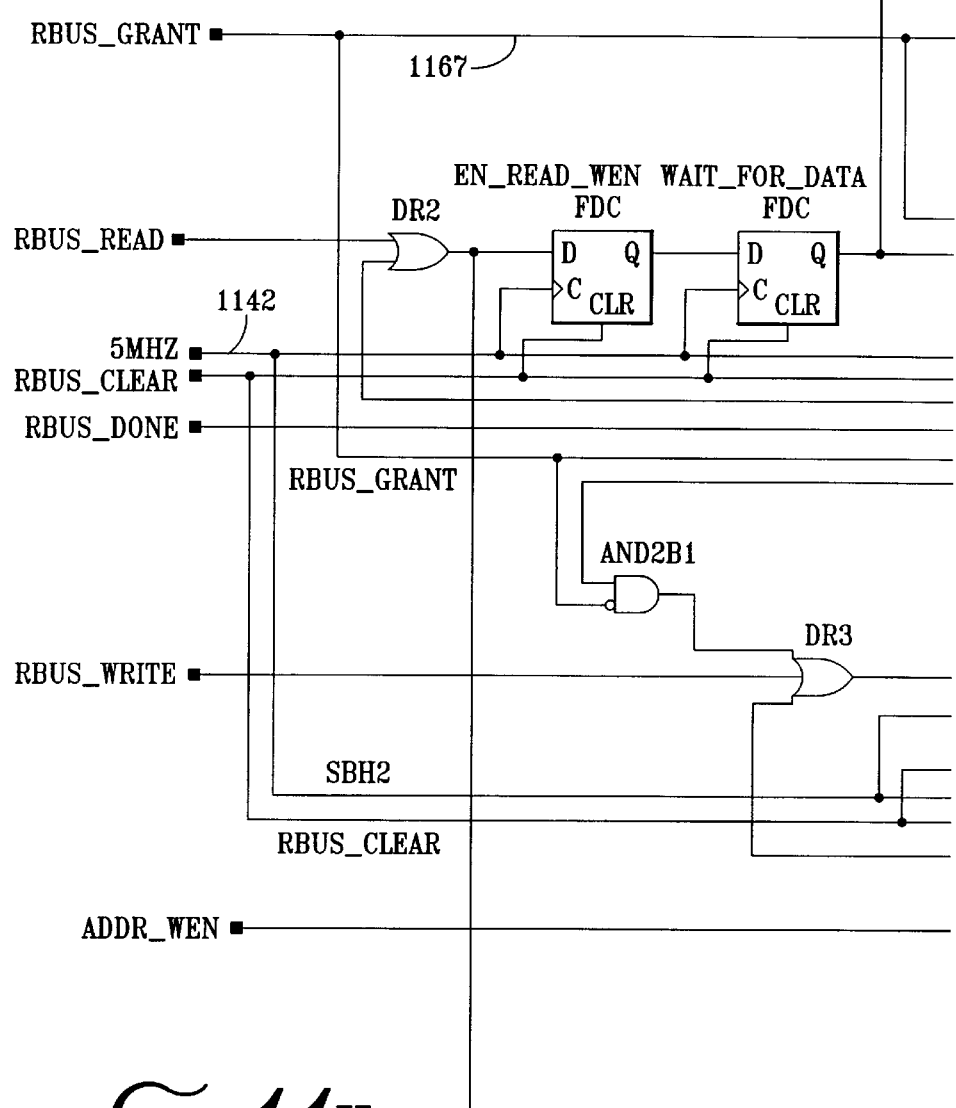

| MAGNITUDE | | | | | | | | | | |
|---|---|---|---|---|---|---|---|---|---|---|
| D | C | B | A | LT2 | GT2 | LT1 | GT1 | LT0 | GT0 | SELECT |
| 0 | 0 | 0 | 0 | 0 | 0 | 0 | 0 | 0 | 0 | INCR LAST |
| 0 | 0 | 0 | 1 | 0 | 1 | X | X | 0 | 1 | USE SEL (A) |
| 0 | 0 | 1 | 0 | 0 | 1 | X | X | 1 | 0 | USE SEL (B) |
| 0 | 0 | 1 | 1 | 0 | 1 | X | X | 0 | 0 | - |
| 0 | 1 | 0 | 0 | 1 | 0 | 0 | 1 | X | X | USE SEL (C) |
| 0 | 1 | 0 | 1 | 0 | 0 | 0 | 1 | 0 | 1 | - |
| 0 | 1 | 1 | 0 | 0 | 0 | 0 | 1 | 1 | 0 | - |
| 0 | 1 | 1 | 1 | 0 | 0 | 0 | 1 | 0 | 0 | - |
| 1 | 0 | 0 | 0 | 1 | 0 | 1 | 0 | X | X | USE SEL (D) |
| 1 | 0 | 0 | 1 | 0 | 0 | 1 | 0 | 0 | 1 | - |
| 1 | 0 | 1 | 0 | 0 | 0 | 1 | 0 | 1 | 0 | - |
| 1 | 0 | 1 | 1 | 0 | 0 | 1 | 0 | 0 | 0 | - |
| 1 | 1 | 0 | 0 | 1 | 0 | 0 | 0 | X | X | - |
| 1 | 1 | 0 | 1 | 0 | 0 | 0 | 0 | 0 | 1 | - |
| 1 | 1 | 1 | 0 | 0 | 0 | 0 | 0 | 1 | 0 | - |
| 1 | 1 | 1 | 1 | 0 | 0 | 0 | 0 | 0 | 0 | - |

* MULTIPLE SCORES EQUAL HIGH SCORE

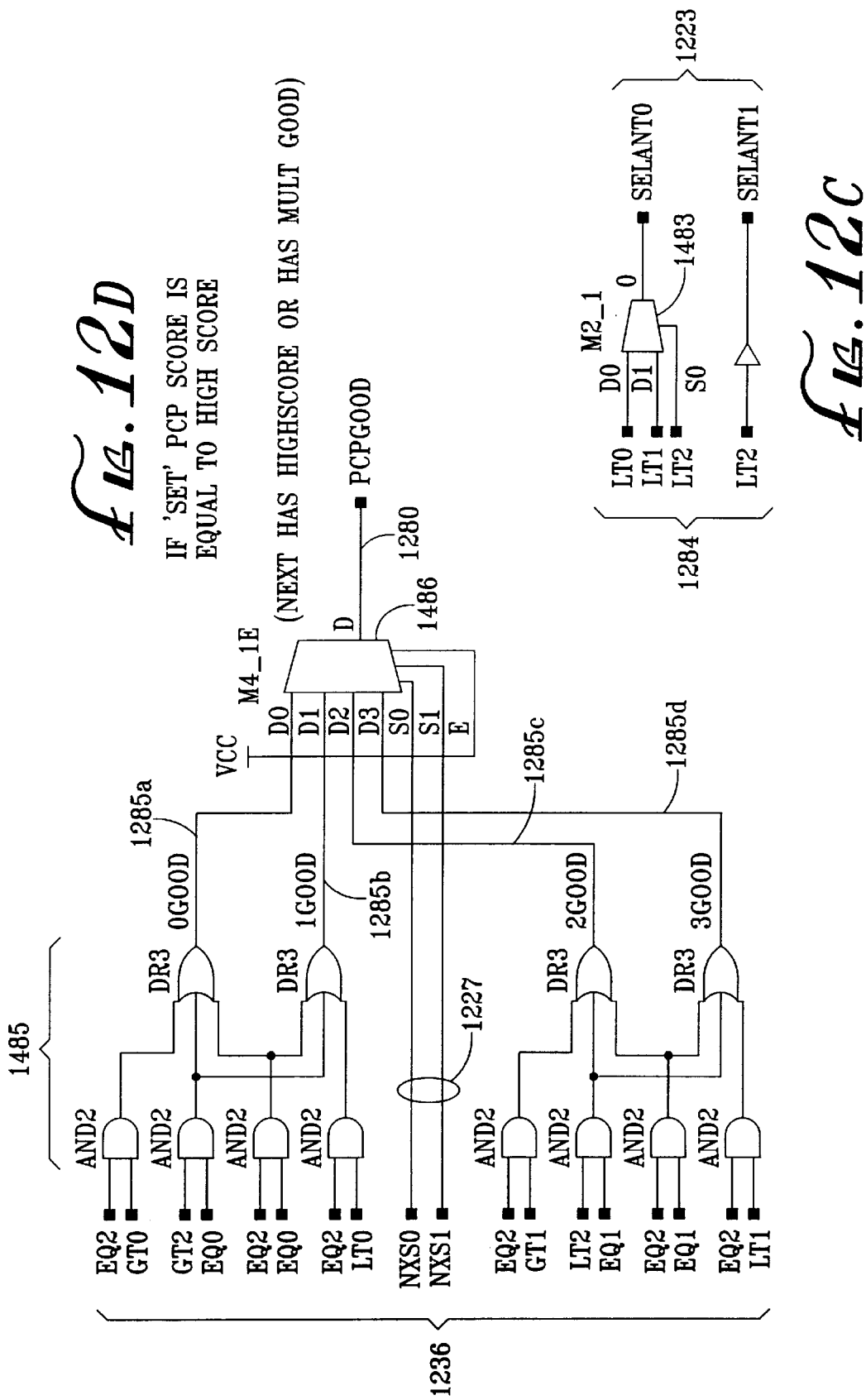

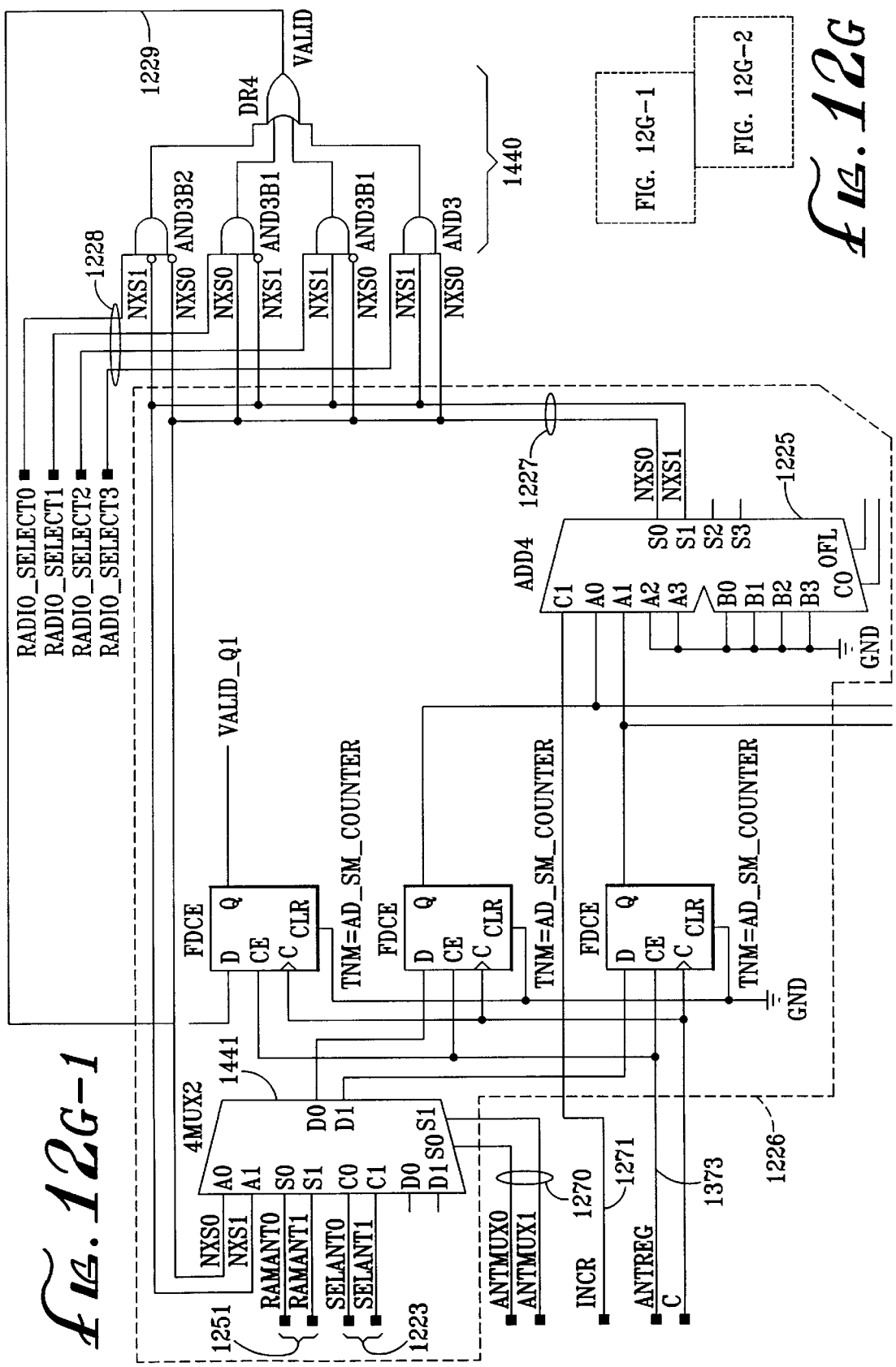

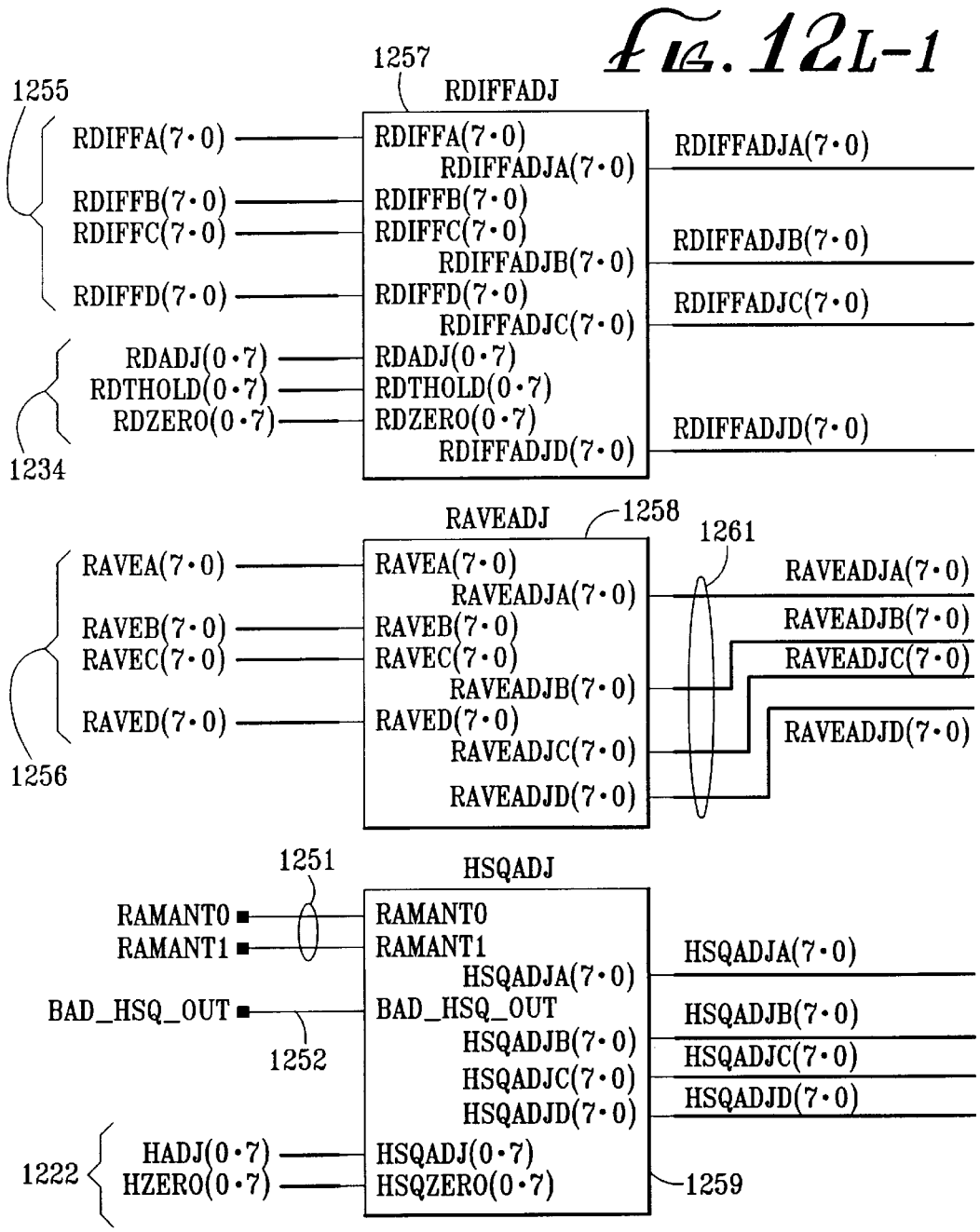

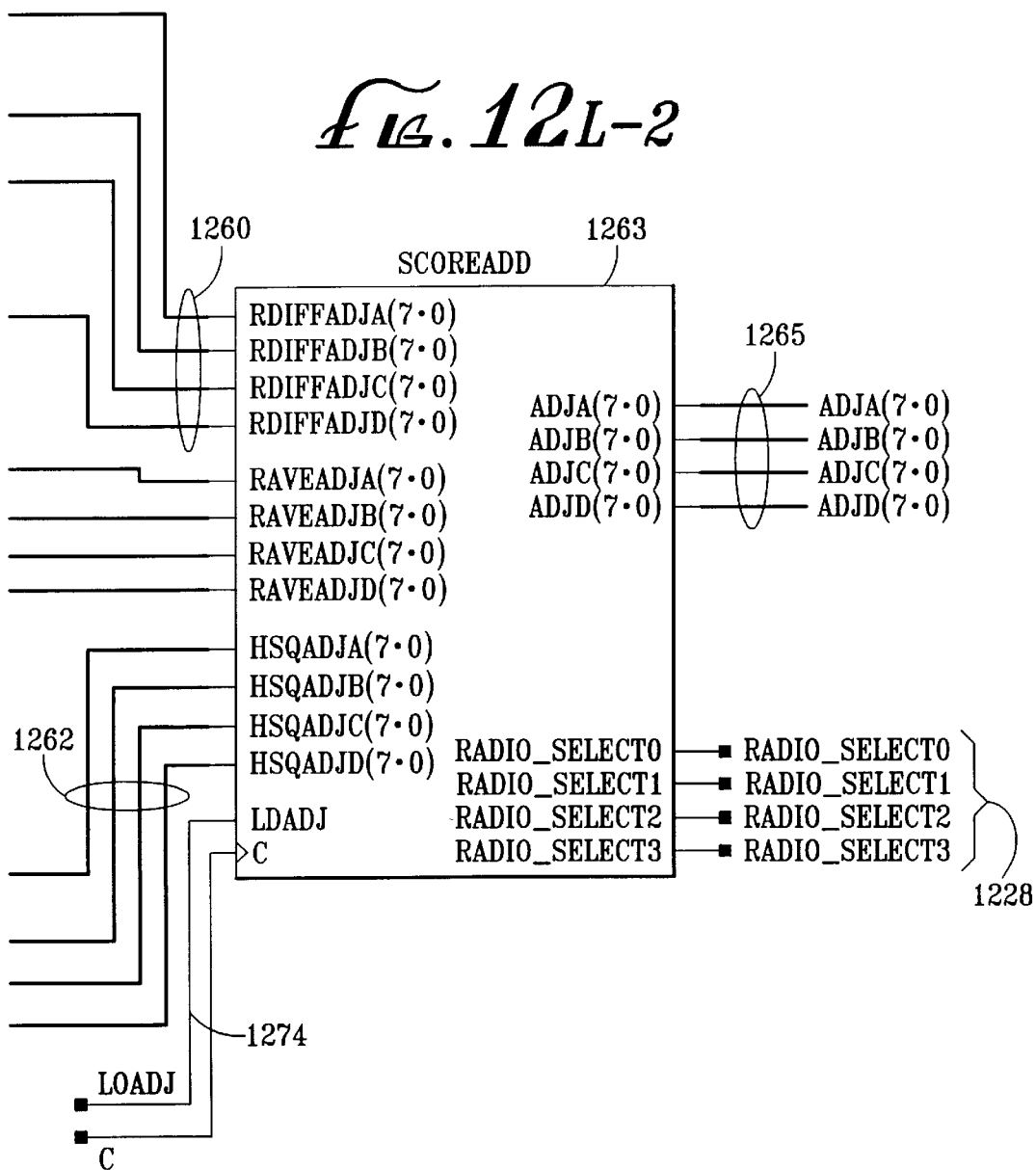

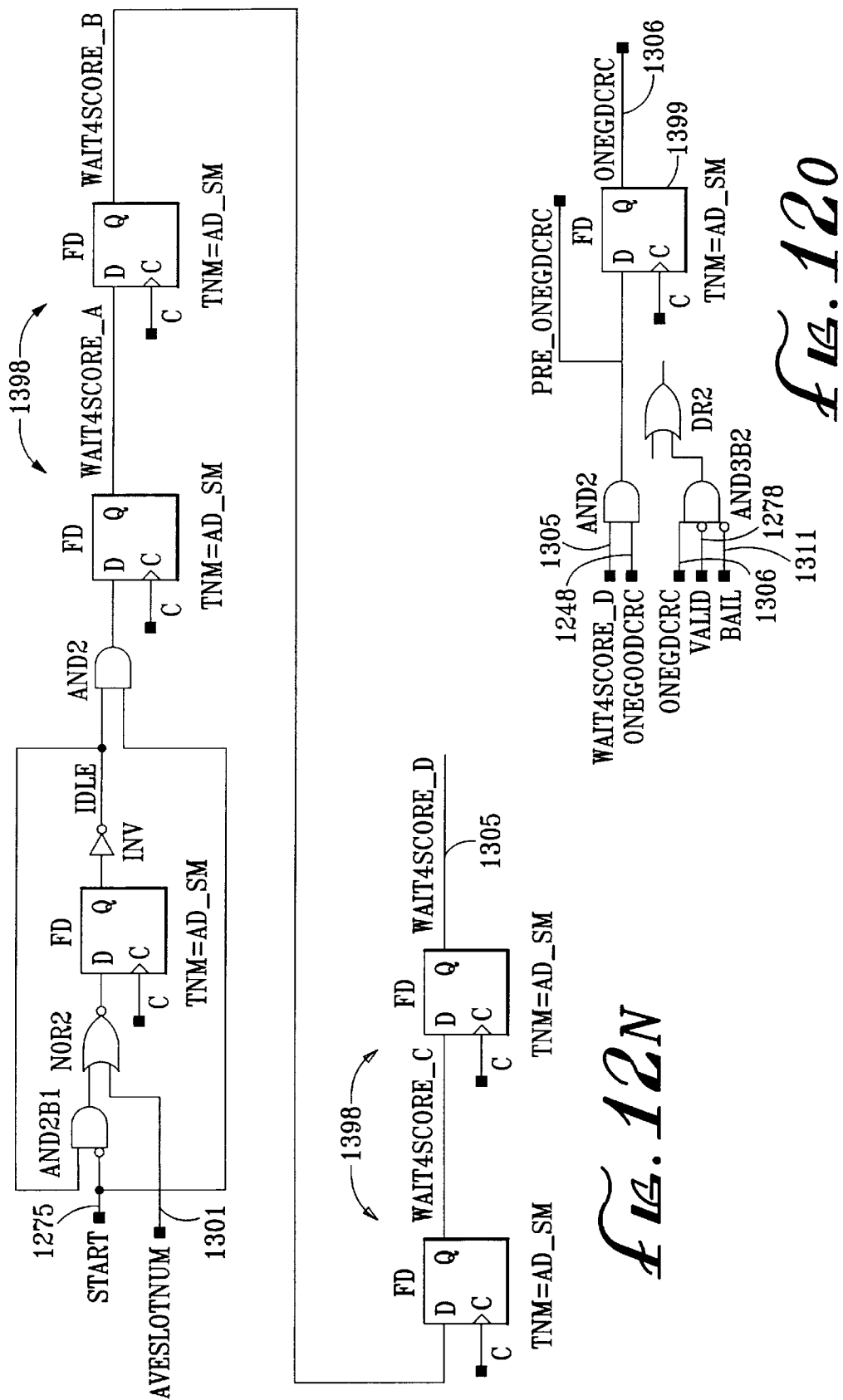

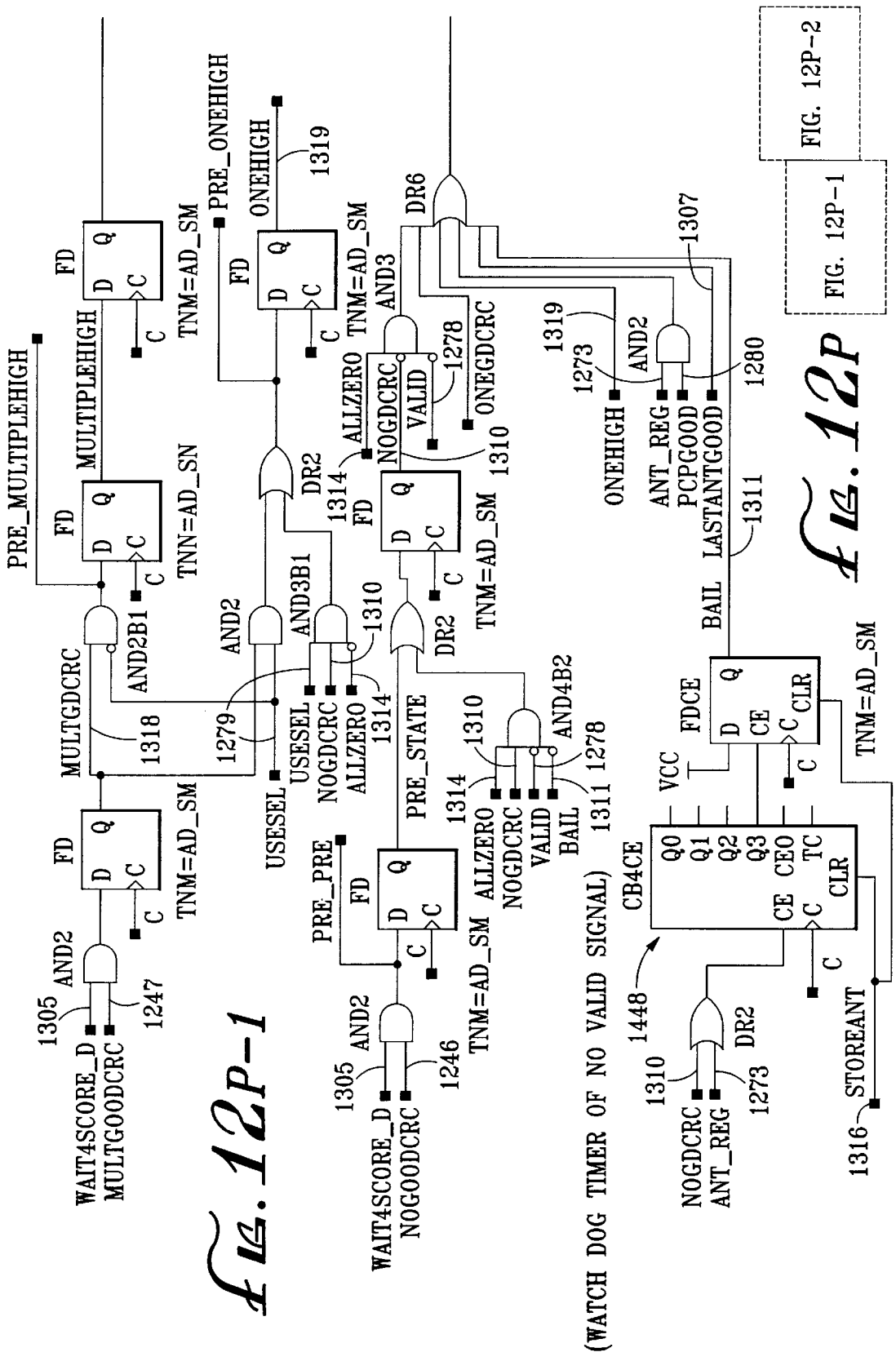

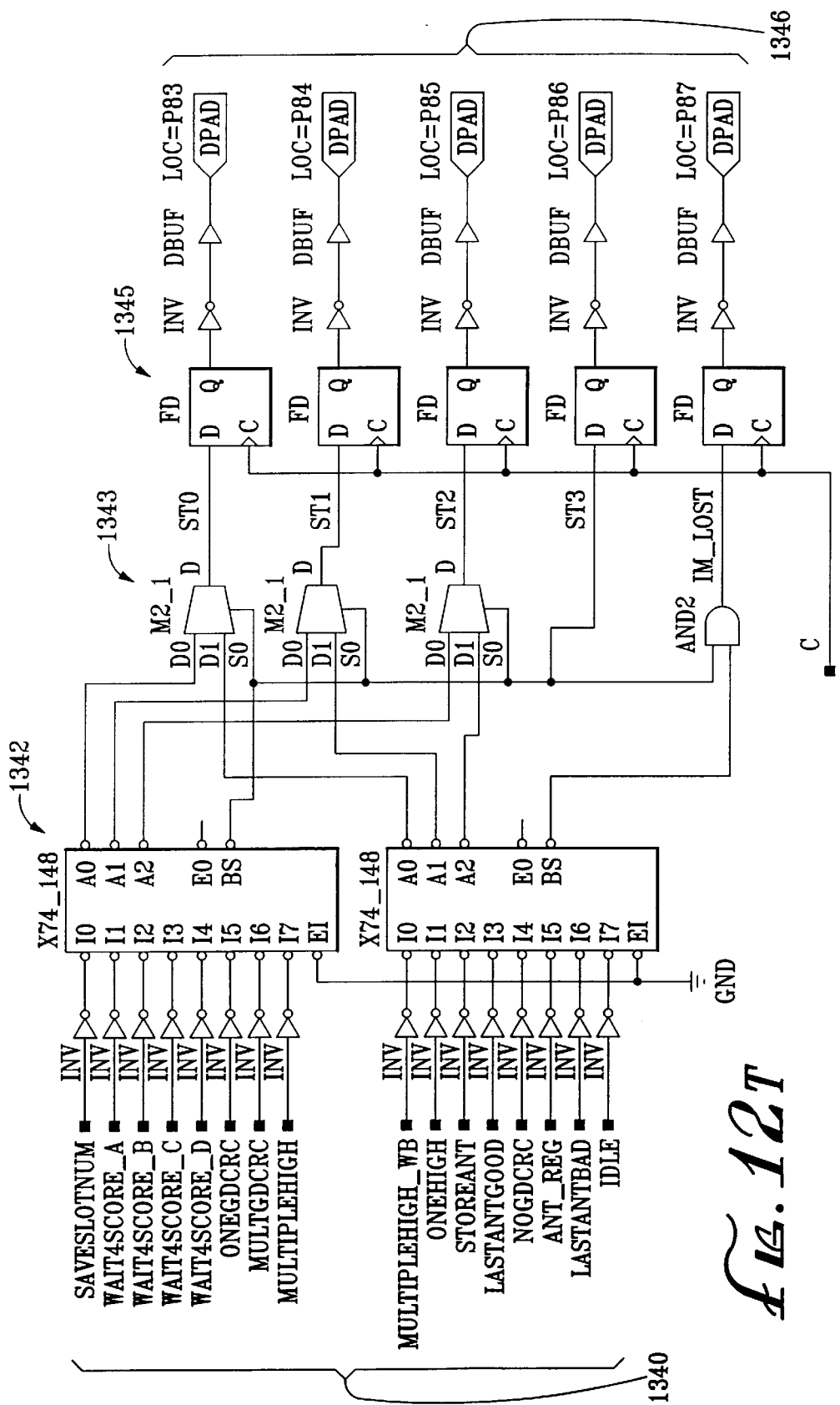

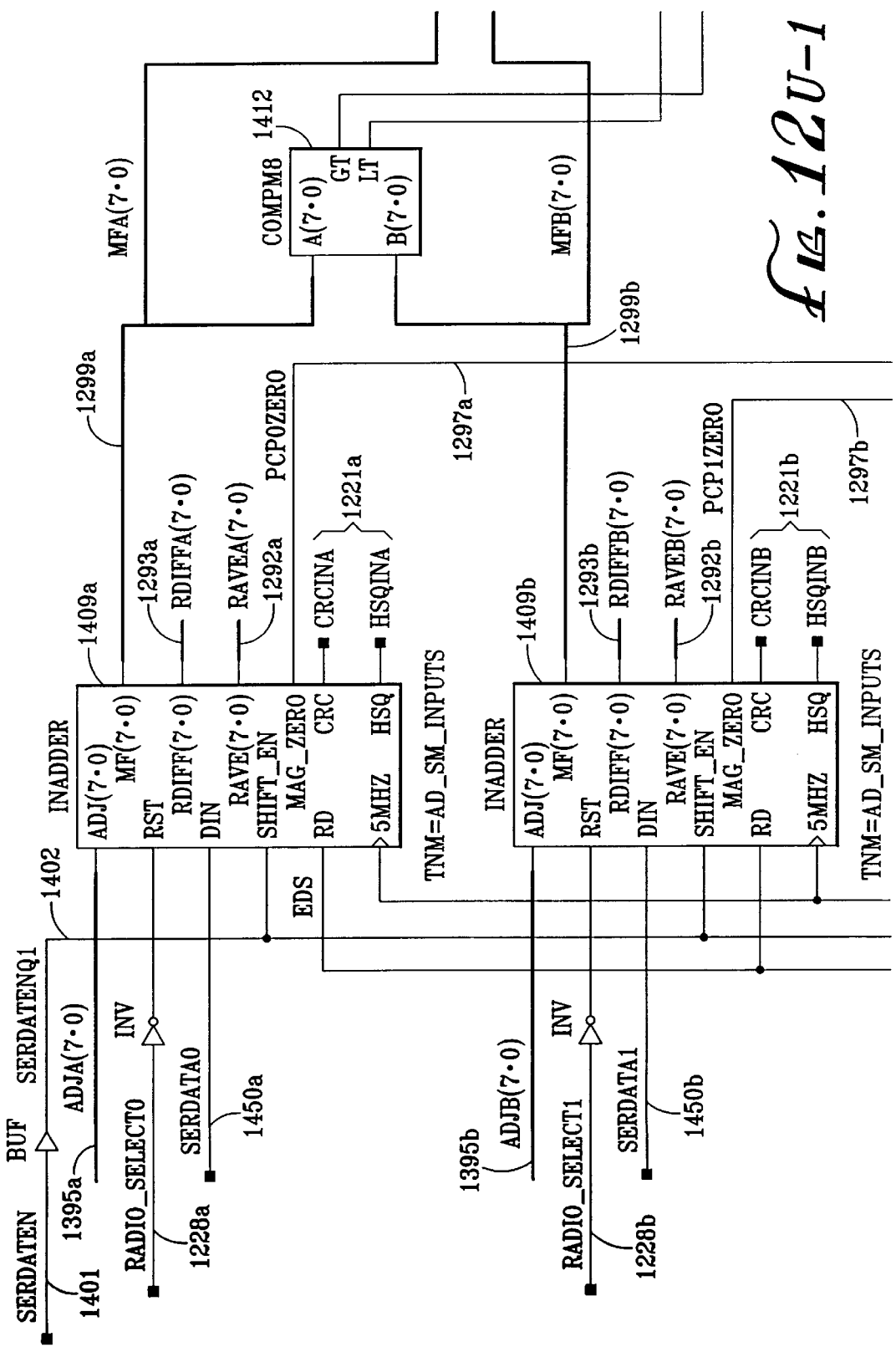

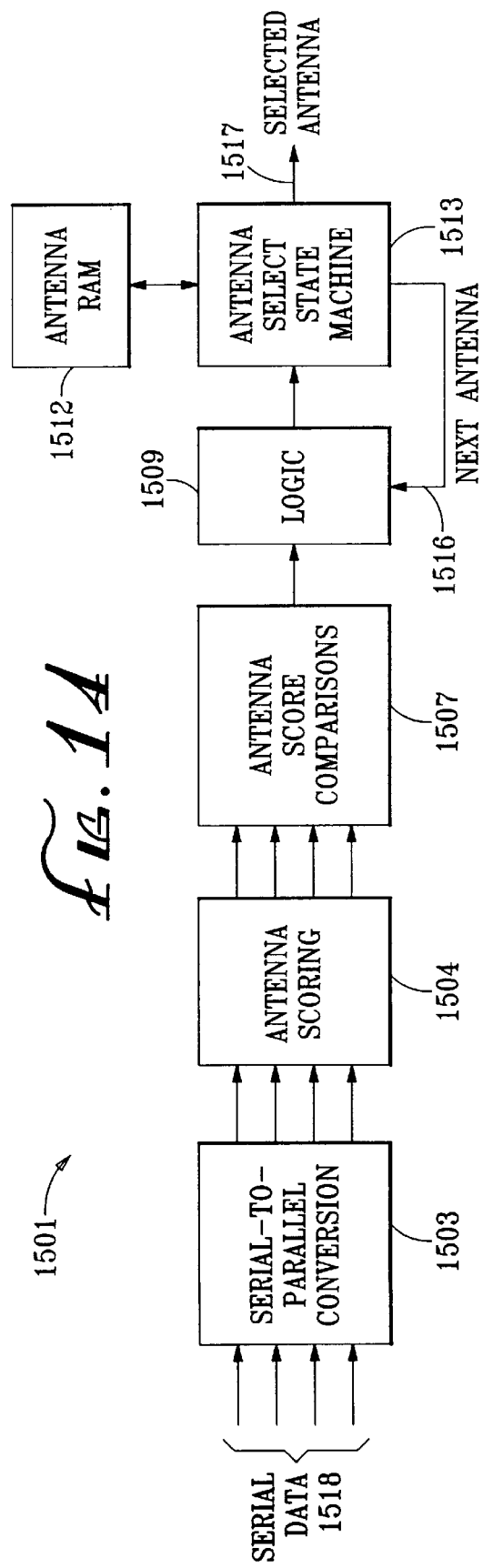

ANTENNA DIVERSITY FOR WIRELESS COMMUNICATION SYSTEM

BACKGROUND OF THE INVENTION

1) Field of the Invention

The field of the invention pertains to communications and, more particularly, to antenna diversity in a wireless communication system.

2) Background

A common problem in wireless communications is interference caused by nearby transmissions on the same or adjacent frequency bands. Interference can cause a receiver to misinterpret a transmitted signal, become jammed, fail to correlate a received signal, or can have other adverse effects on the ability of a receiver to properly receive transmitted information. In addition, receivers in a wireless communication system can also suffer from multipath and fading, which can cause the received signal to fluctuate in amplitude, phase or other characteristics in a relatively short period of time (e.g., a matter of milliseconds).

These problems (i.e., interference, multipath and fading) can be exacerbated in a communication environment in which the transmitters and/or receivers are mobile, due in part to the unpredictability of positioning of the mobile transmitters and/or receivers with respect to the interfering or potentially interfering sources (which may themselves be mobile). Also, some of the above problems can be aggravated when signals are transmitted and received over high frequencies, due to the shorter wavelength(s) of the high frequency signals.

In an attempt to overcome the above problems, some wireless communication systems use multiple antennas at the receiver so as to improve the likelihood of detecting a good quality signal sent from the transmitter. Likewise, some systems employ multiple antennas at the transmitter to increase the likelihood that one of the antennas will yield a superior communication path to the receiver. A variety of techniques are known in the art for selecting one or more antennas for use at a receiver or a transmitter when multiple antennas are available.

When multiple antennas are used at a transmitter or receiver, the antennas are often spatially separated, so that physical conditions responsible for causing fading, multipath or interference have less likelihood of affecting all of the antennas simultaneously. An antenna selection algorithm typically selects the best antenna or antennas for communication according to predetermined criteria such as received signal strength.

In some time division duplex (TDD) or time division multiple access (TDMA) communication environments wherein transmitters and receivers communicate only periodically, antenna selection can in certain instances be difficult due to the "bursty" nature of the periodic transmissions between communication points. In one type of multi-user TDD environment, a base station is generally capable of communicating with a different user station in each time slot. Antenna selection in this environment can be difficult because the antenna (or antennas) best suited for one user station in a first time slot will not necessarily be the most suitable antenna (or antennas) for a different user station, or even the same user station, communicating in a different time slot. Another problem is that the time available is limited for analyzing received signals and deciding which antenna of the multiple antennas is best. Consequently, if antenna selection is performed in a TDMA, TDD or bursty communication environment, it should be performed rapidly.

Rapid antenna selection can prove to be difficult if gaps occurring between received signals are relatively long, because the communication environment is more likely to change with the lengthening of the delay period between received signals. Mobile stations are particularly subject to a rapidly changing communication environment, because unpredictable physical obstacles or obstructions can create interference or cause a change in multipath characteristics, and because external interference sources can be encountered on an unpredictable basis. Moreover, in mobile systems the distance between the user station and the base station can change thereby causing a possible change in the received signal strength. Thus, a mobile communication environment can complicate an antenna selection process, and the relatively bursty nature of certain TDD or TDMA communication environments adds to the difficulty of selecting an antenna by providing only a relatively short amount of time for determining which antenna is the best to use.

While using multiple antennas can, as noted, lead to potentially improved communication quality in some circumstances, multiple antennas are likely to increase the size and/or bulkiness of a communication unit. In many applications, including wireless and/or mobile applications, it is generally desirable to provide communication with small, lightweight handsets. However, if multiple antennas are needed in the handset, the space necessary for the additional antennas can adversely impact the size and/or weight of the handset. While using only a single antenna at the handset can keep the handset smaller and lighter, conventional antenna diversity techniques generally require multiple antennas at the handset in order to achieve the benefits of antenna diversity at the handset.

There is a need for an antenna selection system that is particularly adapted to TDD, TDMA or bursty communication environments, and that can suitably respond to changing environmental factors which may affect the nature and/or quality of signals being transmitted and received. There further is a need for an antenna selection system that can handle multiple users communicating in different time slots, and select an appropriate antenna (or antennas) rapidly and on a slot-by-slot basis. There is also a need for an antenna selection system that minimizes the number of antennas needed at the user station or handset, while nonetheless providing antenna diversity benefits at the user station.

SUMMARY OF THE INVENTION

The present invention comprises in one aspect a receiver and antenna selection system that is particularly well suited for a bursty environment, such as certain TDD or TDMA communication environments. In one embodiment, a receiver and antenna selection system located at a base station comprises a plurality of radio units, each radio unit connected to an antenna. Each radio unit receives a radio message transmitted over a wireless communication link and independently derives quality metrics based on the reception quality of the radio message. The quality metrics preferably include, for example, a received signal strength indication, a cyclic redundancy check result, a preamble correlation magnitude, and other metrics. Each radio unit transfers the quality metrics to an antenna selector, which derives an antenna score for each antenna, taking into account the previously used antenna. The antenna selector selects an antenna based upon a comparison of the antenna scores.

If no antenna is clearly superior, the antenna selector may rotate the antennas each communication period until a suitable antenna is determined, so that the user station has an opportunity to listen to each of the antennas.

In one embodiment of the present invention, each radio unit comprises a transceiver connected to a radio interface. In a particular variation of this embodiment, the radio interface transmits the quality metrics as serial data to a serial-to-parallel port located at the antenna selector. The antenna selector, substantially simultaneously for each radio unit, converts and formats the serial data into individual data words, then applies the data words to an antenna scoring block for determining an antenna score for each antenna. A comparison block compares the outputs from the antenna scoring block and determines the best antenna for reception and/or transmission. In a preferred embodiment, the antenna selector weights the importance of each of the quality metrics, such that certain metrics influence the antenna selection more than other metrics.

In another aspect of the invention, the handset sends a handset reception quality indicator indicating a degree of reception quality at the handset of the signal previously transmitted to it from the base station. The base station utilizes the handset reception quality indicator in addition to the other quality metrics in selecting an antenna (or, alternatively, more than one antenna) for communication.

The receiver and antenna selection techniques in accordance with the present invention are disclosed with respect to a preferred over-the-air protocol for wireless communication between base stations and user stations, either mobile or stationary, wherein the user station transmits information before a base station within a predetermined time period.

Further variations and modifications are also disclosed herein.

BRIEF DESCRIPTION OF THE DRAWINGS

FIG. 3A is a diagram of a base transmit frame structure for the FIG. 2 protocol.

FIG. 3B is a diagram of a mobile station transmit frame structure for the FIG. 2 protocol.

FIG. 4 is a diagram of a portion of a preferred base station receiver including multiple radios and antennas.

FIG. 5 is a diagram of data transmitted from a radio interface unit of FIG. 4 in accordance with a preferred embodiment of the present invention.

FIG. 9 is a flow chart showing a process for antenna selection.

FIG. 10A is a processing flow diagram for assigning antenna scores to each antenna.

FIG. 14 is a block diagram of an antenna selection system in accordance with one or more principles of the present invention.

DETAILED DESCRIPTION OF PREFERRED EMBODIMENTS

The invention in one aspect provides a receiver and antenna selection system for selecting one or more antennas for communication over a wireless communication link. Before describing details of the receiver and antenna selection system, a description of a preferred communication system architecture is provided.

Figure 1:
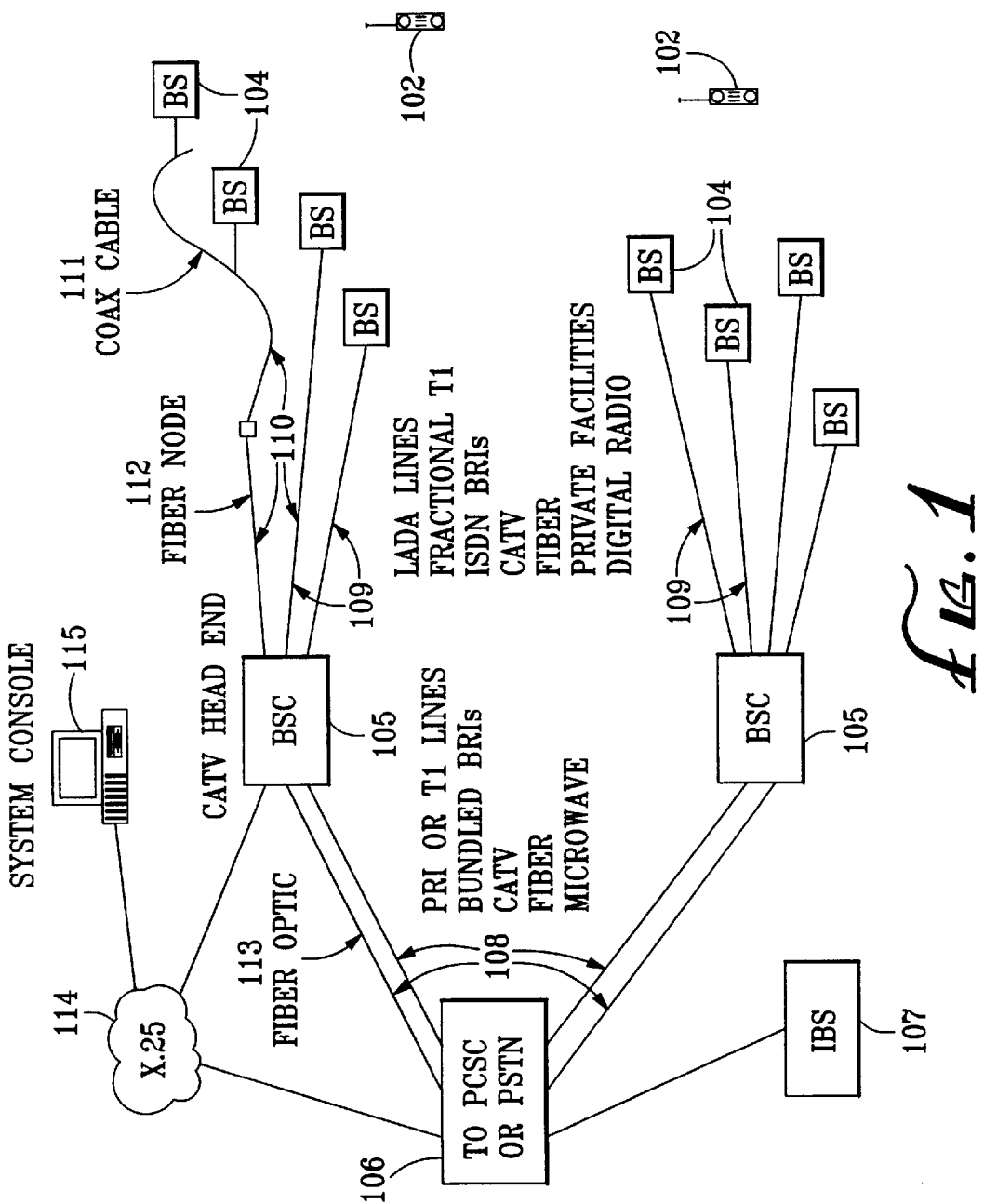
FIG. 1 is a block diagram illustrating a presently preferred communication system architecture.

FIG. 1 is a diagram of an architecture of a presently preferred communication system in which the invention may operate. The FIG. 1 architecture includes a plurality of base stations 104 which communicate with a plurality of user stations 102 over wireless communication links. Each base station 104 is shown coupled to a base station controller 105 by any of a variety of communication paths 109. The communication paths 109 each comprise one or more communication links 110, each of which may include, e.g., a coaxial cable, a fiber optic cable, a digital radio link, or a telephone line. An exemplary communication path 109 is illustrated in FIG. 1 comprising a coaxial cable 111, a fiber node 112, and a fiber optic cable 113.

Each base station controller 105 is preferably connected to one or more communication networks 106 such as a public switched telephone network (PSTN) or personal communication system switching center (PCSC). The base station controllers 105 connect to a communication network 106 by means of one or more communication paths 108. The communication system architecture shown in FIG. 1 may also include so-called "intelligent" base stations 107 which connect a user station 102 directly to a communication network 106 without interfacing through a base station controller 105.

In operation, the base stations 104 format and send information (typically in digital format) to the base station controllers 105 (or directly to the network 106 in the case of an intelligent base station 107). The base station controllers 105 concentrate inputs from multiple base stations 104, assist handoffs between base stations 104, and convert and format channel information and signaling information for delivery to the network 106. The base station controllers 105 may manage a local cache Visitor Location Register (VLR) database, and may support basic operations, administration and management functions such as billing, monitoring and testing. Each base station controller 105, under control of the network 106, may manage local registration and verification of its associated base station 104 and may provide updates to the network 106 regarding the status of the base stations 104.

The network 106 connects to the base station controllers 105 for call delivery and outgoing calls. Intelligent base stations 107 may use Integrated Services Digital Network (ISDN) messaging for registration, call delivery and handoff over a public telephone switch. If the network 106 is part of a Global System of Mobile Communications (GSM) network, then base stations 104 preferably connect to the network 106 through a defined "A" interface. The "A" interface is preferably incorporated in base station controllers 105 and in intelligent base stations 107. Features and functionality of GSM are passed to and from the base stations 104 over the "A" interface in a manner that is transparent to the end user. Further details regarding the transfer of information within a communication system are described in, e.g., copending U.S. Application Ser. No. 08/532,466 filed Sep. 22, 1995, and U.S. Application Ser. No. 08/622,812 filed Mar. 4, 1996, each of which is hereby incorporated by reference as if set forth fully herein.

The base stations 104 are preferably deployed in a cellular arrangement having a frequency and/or code reuse pattern such as disclosed, for example, in U.S. Pat. No. 5,402,413, hereby incorporated by reference as if set forth fully herein. Each cell of the cellular arrangement preferably includes at least a single base station 104 located near the center of the cell. Each base station 104 communicates over one or more frequencies and uses one or more spread spectrum codes, according to the desired frequency and code reuse pattern.

Each base station 104 and user station 102 typically comprises one or more radios each comprising a receiver, a transmitter, and one or more antennas. Communication between base stations 104 and user stations 102 is preferably accomplished using spread spectrum techniques. In a presently preferred embodiment, the base stations 104 of FIG. 1 communicate with the user stations 102 using an M-ary spread spectrum communication technique wherein data is encoded using M spread spectrum codes (called "symbol codes"). Each symbol code represents N bits of data, with N=log$_2$M. In a preferred embodiment, the base station 104 and user stations 102 use thirty-two different symbol codes (each 32 chips in length) to represent up to thirty-two different data symbols, each data symbol comprising five bits of data, with differential phase encoding allowing transmission of a 6th bit of data for each symbol code. Further details regarding a preferred spread spectrum transmission and reception technique (including phase encoding) are described in, e.g., U.S. patent application Ser. No. 08/484,007 filed Jun. 7, 1995, incorporated herein by reference as if set forth fully herein.

In a preferred embodiment, the user stations 102 and base stations 104 communicate using a time division multiple access (TDMA) technique and preferably time division duplexing (TDD). According to these techniques, a repetitive series of polling loops or major frames is provided for communication between a base station 104 and user stations 102.

Figures 2, 11A:
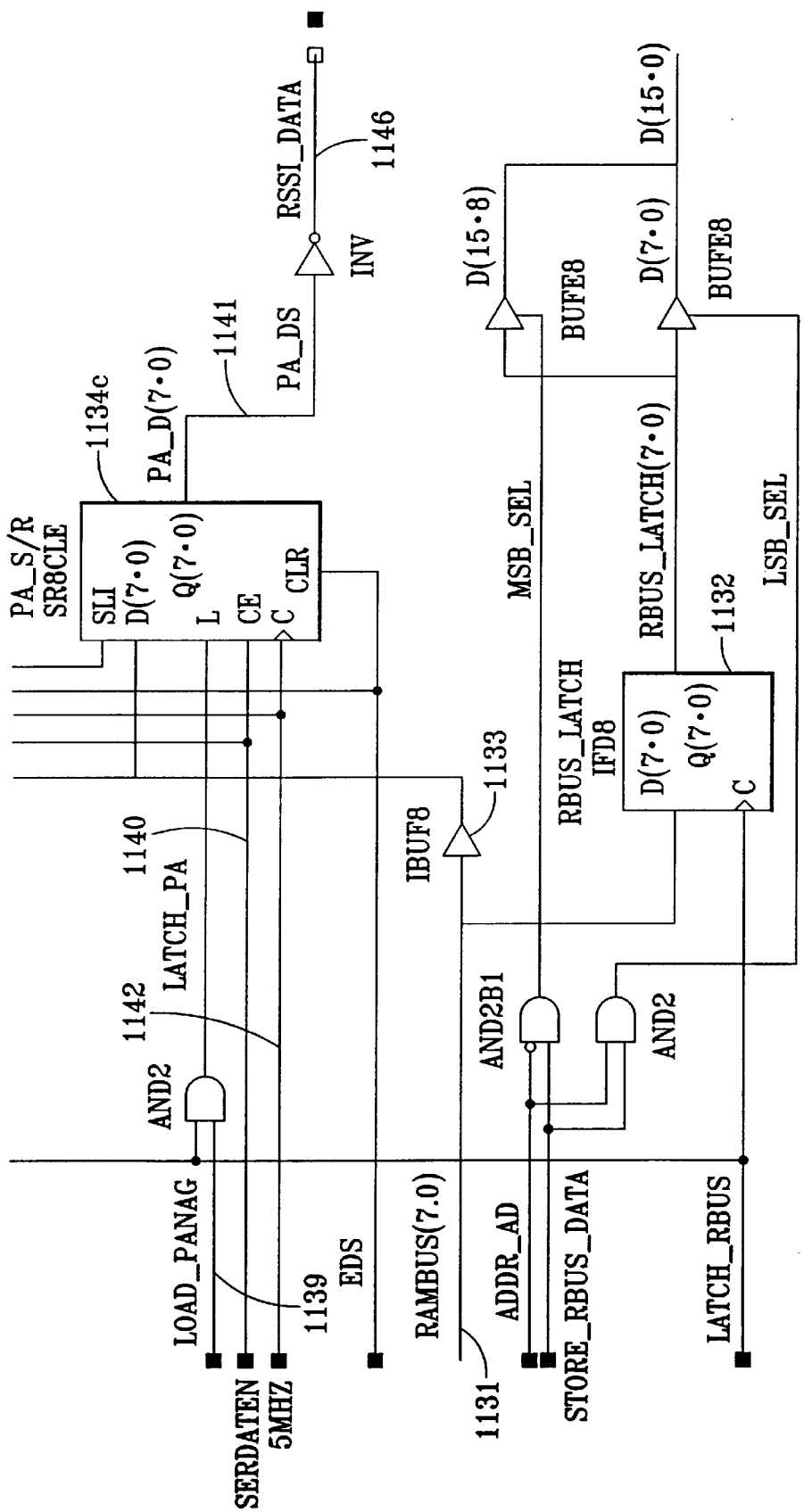
FIG. 2 is a timing diagram of a presently preferred time division multiple access communication protocol.
FIGS. 11A–11I are circuit schematic diagrams of a preferred RAM bus controller.

FIG. 2 illustrates a preferred protocol for communication between a base station 104 and one or more user stations 102. As shown in FIG. 2, a polling loop 201 (also referred to as a "major time frame" or "time frame") is divided into multiple time slots 202 (also referred to as "minor time frames") which are assigned for communication between a base station 104 and user stations 102. Preferably, duplex communication is carried out in each time slot 202 between a base station 104 and a user station 102 to which the time slot 202 is assigned. The base station 104 receives a user station transmission over multiple antennas, derives and assesses quality metrics for each antenna, and selects an antenna for reception in accordance with the processes described further herein. A base station 104 may thereby communicate with a plurality of user stations 102 on a periodic basis over consecutive polling loops 201. The base station 104 preferably performs antenna selection in each time slot independently for each user station 102 with which the base station 104 is communicating.

After receiving a user message, the base station 104 then preferably transmits over the same antenna selected for reception. Time division duplex permits common antennas to be used for transmit and receive functions at both the base station 104 and the user stations 102, generally without the need for antenna diplexers. Common antennas can be used to transmit and receive because these functions are separated in time at each of the user stations 102 and base stations 104.

A preferred antenna selection technique is implemented such that the best antenna (or antennas) is/are selected in each time period. In a preferred embodiment, a user station 102 in established communication with the base station 104 communicates with a base station 104 once each time frame 201, in a designated time slot 202 (although the user station 102 in some embodiments may be assigned multiple time slots 202). In a preferred communication protocol, the user station 102 transmits before the base station 104 in a designated time slot 202, resulting in a delay (equal to roughly the duration of a time frame 202) between the last base station transmission intended for the user station 102 and the subsequent user station transmission. If the duration of the time frame 201 is selected as too long, antenna(s) selected for communication with a given user station 102 may not be valid in the next designated communication period. In other words, the quality metrics used in selection of an antenna generally becomes "stale" after a certain time period. To prevent antenna selection based on no longer valid information, the maximum time frame duration is selected so as to prevent the quality metrics from becoming stale.

Where the base station 104 is deployed in an area with multi-path signal propagation problems and/or interfering transmissions, the quality metrics derived from a user station transmission in a particular time slot 202 may not be accurate in estimating the characteristics of the channel at the time of a subsequent base station transmission, particularly where the base station transmission occurs in a subsequent loop 201. In a preferred embodiment, the elapsed time between reception of the user station transmission and the beginning of the base station transmission is no greater than about 1.25 milliseconds so that the channel characteristics remain relatively constant.

In a preferred embodiment, the polling loop 201 is divided into sixteen time slots 202, and each time slot 202 has a duration of 1.25 milliseconds. In an alternative embodiment, each time slot 202 has a duration of about 1.153 milliseconds.

Preferably, each time slot 202 (see FIG. 2) comprises a total of 3125 chip periods, such that base station transmissions during base transmit frames 225, and user station transmissions during mobile station transmit frames 210, each operate at a chip rate of 2.5 Mchips/second. In that case, each symbol period is 12.8 $\mu$sec., yielding a burst data rate of 468.75 kbps.

In one particular embodiment, the base station 104 transmits to the user station 102 in a later time slot 202, so as to allow additional processing time at the base station 104. In such a case, the forward link and reverse link channels may collectively be referred to as a "virtual" time slot. Further information regarding virtual time slots is discussed in U.S. patent application Ser. No. 08/668,483, previously incorporated herein by reference.

As shown in FIG. 2, a time slot 202 comprises a variable radio delay gap 205, a user station transmit field 210, a base processor gap 215, a guard time 220, a base transmit field 225, and a radar gap 230. Each user station transmit field 210 comprises a user preamble 235, a user preamble sounding gap 240, and a user station data field 245. Similarly, each base transmit frame 225 comprises a base preamble 250, a base preamble sounding gap 255, and a base transmit data field 260.

Figures 2, 11B:
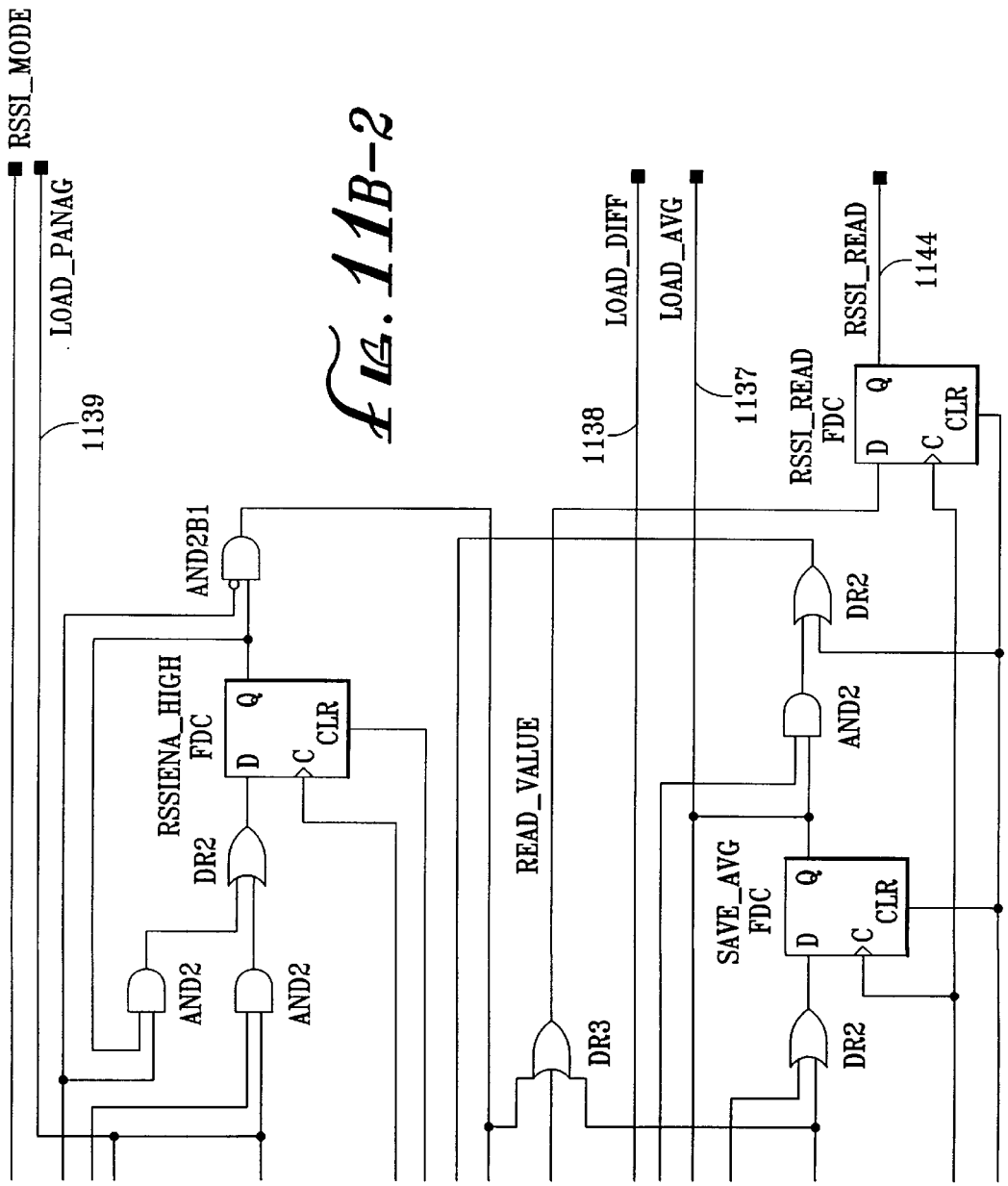
Figures 2, 11C:
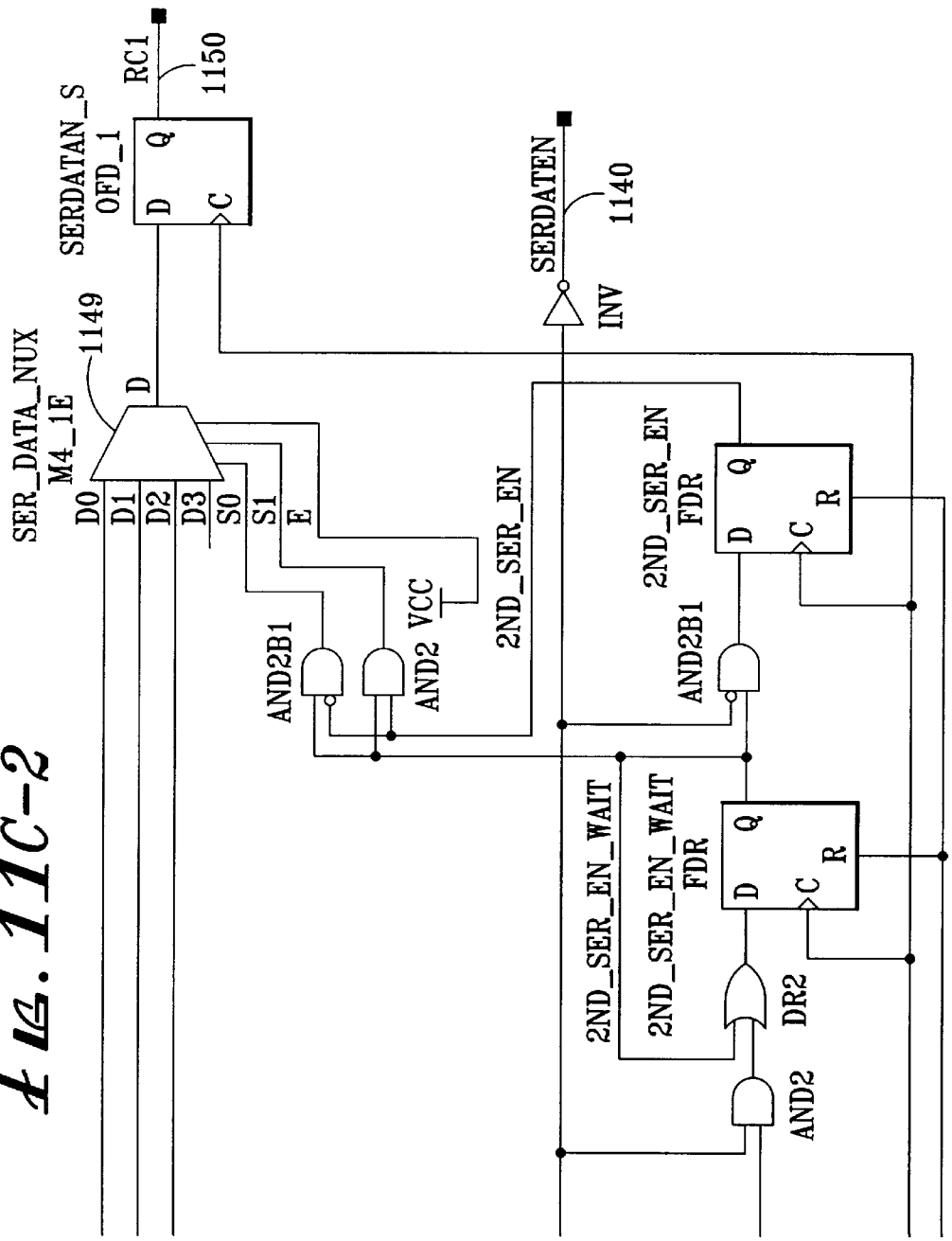
Figures 2, 11D:
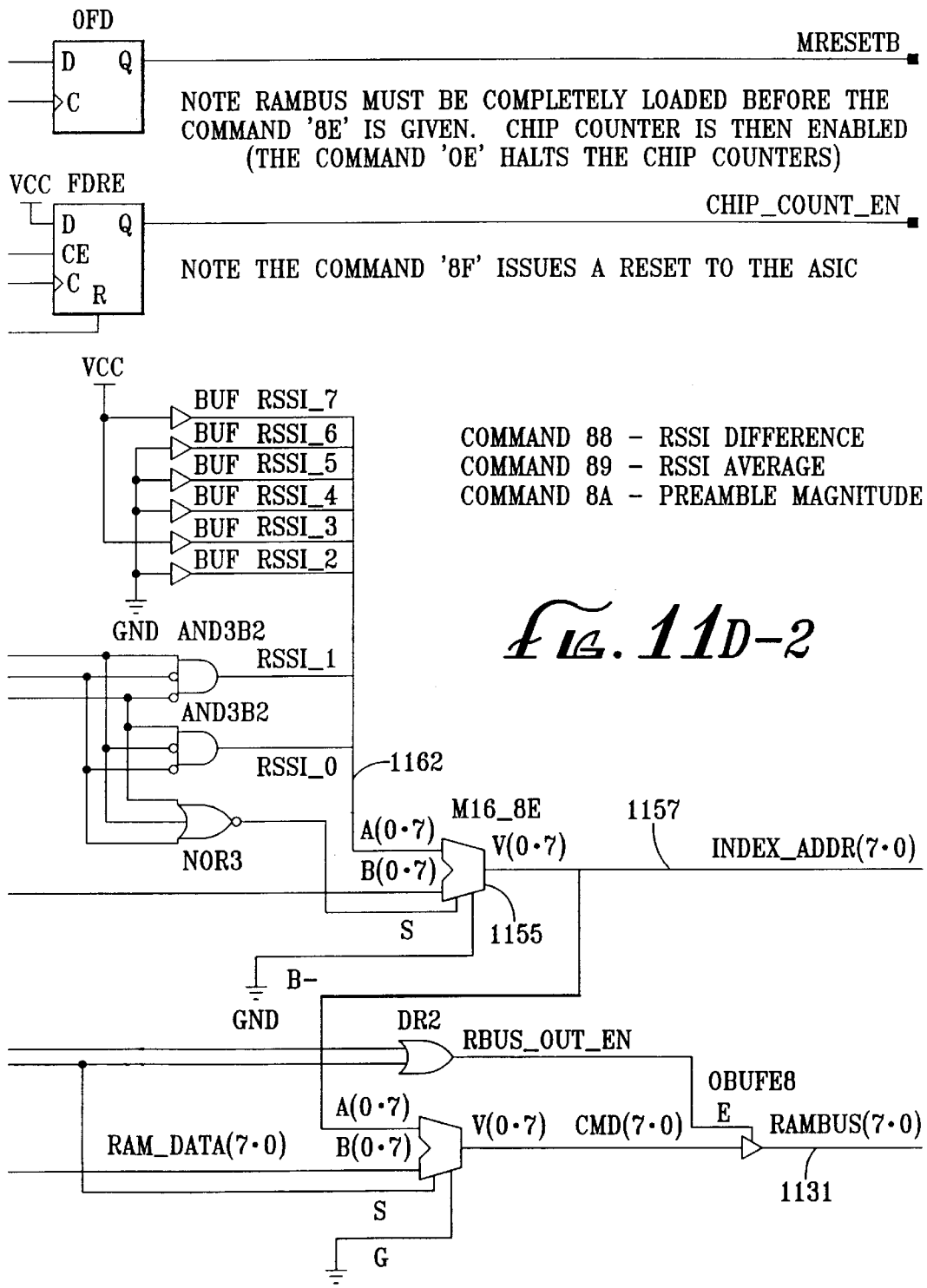
Figures 1, 11E:
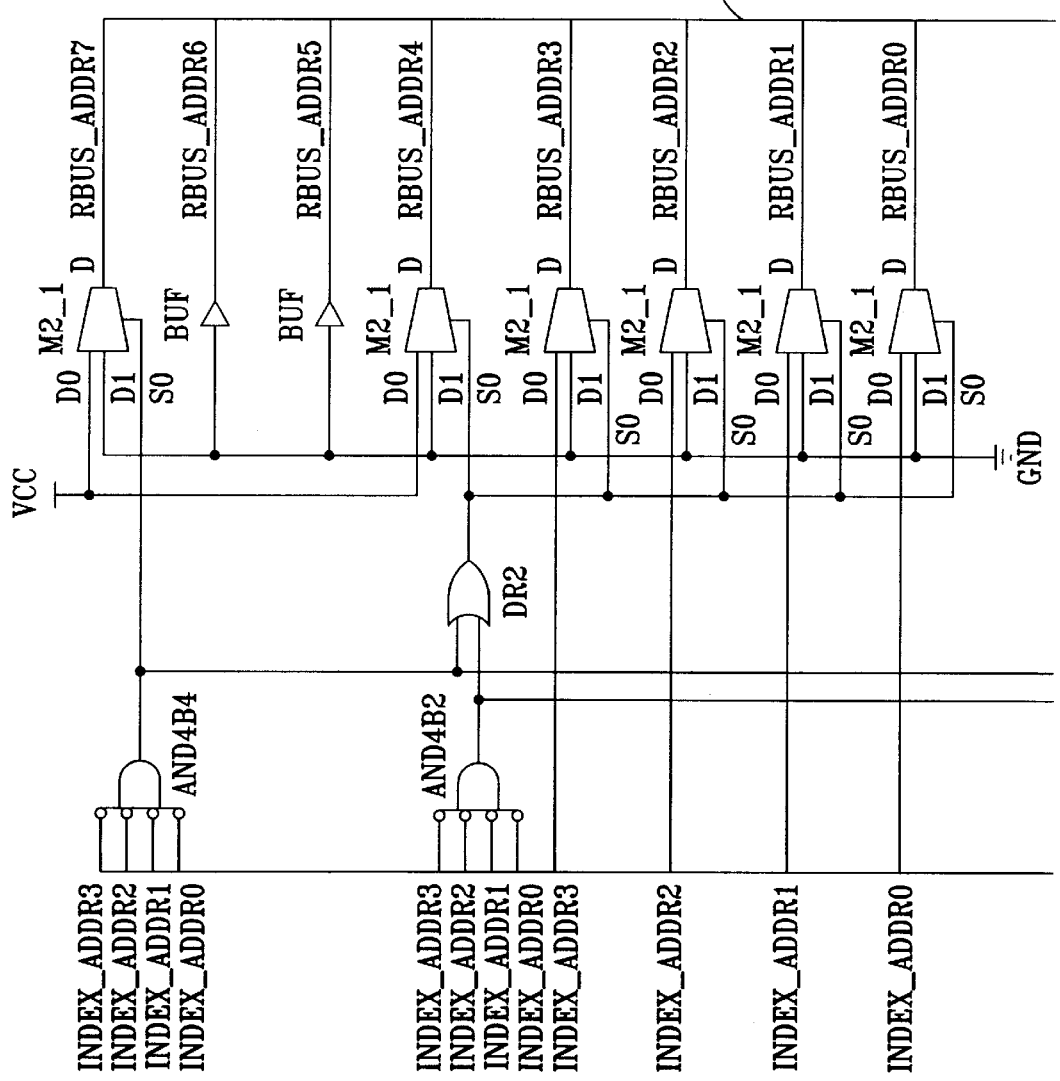
Figures 2, 11E:
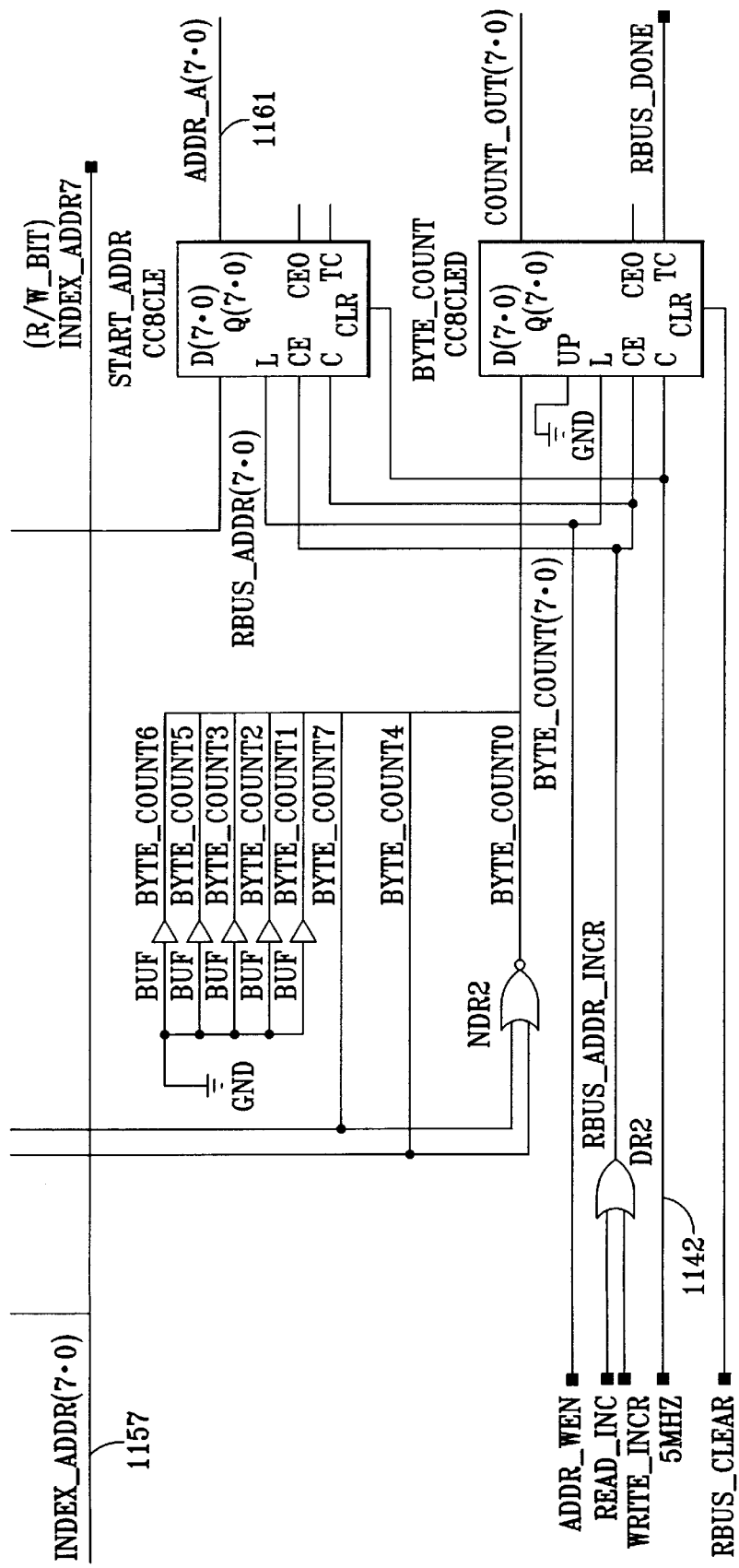
Figures 1, 11F:
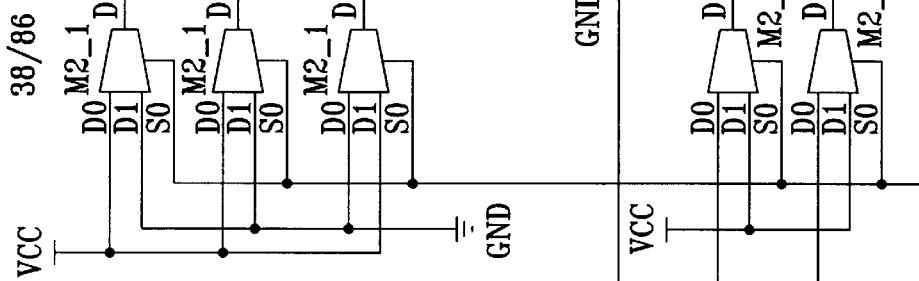
Figure 11F:
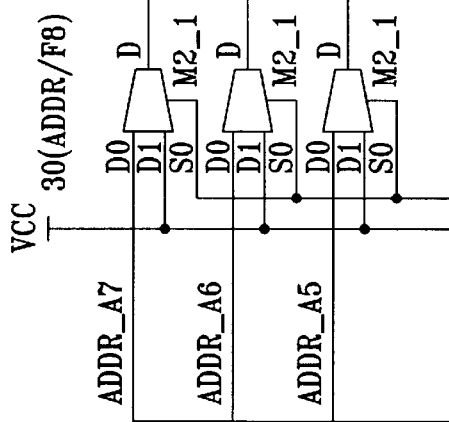
Figures 2, 11F:
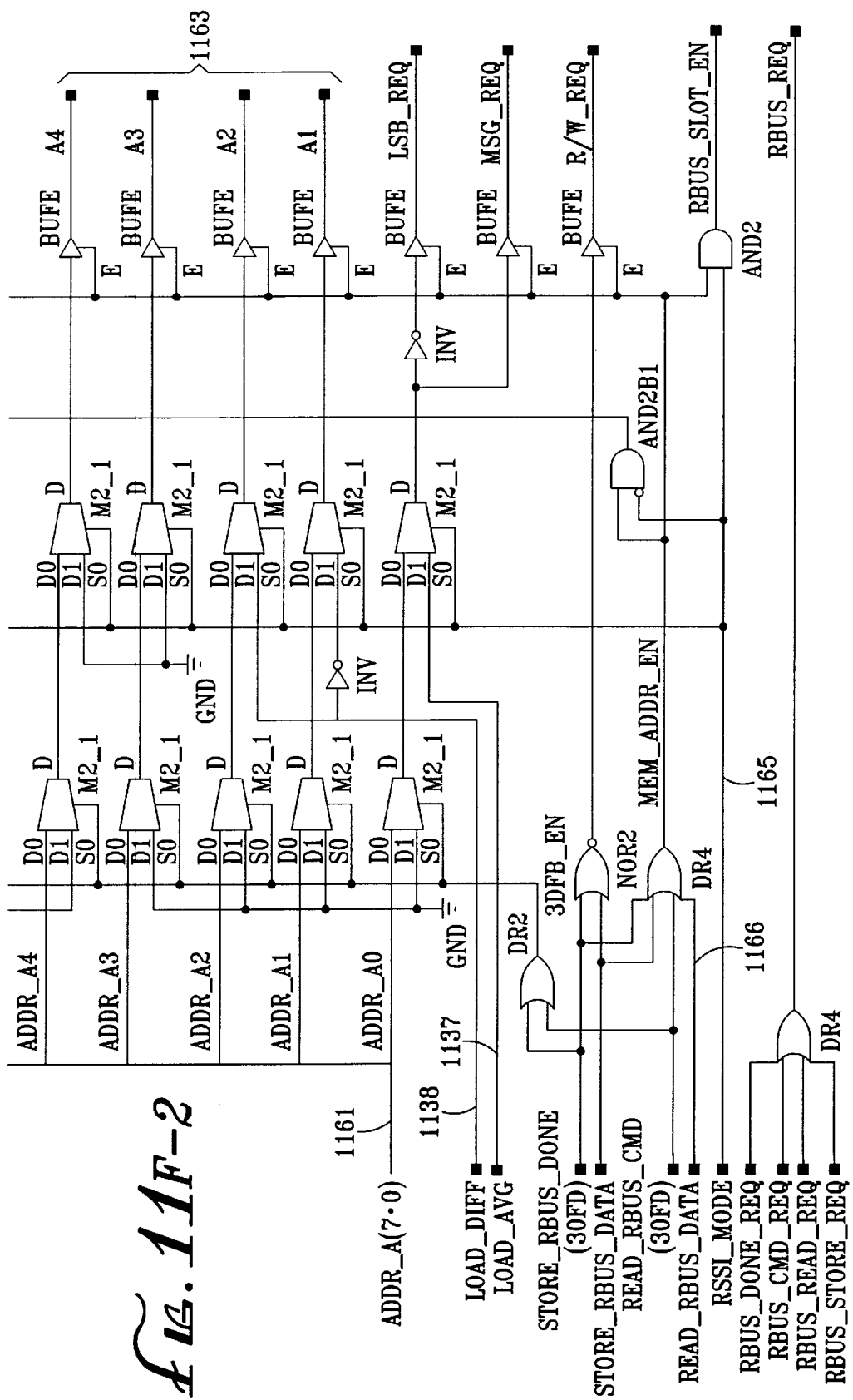
Figures 2, 11G:
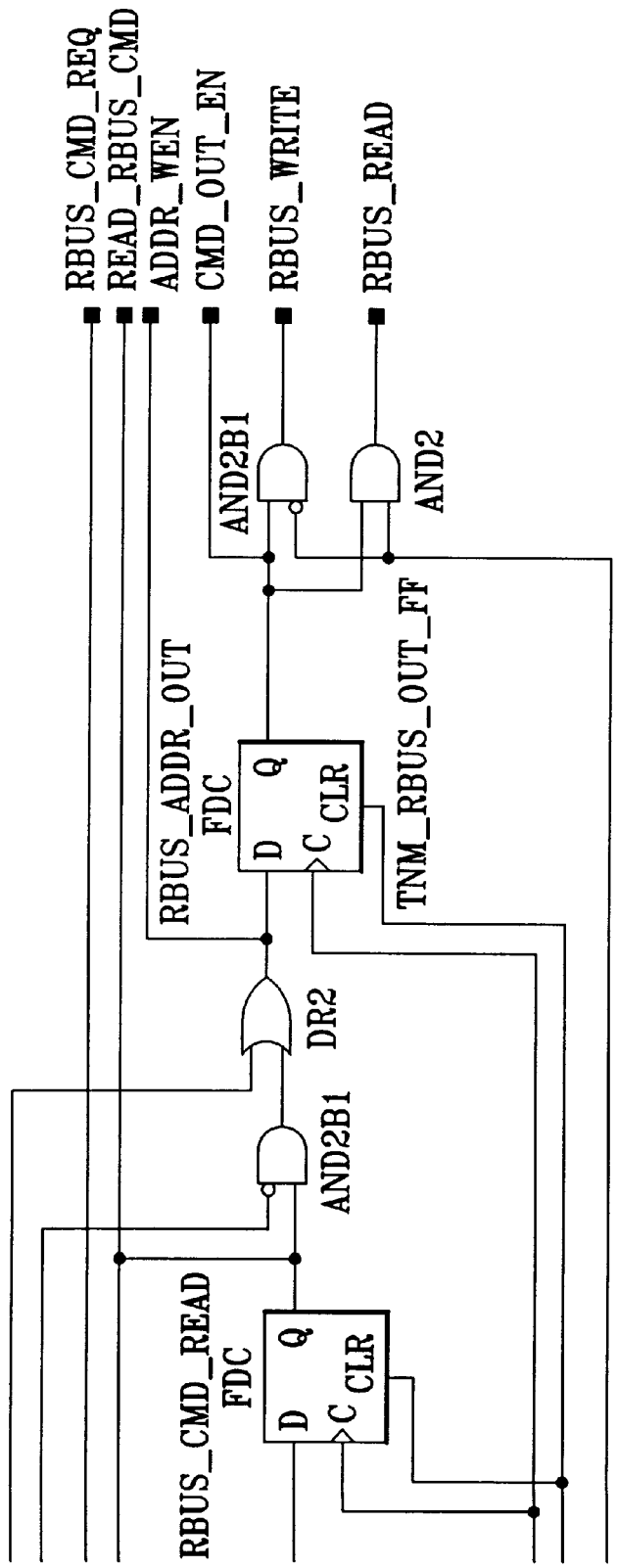
Figures 2, 11H:
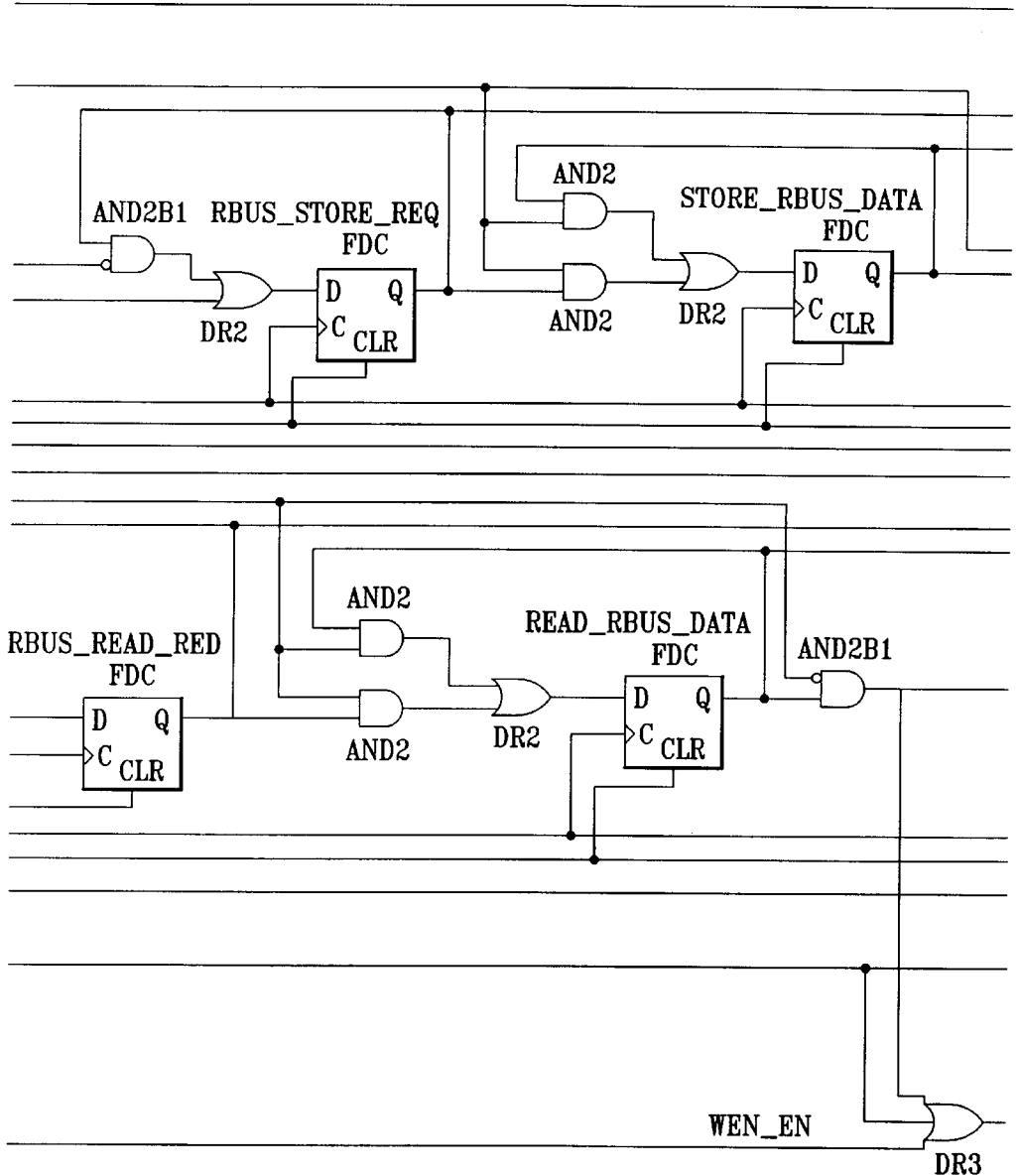
Figures 3, 11H:
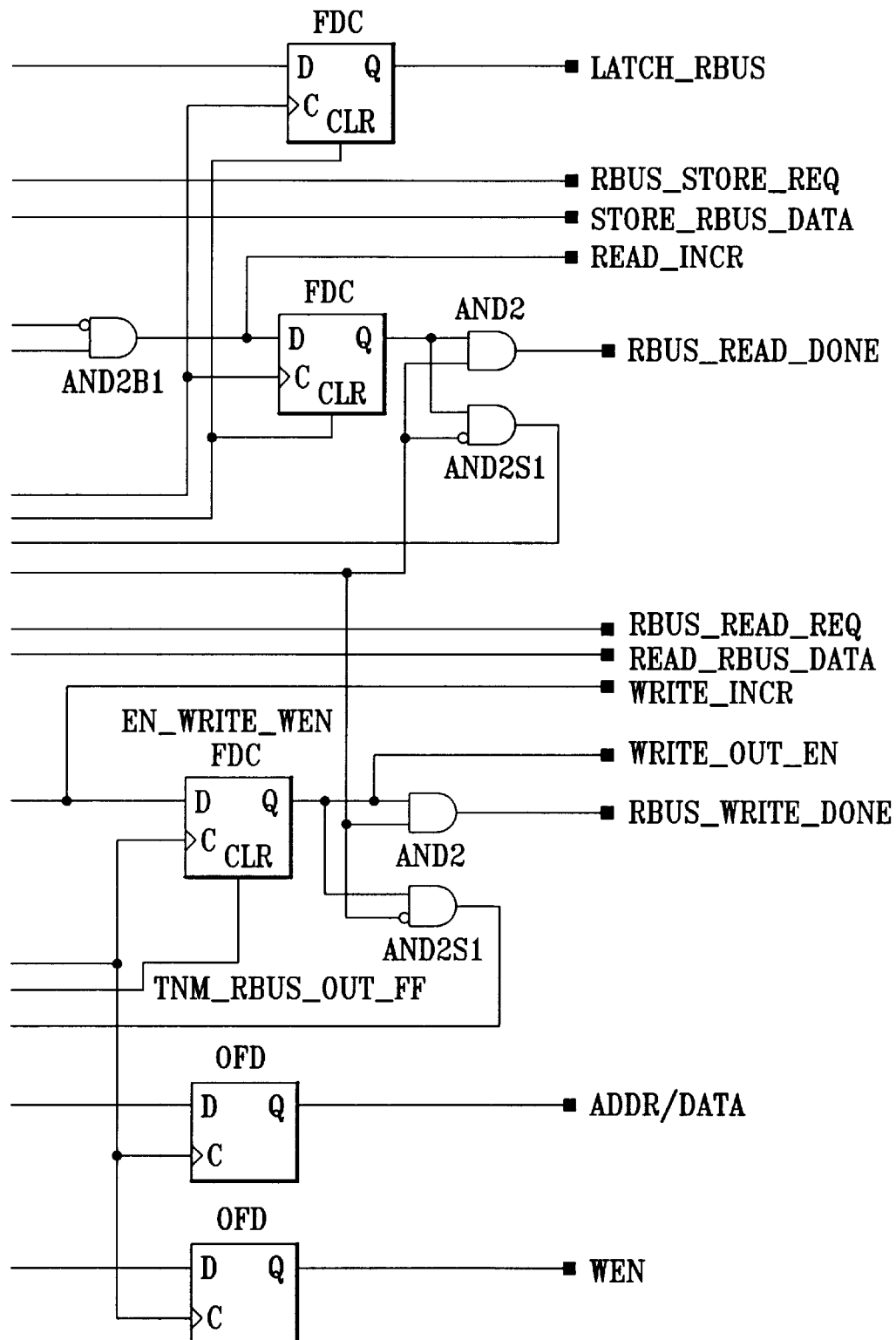

FIG. 3A shows a preferred structure for the base transmit data field 360. The base transmit data field 360 comprises a base header field 365, a base D-channel field 370, a base data field 375, and a base cyclical redundancy check (CRC) field 380. In a preferred embodiment, the base header field 365 is 23 bits, the base D-channel field 370 is 8 bits, the base data field 325 is 192 bits, and the base CRC field 380 is 16 bits.

FIG. 3B shows a preferred structure for the user station transmit data field 345. The user station data field 345 comprises a user header field 385, a user D-channel field 390, a user data field 395, and a user CRC field 397. In a preferred embodiment, the user header field 385 is 17 bits, the user D-channel field 390 is 8 bits, the user data field 395 is 192 bits, and the user CRC field 397 is 16 bits.

Exemplary signal contents for signaling information are described in, e.g., copending U.S. Application Ser. No. 08/532,466 filed Sep. 22, 1995, which is hereby incorporated by reference as if set forth fully herein. In a preferred embodiment, the polling loop 201 comprises 32 time segments forming 16 time slots for communication between a base station 104 and a plurality of user stations 102.

In one aspect of the invention, the time slots 202 define a set of transmission channels. Each transmission channel preferably is defined by a separate frequency channel, a separate spread spectrum spreading code, a separate spatial direction, or some combination of separate frequency, spreading code, and spatial direction. Each time slot 202 preferably contains a user station transmission and/or a base station transmission. A base station 104 transmits a base station transmission during the base station transmit frame 225 to a user station 102 with which the base station 104 is communicating. The user station 102 transmits to the base station 104 a user station transmission during the user station transmit frame 210. Further details regarding communication protocols may be found in copending U.S. Application Ser. No. 08/284,053 filed on Aug. 1, 1994, and in U.S. Application Ser. No. 08/668,483 filed on Jun. 21, 1996, both of which are hereby incorporated by reference as if set forth fully herein.

FIG. 4 is a diagram of a base station 104 including antenna selection capability in accordance with one or more aspects of the present invention. As shown in FIG. 4, a plurality of antennas 403 are connected to a plurality of radios 405, preferably one antenna 403 for each radio 405. While the actual number of antennas 403 utilized may vary depending upon the requirements of a particular system, FIG. 4 shows four antennas 403 connected to four radios 405, one antenna 403 for each radio 405. Each radio 405 comprises reception, demodulation and correlation electronics of a conventional nature, as known in the art. Each radio 405 receives, in parallel, a radio signal over an antenna 403 and derives certain quality metrics associated with the received signal, as further detailed below.

Each radio 405 is connected to one of a plurality of radio interface units 407, which receive the quality metrics from the corresponding radio 405. Each radio interface unit 407 converts the quality metrics into serial data, and transmits the serial data over serial data lines 408 to a diversity controller 415, where serial-to-parallel converters 416 operate to convert the serial data to data words for further processing as described later herein.

The diversity controller 415 assesses and/or compares the quality metrics from each radio 405 according to criteria described in detail later herein, and determines which radio 405 (and hence, which antenna 403) has the best signal. The diversity controller 415 informs the processor in the receiver which radio 405 the diversity controller 415 has determined is best for communication, and the processor selects information from that radio 405 for further processing. The diversity controller 415 may select a different radio/antenna for each time slot 202. The selected antenna 403 (or radio 405) for a particular channel or time slot 202 is referred to herein as the "active" antenna (or radio). When data is transmitted from the base station 104, the diversity controller 415 preferably selects for transmission the same radio 405 selected for reception. The diversity controller 415 may select the desired radio 405 by asserting the appropriate transmit enable at the proper time to enable the radio 405 for transmission.

Various individual components of the diversity controller 415 are shown in the FIG. 4 embodiment. The diversity controller 415 comprises an antenna selector 420, a time slot counter 422 (which may be global), a user map 424, and a random access memory 423 for storing the identification number of the active antenna 403 for each time slot. In a preferred embodiment, in which the number of time slots 202 in a time frame 201 is sixteen, and the number of antennas 403 is four, the active antenna RAM 423 has four input address lines which collectively comprise a 4-bit address (each 4-bit pattern associated with a different one of the sixteen time slots 202) and a 2-bit output indicating the identification number (i.e., 00, 01, 10, or 11) of the currently selected antenna 403.

In typical operation, the time slot counter 422 counts in cycles from zero up to the number of time slots (e.g., counts from 0 to 15, for sixteen time slots) and thereby sequentially cycles through each of the time slots 202 of a time frame 201 (such as time frame 201 of FIG. 2). In each time slot 202, the radios 405 simultaneously receive a transmitted radio message and, as noted, send information regarding quality metrics to the diversity controller 415. The antenna selector 420 of the diversity controller 415 receives information from the various radios 405 through the serial-to-parallel converters 416, checks the currently selected antenna number from the active antenna RAM 423, selects an antenna 403 for communication in that time slot, and then stores the number of the newly selected antenna (the "active antenna number") in the active antenna RAM 423. The active antenna number may vary on a time-slot-by-time-slot basis.

In a preferred embodiment, each radio interface unit 407 provides information to the diversity controller 415 regarding the reception quality and related decision criteria for its corresponding antenna 403. The information sent from the radio interface unit 407 to the diversity controller 415 preferably includes a handset signal reception quality (HSQ) flag, a cyclic redundancy check (CRC) flag (generated by the radio 405), an average received signal strength indication, a differential received signal strength indication, and a preamble correlation magnitude value. These parameters are described in more detail below with regard to the FIG. 8 embodiment.

Figure 8B:
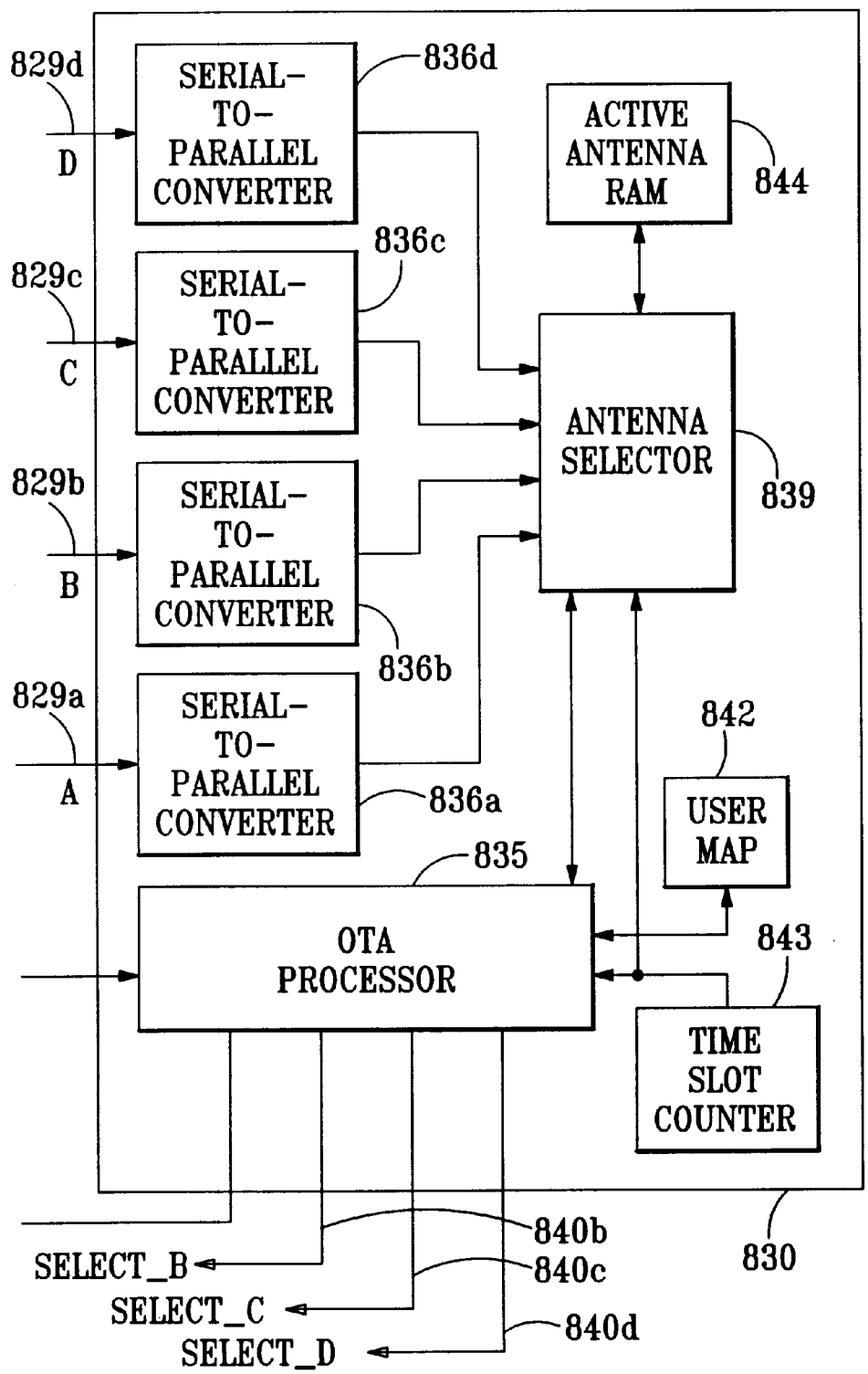
FIG. 8 is a diagram of a portion of a preferred base station receiver showing details of a radio interface unit.

A preferred embodiment of a base station 801 with antenna selection capability is depicted in FIG. 8. In the FIG. 8 embodiment, a plurality of radio units 802a–802d are connected to a diversity controller 830. While four radio units 802a–802d are depicted in FIG. 8, more or fewer radio units may also be used. Each radio unit 802a–802d is connected to an antenna 807. The radio units 802a–802d provide quality metrics to the diversity controller 830, which selects one or more of the radio units 802a–802d (and therefore one or more of the antennas 807) for communication.

Each radio unit 802 comprises a transceiver 803 comprising a transmitter 804 and a receiver 805 (as shown, e.g., with respect to radio unit 802a in FIG. 8, with the other radio units 802b–802d being of similar configuration). The receiver 805 preferably comprises a spread spectrum correlator 806. The transceiver 803 is connected to a radio interface 808. The radio interface 808 comprises a radio interface controller 810. The radio interface controller 810 comprises a radio interface processor 811 and a local RAM controller 812. The radio interface controller 810 is connected to a suitable memory unit such as a dual-port RAM 815. The radio interface controller 810 is also connected to serial registers 816 by way of serial register data lines 822. A serial register clock signal 823 is output from the radio interface controller 810 to the serial registers 816.

The serial registers 816 are connected in a series chain, and have a serial output connected to a multiplexer 826. The radio interface controller 810 also outputs a handset quality signal 824 and a CRC signal 825, which are connected to the multiplexer 826. A select signal 821 is output from the radio interface controller 810 and is connected to the select input of the multiplexer 826.

The multiplexer 826 outputs a serial data signal 829 in response to its inputs and the select signal 821. Each radio unit 802a–802d thereby outputs a corresponding serial data signal 829a–829d, respectively, to the diversity controller 830. Each serial data signal 829a–829d is connected to a corresponding serial-to-parallel converter 836a–836d located at the diversity controller 830. The serial-to-parallel converters 836a–836d are connected to an antenna selector 839. The antenna selector 839 is connected to an active antenna random-access memory (RAM) 844, which keeps track of the current antenna number in use for each time slot 202. The antenna selector 839 is also connected to an over-the-air (OTA) processor 835, which is also connected to the dual-port RAM 815.

The OTA processor 835 is connected to a time slot counter 843 and a user map 842. The user map 842 stores the identity of the user stations 102 assigned to the time slots 202. The antenna selector 839 selects a radio unit 802 (or more than one radio unit 802, if desired) for reception using radio select signals 8401–840d, and the OTA processor 835 processes the information received by the selected radio unit 802. When the OTA processor 835 transmits information, it preferably selects the same antenna as was used to receive the information.

In operation, a transmission from a user station 102 is received substantially simultaneously at all four antennas 807 and is processed in a parallel fashion by the receiver 805 of each radio unit 802. The correlator 806 of each radio unit 802 determines a correlation score with respect to an initial preamble, such as may be sent during preamble interval 235 or 250 shown in FIG. 2, and the correlation score, in a digital format, is sent to the radio interface controller 810. The receiver 805 also calculates the signal strength and the relative stability of the signal envelope (particularly for a continuous phase modulated signal) and passes these values along, in a digital format, to the radio interface controller 810 as well.

In addition to performing the above functions, the receiver 805 also performs a CRC check on the received message and sends the resultant pass/fail indication to the radio interface controller 810. The receiver also locates and parses a handset reception quality indicator (which may be a single bit, or a multi-bit word) embedded in the message sent from the user station 102, and also sends the handset reception quality information to the radio interface controller 810.

The radio interface controller 810 loads the information concerning the correlation score, received signal strength indication, and signal envelope stability into serial registers 816 over serial register data lines 822. The radio interface controller 810 then serially clocks out the data from the serial registers 816 at a rate of, e.g., 5 MHz using serial register clock signal 823. The select signal 821 is set by the radio interface controller 810 so that the multiplexer 826 selects the output from the serial registers 816 to pass to the diversity controller 830. After transmitting the serial register data to the diversity controller 830, the select signal 821, under control of the radio interface controller 810, then selects the handset quality signal 824 and the CRC signal 825 for sending to the diversity controller 830. Incoming data from the user station transmission as received by each radio unit 802 is stored in the dual-port RAM 815 of each radio unit 802.

The serial-to-parallel converter 836 for each radio unit 802 then converts the information sent from each radio unit 802 to a parallel digital format, and passes on the information to the antenna selector 839. The antenna selector 839 determines the best radio unit 802 (and therefore the best antenna 807) to use for communication, according to techniques described in more detail elsewhere herein. The antenna selector 839 selects the desired radio unit 802 through control lines 840a–840d.

A presently preferred format for sending the information from each radio unit 802 to the diversity controller 830 across a serial interface is shown in FIG. 5. As shown in FIG. 5, a quality metrics serial data packet 550 comprises a preamble correlation magnitude value field 551 ("PREAMBLE_MAG") followed by an RSSI difference score field 552 ("RSSI_DIFF"), followed by an RSSI average score field 553 ("RSSI_AVG"). After those three fields 551, 552 and 553, a delay period 554 occurs before an HSQ flag 555 and a CRC flag 556 are sent. In a preferred embodiment, the preamble correlation magnitude value field 551 is 7 bits in length, the RSSI difference score field 552 is 6 bits in length, the RSSI average score field 553 is 6 bits in length, and the HSQ flag 555 and CRC flag 556 are each one bit in length.

The order in which the particular parameters are sent to the diversity controller 830 is influenced in part by the speed with which the various parameters are expected to be available. In the FIG. 5 format, preamble correlation data appearing in the preamble correlation magnitude value field 551 arrives first at the diversity controller 830, while the CRC flag 556 arrives last. Because the calculations which lead to the setting of the HSQ flag 555 and CRC flag 556 generally can be expected to take longer than the calculations needed for the other parameters, they are preferably sent last according to the serial data transfer protocol of FIG. 5.

Serial information sent from the radio units 802a–802d to the diversity controller 830 may be referred to for convenience as a "serial data packet" and generally conform to the format shown in FIG. 5, although in some embodiments the format of the transferred information may differ (e.g., may be sent in a parallel format, or in a different order, or may include different types of information). The various data components of the quality metrics serial data packet 550 of FIG. generally comprise quality metrics used by the diversity controller 830 in selecting an antenna, according to a preferred antenna selection protocol described further hereinafter. The general functions of these data components are first described below.

The HSQ flag 555 in the quality metrics serial data packet 550 is derived from a handset reception quality indicator embedded in the message received from the user station 102.

The general function of the HSQ flag 555 is to indicate whether the user station 102 found the previously selected antenna 807 acceptable for communication, as determined by measuring the signal quality of the base station signal received at the user station 102. While, in theory, the forward link and reverse link of a TDD time slot 202 (as shown in, e.g., FIG. 2) should provide very similar channel characteristics, in some instances the reception quality at the base station 104 will differ markedly from the reception quality at the user station 102. Such a situation may occur, for example, where there is a non-reciprocal communication path between the user station 102 and the base station 104 (such as, e.g., where the user station 102 is in the shadow of a building), or where the selected transmitter 804 at the base station 104 is malfunctioning. In these situations, the base station 104 can receive a relatively clear signal from the user station 102, but the user station 102 may receive a poor quality signal from the base station 104.

The handset reception quality indicator sent by the user station 102 notifies the base station 104 that the user station 102 is not receiving a clear signal. The handset reception quality indicator preferably comprises a single bit in the user message, which is set to an appropriate binary value at the user station 102 if the received signal quality at the user station 102 drops below a threshold signal level. The HSQ flag 555 at the base station 104 is set based upon the content of the handset reception quality indicator received from the user station 102. The HSQ flag 555 notifies the antenna selection system at the base station 104 that the user station 102 is not receiving a clear signal over the previously selected antenna.

The CRC flag 556 in the quality metrics serial data packet 550 reflects whether or not the received signal from the user station 102 passed a cyclic redundancy check. A cyclic redundancy check (CRC) score is internally calculated by each receiver 805, and is determined according to the particular CRC algorithm utilized. A variety of different CRC algorithms are known and commonly employed in the art, and the particular CRC algorithm employed depends in part on the particulars of the overall system and the characteristics of the communication environment in which it is deployed.

The preamble correlation magnitude value field 551 in the quality metrics serial data packet 550 comprises a preamble correlation magnitude value for the receiver 405. The preamble correlation magnitude value indicates the level of correlation by a correlator 806 or matched filter particularly configured to detect a preamble (such as may be sent in preamble interval 235 or 250 shown in FIG. 2) received from the user station 102. In a preferred embodiment, the preamble is 128 chips in length, and the preamble correlation signal is a 7-bit digital signal varying between 0 and 127 (with a possible additional sign bit, if desired). Preferably, the preamble correlation signal is truncated to the most significant 6 bits (effectively dividing it by two) to derive the preamble correlation magnitude value sent as part of the quality metrics serial data packet 550. The preamble correlation magnitude value preferably comprises an unsigned numerical value.

The RSSI difference score field 552 in the quality metrics serial data packet 550 comprises an RSSI difference signal indicating a relative amount of measured amplitude modulation in the received signal. In a preferred embodiment, the received signal is digitized, and variations in amplitude of the received signal are then calculated to arrive at the relative amount of measured amplitude modulation.

The RSSI difference score field 552 is useful for describing the amplitude modulation discrepancies where received signals have been sent using continuous phase modulation (CPM). In some instances, CPM signals have minor amplitude deviations (typically ranging as high as 4 dB) as a by-product inherent in the modulation process. The RSSI difference signal is a 6-bit value representing a quantized measurement of the amplitude modulation, which information is transferred to the diversity controller 830 in the RSSI difference score field 552 of the quality metrics serial data packet 550.

The RSSI average score field 553 in the quality metrics serial data packet 550 comprises an average received signal strength indication (RSSI average score) for a particular radio unit 802. The RSSI average score is preferably derived from the same digitized signal used in deriving the RSSI difference signal, and comprises a calculation of the strength (i.e., amplitude) of the received signal taken over a representative time window. The RSSI average score is quantized in such a way that the maximum possible RSSI average score equals the maximum possible digital value in the RSSI average score field 853 (i.e., 63 for a 6-bit field).

In a preferred embodiment, the diversity controller 830 selects an antenna 807 according to decision principles appearing in the flow/process diagram of FIG. 9. For the purposes of the description herein, the selection of an "antenna" is equivalent to the selection of its corresponding "radio unit," and vice versa, because (in a preferred embodiment) each antenna 807 is connected to a single corresponding radio unit 802.

The actual steps and processes shown in FIG. 9 may be implemented in any of a variety of manners—for example, by a state machine or through software instructions for a microprocessor. A preferred means for implementing the decision principles of the FIG. 9 flow/process diagram is explained later with respect to FIGS. 10A and 10B.

At the start of the FIG. 9 process, the diversity controller 830 is assumed to have received, from each functioning radio unit 802, the information in quality metrics serial data packet 550 (described previously herein). Also at the start of the FIG. 9 process, the diversity controller 830 retrieves the active (i.e., current) antenna number for the current time slot 202 from the active antenna RAM 844.

According to the FIG. 9 process flow, the antenna selector 839 determines in step 902 whether any of the radio units 802a–802d returned a good CRC. The antenna selector 839 does this by examining the value of the CRC flag 556 for each radio unit 802a–802d. If the CRC flag 556 is set (i.e., is true) for a given radio unit 802, then that radio unit 802 passed its cyclic redundancy check. If the CRC flag 556 is not set (i.e., is false), then the cyclic redundancy check for that particular radio unit 802 failed.

If only one of the radio units 802a–802d returned a good CRC, then the process continues with step 916, wherein the diversity controller 830 stores the antenna number for the radio unit 802 returning the good CRC in the active antenna RAM 844. If multiple radio units 802a–802d returned a good CRC, then, in a preferred embodiment, the diversity controller 830 moves to step 907 and selects a single antenna 807 for communication based on a comparison of the information received from the different radio units 802a–802d. In conjunction with step 907, the diversity controller 830 derives a score for each antenna 807, according to a preferred scoring process such as that described later with respect to FIG. 10A, and compares them.

If there is a single high antenna score, then in step 908 the antenna selector 839 selects the antenna 807 with the high score and stores its antenna number in the active antenna RAM 844. If there are two or more antennas 807 with the same high score, then the process proceeds to step 912, wherein the antenna selector 839 determines whether the previously active antenna for the time slot 202 (indicated by the active antenna number retrieved from the active antenna RAM 844) was one of the antennas 807 assigned a high score. If so, the process moves to step 916, wherein the same antenna 807 is selected and its antenna number stored in the active antenna RAM 844.

If the antenna 807 used previously in the particular time slot 202 does not have the high antenna score, then the process moves to the logic loop of steps 913 and 914, wherein the process cycles through the antenna scores of the other antennas 807 sequentially until the first antenna 807 is found having the high antenna score. Accordingly, in step 913 the antenna number is incremented, starting from the active antenna number retrieved from the active antenna RAM 844. So long as no match with the high antenna score is found, as tested in step 914, and so long as no abort condition is declared (such as may occur when all antennas have been cycled through), the process continues to loop back to step 913 and increment the antenna number. When an antenna 807 is found having the high antenna score, or when all of the antennas have been cycled through, the process moves to step 916, wherein the antenna 807 with the high antenna score is selected for communication, and its antenna number stored in the active antenna RAM 844.

If, as tested in step 902, none of the radio units 802a–802d returned a good CRC, then the process of FIG. 9 moves instead to the loop of steps 904 and 905, wherein the process cycles through each of the antennas 807 sequentially until an enabled radio unit 802 is found or, if no enabled radio unit 802 is found, an abort condition is declared. An "enabled" radio unit 802 is one over which the base station 104 is permitted to transmit and receive signals. In some cases, a base station 104 may not be configured with all of the antennas (and associated electronics) it is capable of handling, or the base station 104 may be receiving consistently poor data over a certain antenna 807 and/or radio unit 802 (such as where a receiver is damaged or faulty), or the base station 104 may be undergoing a remote test or diagnostic of certain specific antenna(s) 807. In these situations, the base station 104 may disregard, or be instructed to disregard (under command of a network management unit), a particular antenna or group of antennas 807, which are thereafter considered "invalid" or "non-enabled" until the base station 104 determines, or is instructed, otherwise.

To cycle through the radio units 802a–802d, in step 904 the antenna selector 839 increments the antenna number, starting from the active antenna number retrieved from the active antenna RAM 844. So long as no enabled radio unit 802 is found, as tested at step 905, the process loops back to step 904 and increments the antenna number. If an enabled radio unit 802 is found, the process moves to step 916, wherein the antenna 807 is selected and its antenna number stored in the active antenna RAM 844. If, after cycling through all of the radio units 802a–802d, no enabled radio unit 802 is found, then an abort condition is declared, and the process continues with step 916.

By incrementing the antenna number when none of the radio units 802 have returned a good CRC, the user station 102 is thereby given an opportunity to evaluate each of the antennas 807. After cycling through all of the antennas 807, enough data regarding the quality of the communication link can be evaluated so that an antenna 807 can be chosen, despite the failure of any of the radio units 802 to return a good CRC.

The steps of the FIG. 9 process, as mentioned, can be carried out using software under the control of a microprocessor, or by using a state machine or combinatorial logic. In a preferred embodiment, an antenna scoring process is carried out independently for each (enabled) antenna 807 according to the calculation processing diagram of FIG. 10A, and the antenna is selected according to the processing diagram of FIG. 10B using the antenna scores derived from the FIG. 10A process.

The antenna scoring process of FIG. 10A is preferably carried out for each enabled radio unit 802, and utilizes the information received in the quality metrics serial data packet 550 (see FIG. 5) sent from each radio unit 802, as explained previously herein. Such information includes the preamble correlation magnitude score, the RSSI difference score, the RSSI average score, the CRC flag value and the HSQ flag value. The FIG. 10A process, as described below, ultimately results in an antenna score 979 for each radio unit 802a–802d. The score for the $n^{th}$ radio unit 802 is denoted in FIG. 10A as score (n).

As shown in FIG. 10A, the antenna score 979 comprises a base antenna score 977 modified by an antenna score modifier 958, which in a preferred embodiment is subtracted from the base antenna score 977 at summing node 978. The base antenna score 977 comprises the sum of three different scores: a radio enable score 970, a CRC good score 971, and a preamble magnitude score 975. In a preferred embodiment, the radio enable score 970, CRC good score 971, and preamble magnitude score 975 each have a maximum value chosen so as to weight their relative importance in the antenna selection algorithm.

In a preferred embodiment, the radio enabled score 970 is set to 128 if the radio unit 802 is enabled. If the radio unit 802 is not enabled, the radio enabled score 970 is set to zero, and the antenna score 979 is also forced to zero. The value of the radio enable score is chosen high enough so that an enabled radio unit 802 will always have a higher score than a non-enabled radio unit 802, in that no combination of other scores and modifiers can exceed the maximum radio enabled score 970 (i.e., cannot sum to a total equal to or greater than 128). The antenna selector 839 will accordingly always first consider selecting an enabled radio unit 802 before cycling through to determine which radio units 802 are enabled or non-enabled.

In a preferred embodiment, the value of the CRC good score 971 is set to 64 if a good CRC was returned by the radio unit 802, or else is set to zero. By having a maximum value of 64, the CRC good score 971 is weighted second in importance in the antenna selection algorithm, after the radio enabled score 970 (which has a maximum score of 128).

In a preferred embodiment, the value of the preamble magnitude score 975 varies from between 0 and 63. The preamble magnitude score 975 comprises a correlation score, divided by two, for a 128-chip preamble as received by correlator 806 in the receiver 805 (shown in FIG. 8). Dividing the preamble correlation score by two effectively limits the range of the preamble magnitude score 975 to between 0 and 63, so that the preamble magnitude score 975 cannot exceed the CRC good score 971, and is thereby weighted third in importance in the antenna selection algorithm of FIG. 10A. A divide-by-two function block 974 is shown in FIG. 10A receiving a 7-bit correlation score 973 as derived by the correlator 806, and may, for example, expediently perform the divide-by-two operation by shifting the 7-bit correlation score 973 to the right by one bit (or, alternatively, by taking the six most significant bits of the correlation score 973).

The base antenna score 977 varies over a range of between 0 and 255 for a given antenna 807, based on the values of the radio enabled score 970, the CRC good score 971, and the preamble magnitude score 975. The base antenna score 977 is also adjusted by certain modifiers based on the RSSI difference signal, the RSSI average signal, and the HSQ flag, as explained in more detail below.

In a preferred embodiment, if the user station 102 received a poor quality signal over the previously used antenna 807 (as indicated by the value of the HSQ flag 555 of FIG. 5), then the antenna selection algorithm makes adjustment by applying a handset quality (HSQ) adjustment value 948 to the antenna score. According to the FIG. 10A diagram, the antenna number of the previously used antenna is stored in the active antenna RAM 965 and is read out by applying the current time slot number 963 as an address to the active antenna RAM 965. The antenna number of the previously used antenna is then compared against the current antenna number 964 using XOR gate 966, which outputs a TRUE (e.g., "1" or "HIGH") signal over line 967 if there is a match. A match indicates that the current antenna is the same as the antenna used previously.

If the "current" antenna (as indicated by the current antenna number 964) is the same as the antenna used previously, then the antenna selection process makes adjustment depending on the value of the HSQ flag 555. (If not, then the HSQ flag 555 has no relevance to the current antenna). If a good CRC was returned, then the content of the HSQ flag 555 is considered valid. As detailed in FIG. 10A, if the CRC good flag 556 is set and the HSQ flag 555 is not set, then CRC signal 960 will have a high (i.e., TRUE) signal value and HSQ signal 959 will have a low (i.e., FALSE) signal value, so that AND gate 961 outputs a high signal value. If AND gate 961 outputs a high signal value, and XOR gate 966 indicates that the previously used antenna (as read out from the active antenna RAM 965) is the same as the current antenna, then AND gate 968 outputs a high signal value, indicating that a HSQ adjustment score will be applied to the base antenna score 977.

If, however, the CRC flag 556 is not set to TRUE, then the CRC failed and the HSQ flag 555 is not considered reliable enough to apply a HSQ adjustment score 948. Similarly, if the HSQ flag 555 is not set, then AND gate 961 outputs a low signal value and the HSQ adjustment score 948 is not applied.

The HSQ adjustment score 948 is applied by provision of the outputs of AND gate 968 as a select signal 969 to a multiplexer 949. If the output of AND gate 968 is high, then the HSQ adjustment score 948 is output from multiplexer 949. If the output of AND gate 968 is low, then an HSQ zero adjustment score 947 is output from multiplexer 949. Multiplexer 949 outputs a final HSQ adjustment score signal 950, which takes on one of the two values of the HSQ adjustment score 948, or the HSQ zero adjustment score 949.

The final HSQ adjustment score signal 950 output from multiplexer 949 is connected to a summing node 951. Summing node 951 adds the value of the final HSQ adjustment score signal 950 to any additional modifiers as derived from the RSSI difference score sent in the RSSI difference score field 552 of the quality metrics serial data packet 550 (see FIG. 5), and from the RSSI average score sent in the RSSI average score field 553 of quality metrics serial data packet 550. As noted previously herein, the RSSI difference score is a 6-bit value representing a quantized measurement of the amplitude modulation, and the RSSI average score comprises an average received signal strength indication for the radio unit 802 sending the quality metrics serial data packet 550.

If the RSSI difference score 935 exceeds an RSSI difference threshold 936, as determined by comparator 937, then an RSSI difference adjustment value is output from multiplexer 932 by appropriate setting of selection signal 938 based on the output of comparator 937. If, on the other hand, the RSSI difference score 935 does not exceed the RSSI difference threshold 936, then selection signal 938 is set such that an RSSI difference zero score 930 is output from multiplexer 932.

The output of multiplexer 932 is connected to a summing node 940. The RSSI average score 942 is inverted by inverter 943 and is also connected to summing node 940. Summing node 940 combines its inputs and has an output 946 connected to summing node 951. Summing node 951 combines its inputs, thereby combining adjustments based on the HSQ signal 959, RSSI average score 942, and RSSI difference score 935. The total adjustment value signal 952 is converted to a negative number by conversion function block 953, and is stored in a storage register 955. If the radio unit 802 is not enabled, as indicated by radio enable signal 957, then the storage register 955 is reset so that a value of zero is passed over storage register output lines 958 (representing an antenna score modifier) to summing node 978. If, on the other hand, the radio unit 802 is enabled, then the output of conversion function block 953 is stored in storage register 955 and then applied to summing node 978. Summing node 978 combines the base antenna score 977 with the antenna score modifier 958 output from storage register 955 to arrive at a final antenna score 979.

Figure 10B:
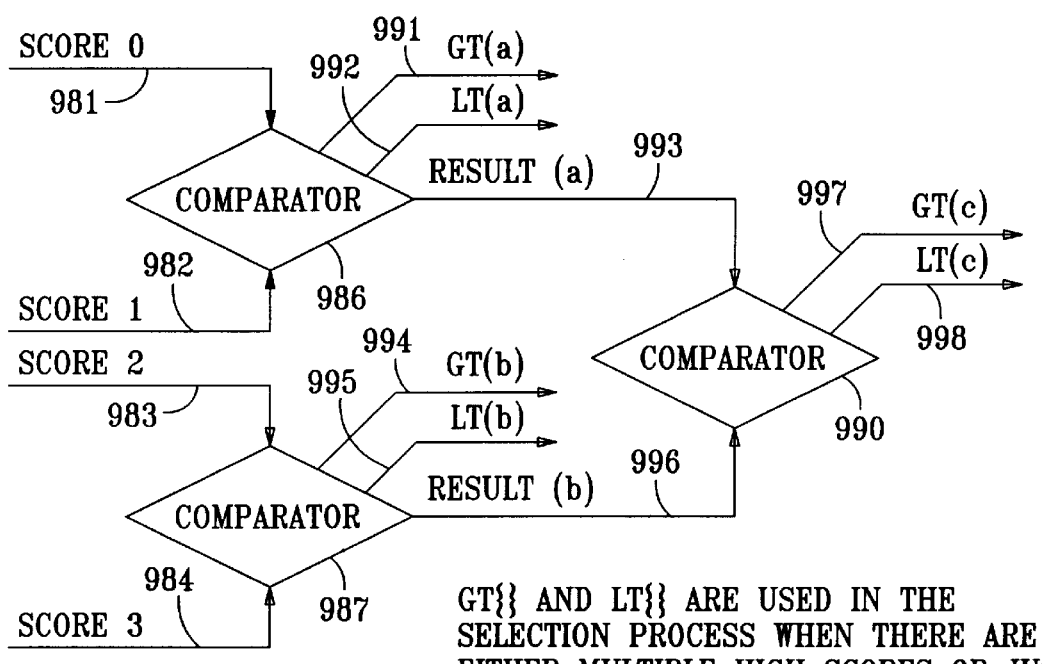
FIG. 10B is a logic diagram for selecting an antenna based on the scores derived in FIG. 10A.

In a presently preferred embodiment, the antenna scoring process of FIG. 10A is carried out by the antenna selector 839 after receipt of the quality metrics from the radio units 802. In an alternative embodiment, the antenna scoring process of FIG. 10A is carried out independently at each radio unit 802a–802d, and a final antenna score for each antenna 807 is sent directly to the antenna selector 839, which then applies the selection logic of FIG. 10B to select an antenna for communication.

The following pseudo-code illustrates a preferred implementation of an antenna scoring process in accordance with the process shown in FIG. 10A, and is carried out separately for each antenna:

```
Score = 0;
Score Adjustment = 0;
    /*
    *   Calculate Base Good Number
    */
if (radio is enabled)
        then Score = Score + 128
if (radio is enabled) and (CRC is good)
        then Score = Score + 64
if (radio is enabled)
        then Score = Score + (PA Magnitude / 2);
    /*
    *   Calculate Score Adjustment(s)
    */
    /*
    *   RSSI Difference Score Adjustment
    */
if (RSSI Difference Value < RSSI Difference Threshold)
    then
        Score Adjustment = Score Adjustment + RSSI
```

-continued

```
Difference Zero Value
    else
        Score Adjustment = Score Adjustment + RSSI
Difference Adjustment Value;
    /*
    *       RSSI Average Score Adjustment
    */
Score Adjustment = Score Adjustment + (MAX RSSI Average
Value – RSSI Average Value);
    /*
    *       RSSI Hand Set Quality (HSQ) Score Adjustment
    */
if ((last antenna used = current antenna) and (CRC is good
and HSQ bit is bad))
    then
        Score Adjustment = Score Adjustment + HSQ
Adjustment value
    else
        Score Adjustment = Score Adjustment + HSQ Zero
value;
    /*
    *       Final Scoring
    */
if (radio is enabled)
    then
        Score = Score – Score Adjustment;
    else
        Score = 0
```

According to the above pseudo-code, the following steps occur. First, the variables "Score" and "Score Adjustment" are initialized to zero. The variable "Score" generally serves the purpose of both the base antenna score 977 and the final antenna score 979 shown in FIG. 10A, and the variable "Score Adjustment" is generally analogous to the antenna score modifier 958 shown in FIG. 10A.

Next, if the radio unit 802 is enabled, then Score is incremented by 128. This step ensures that only enabled radio units 802 will be selected for communication. As noted previously, because no score adjustments can yield a score greater than 128 without the radio unit 802 being enabled, only enabled radio units 802 will have a score exceeding 128. If there is only one enabled radio unit 802, then it will be the only radio unit 802 having a score exceeding 128, and it will automatically be selected. If none of the radio units 802 are enabled, then none of the scores will be above 128.

Next, if the radio unit 802 is enabled and the cyclic redundancy check has been passed (i.e., the CRC is good), then Score is incremented by 64. Next, if the radio unit 802 is enabled, then Score is incremented by half of the preamble correlation magnitude value (i.e., Score is incremented by a value of between 0 and 63).

Next, adjustments are made to the Score based on the other quality metrics, including the RSSI average value, the RSSI difference value, and the HSQ flag value. If the RSSI difference value is less than an RSSI difference threshold, then Score Adjustment is incremented by an RSSI Difference Zero Value. If not, then the amplitude modulation of the received signal is considered to be relatively high (generally undesirable for a CPM signal), and so Score Adjustment is instead incremented by an RSSI Difference Adjustment Value. Because the Score Adjustment is later to be subtracted from the Score value, the RSSI Difference Adjustment Value is preferably higher than the RSSI Difference Zero Value. The exact value of these parameters depends on the characteristics of the specific system.

Next, Score Adjustment is incremented by a variable amount depending upon the RSSI average value. A difference between the maximum RSSI value and the RSSI average value received from the current radio unit 802 is determined, and the difference is added to Score Adjustment. Thus, if the RSSI average value received from the current radio unit 802 equals the maximum RSSI value (i.e., has the strongest possible signal strength), then the difference between the two is zero, and no change is made to Score Adjustment.

Next, if the quality metrics serial data packet 550 was received from the radio unit 802 used to send the last message to the user station 102, and the CRC is good (indicating that the received data including the HSQ flag 555 is presumed valid) but the HSQ flag 555 is set to false (indicating that the user station 102 received a poor quality transmission), then Score Adjustment is incremented by an HSQ Adjustment Value. Otherwise, Score Adjustment is incremented by an HSQ Zero Value.

To arrive at a final antenna score, Score Adjustment is subtracted from Score, if the radio is enabled. If the radio is not enabled, Score is set to zero. An antenna score is preferably derived in the above manner for each of the radio units 802 of the base station 104, and thus for each of the antennas 807.

Once the antenna scores have been derived, the "best" antenna 807 is selected. In a preferred embodiment wherein the FIG. 10A scoring process is employed, the best antenna 807 is selected by selecting the antenna 807 having the highest antenna score. A preferred means for selecting the antenna 807 having the highest antenna score is depicted in FIG. 10B. In FIG. 10B, a plurality of antenna scores 981, 982, 983 and 984 are shown, each antenna score 981, 982, 983 and 984 associated with a different radio unit 802a, 802b, 802c and 802d, respectively. Antenna scores 981 and 982 are compared by comparator 986, which outputs a greater-than flag 991 ("GT(a)"), a less-than flag 992 ("LT(a)"), and a result value 993 ("Result (a)"). The greater-than flag 991 and less-than flag 992 indicate which of the two antenna scores 981 and 982 is larger and which is smaller, and the result value 993 is the larger of the two antenna scores 981 and 982.

Similarly, antenna scores 983 and 984 are compared by comparator 987, which outputs a greater-than flag 994 ("GT(b)"), a less-than flag 995 ("LT(b)"), and a result value 996 ("Result (b)"). The greater-than flag 994 and less-than flag 995 indicate which of the two antenna scores 983 and 984 is larger and which is smaller, and the result value 996 is the larger of the two antenna scores 983 and 984.

The two result values 993 and 996 are connected to another comparator 990, which compares the two result values 993 and 996 and outputs a greater-than flag 997 ("GT(c)") and a less-than flag 998 ("LT(c)"). The greater-than flag 997 and less-than flag 998 indicate which of the two result values 993 and 996 is larger and which is smaller.

Based on the value of the greater-than flags 991, 994 and 997 and the less-than flags 992, 995 and 998, the antenna selector 839 has enough information to determine which antenna has the highest score, and the antenna 807 with the highest score is then selected for communication.

A preferred receiver and antenna selection system 1501 (generally corresponding to one or more aspects of diversity controller 830 in FIG. 8) which may utilize the antenna scoring and selection features depicted in FIGS. 10A and 10B is shown in FIG. 14. In the receiver and antenna selection system 1501 of FIG. 14, serial data lines 1518 from a plurality of radio units (such as radio units 802 if FIG. 8) are connected to a serial-to-parallel conversion block 1503. Serial data lines 1518 transfer information from the radio units in a format such as that shown, for example, in the quality metrics serial data packet 550 of FIG. 5. While four serial data lines 1518 are shown in FIG. 14, additional serial data lines can also be added, one serial data line for each radio unit.

The serial-to-parallel conversion block 1503 converts the quality metrics information into data words to be used by an antenna scoring block 1504 connected to the serial-to-parallel conversion block 1503. The data words are preferably separated into the constituent components of the quality metrics serial data packet—i.e., an RSSI difference value, an RSSI average value, a preamble correlation magnitude value, a handset reception quality (HSQ) value, and a CRC pass/fail flag. The antenna scoring block 1504 receives the data words and determines an antenna score for each radio unit in accordance, for example, with the process shown in FIG. 10A. The antenna scoring block 1504 outputs a plurality of antenna scores to antenna score comparison block 1507.

Antenna score comparison block 1507 compares the antenna scores against one another in a manner as described, for example, with respect to the process shown in FIG. 10B. Antenna score comparison block 1507 preferably outputs a plurality of boolean signals to logic block 1509. The boolean signals output from antenna score comparison block 1507 indicate various relationships among the antenna scores, and preferably comprise at least the same signals 991, 992, 994, 995, 997 and 998 output from FIG. 10B. The logic block 1509 derives a series of logic-level signals for use by an antenna select state machine 1513, which selects an antenna based thereon.

In a preferred embodiment, the antenna select state machine 1513 is connected to an active antenna RAM 1512 and accesses the antenna number for the current time slot 202 from the active antenna RAM 1512. The antenna select state machine 1513 utilizes a next antenna signal 1516 connected to the logic block 1509 which facilitates the transfer of antenna comparison data to the antenna select state machine 1513. In particular, the antenna select state machine may use the next antenna signal 1516 to cycle through the antennas until the antenna is found having the highest score. A select antenna signal 1517 is output from the antenna select state machine when an antenna has been selected.

While the FIG. 14 embodiment is configured to receive serial data from the radio units of serial data lines 1518, there is no particular requirement that the data from the radio units be transferred in a serial format. Each radio unit could output data words in a parallel format directly to the antenna scoring block 1504. Using a serial data format for transferring the quality metrics information may, in some instances, reduce the number of connections needed between the radio units and the antenna selection hardware, or provide other advantages.

Figures 12A, 12B, 13:
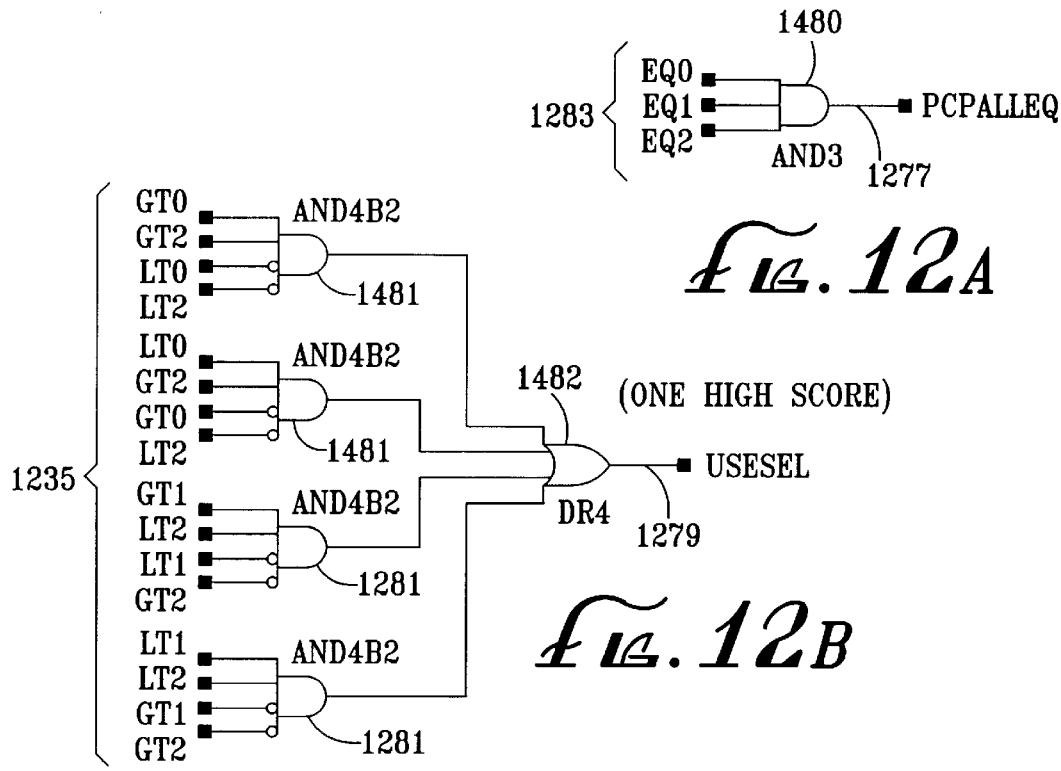
FIGS. 12A–12U are circuit schematic diagrams of a preferred antenna diversity controller.
FIG. 13 is a truth table associated with the circuit schematics of FIGS. 12A–12U.
Figure 12E:
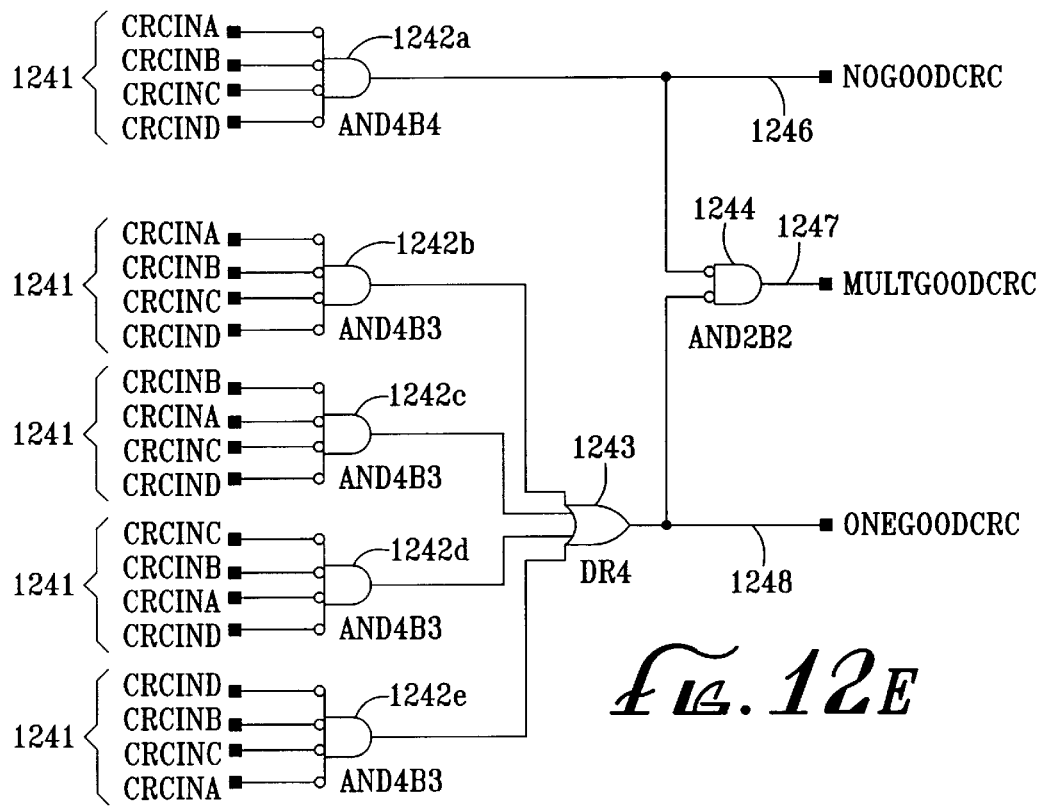
Figure 12F:
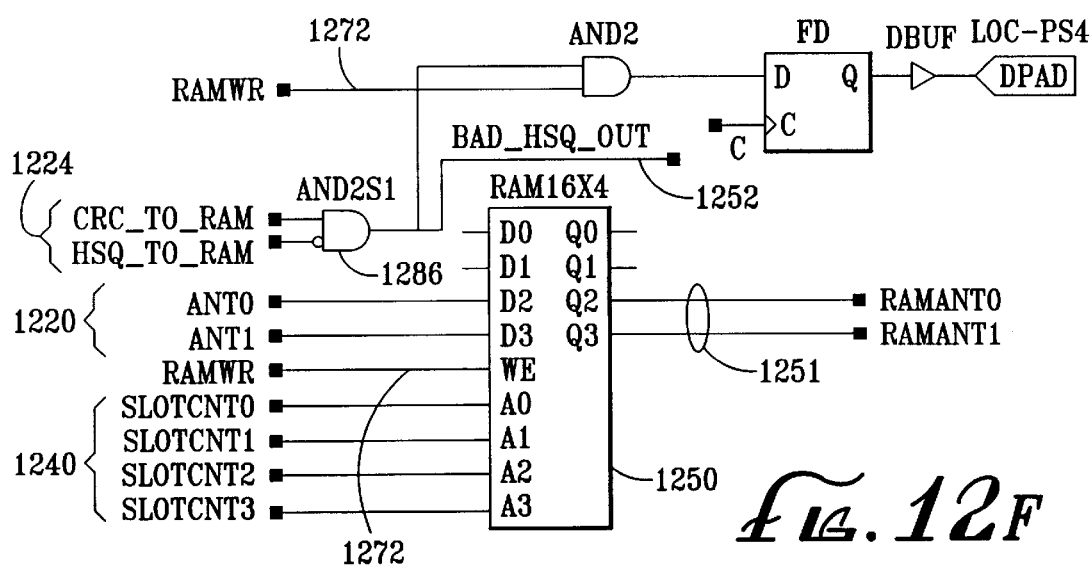
Figures 2, 12G:
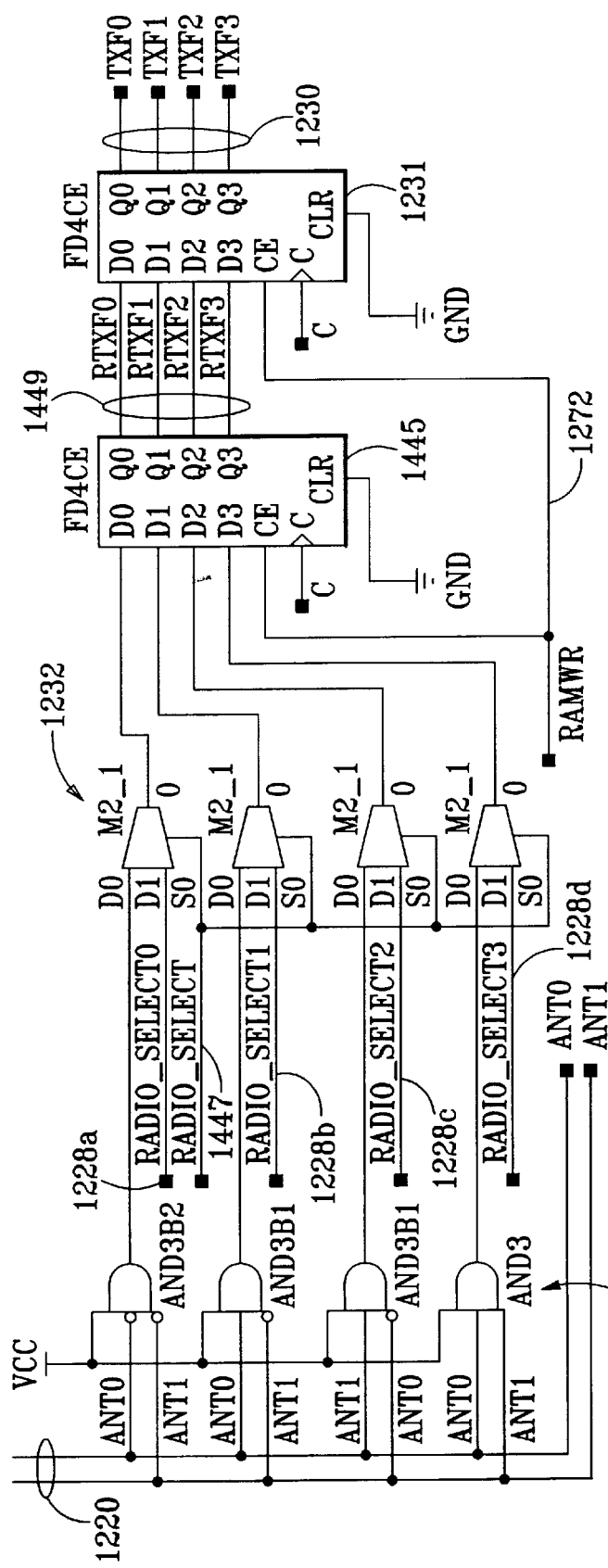
Figure 12H:
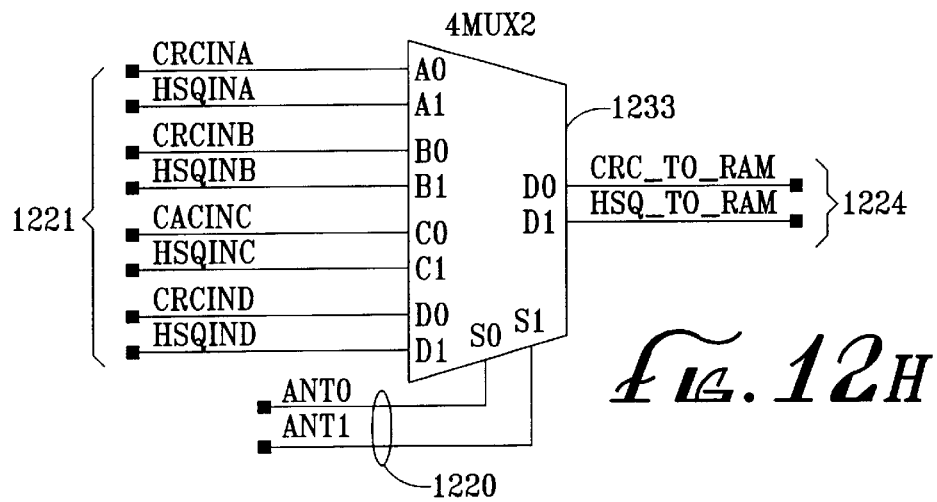
Figure 12I:
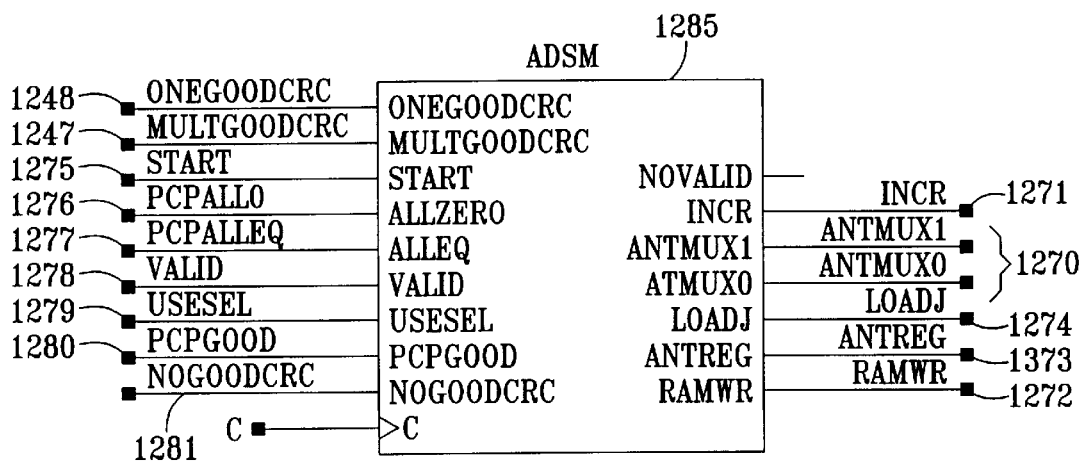
Figure 12J:
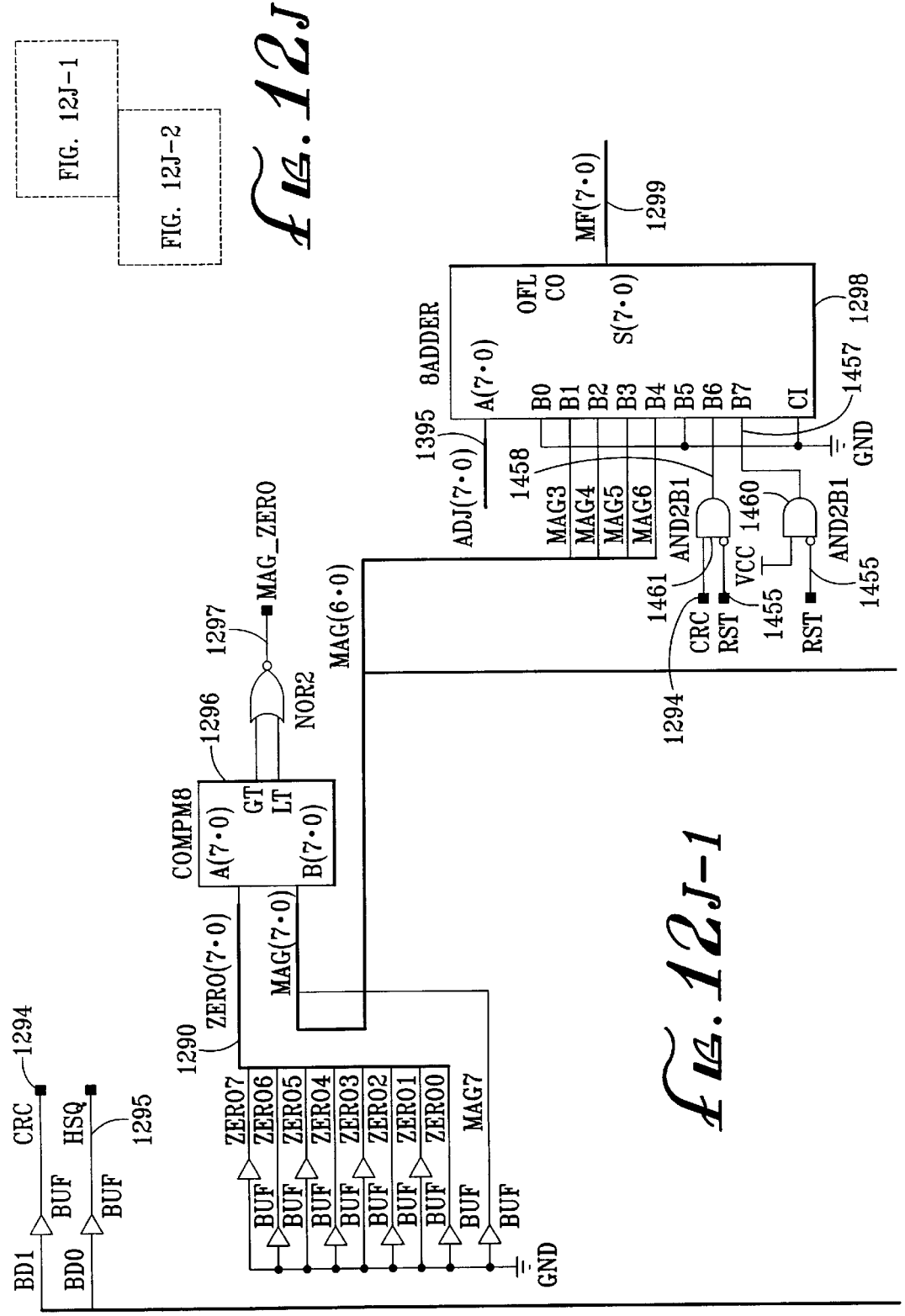
Figures 2, 12J:
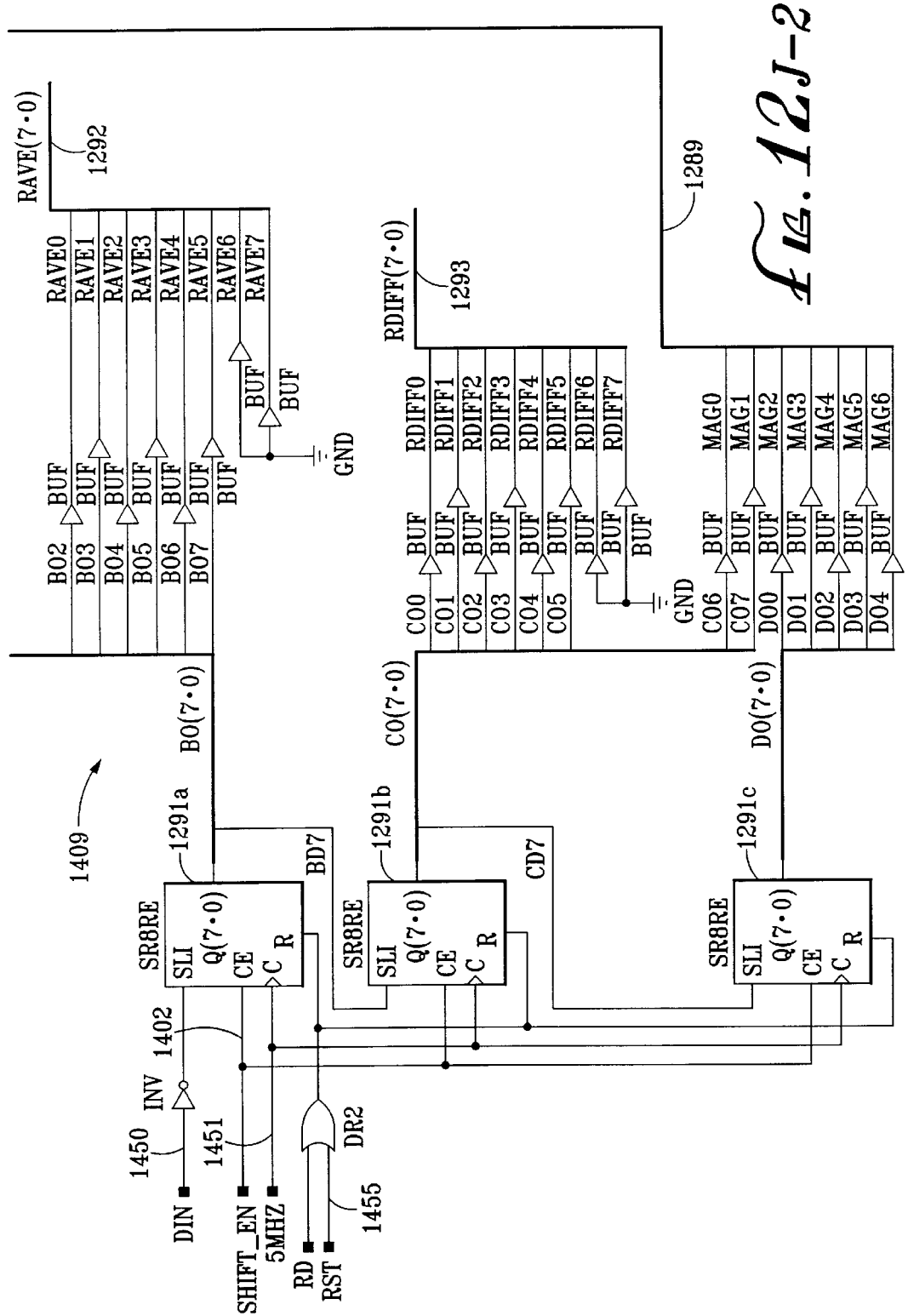
Figures 1, 12K:
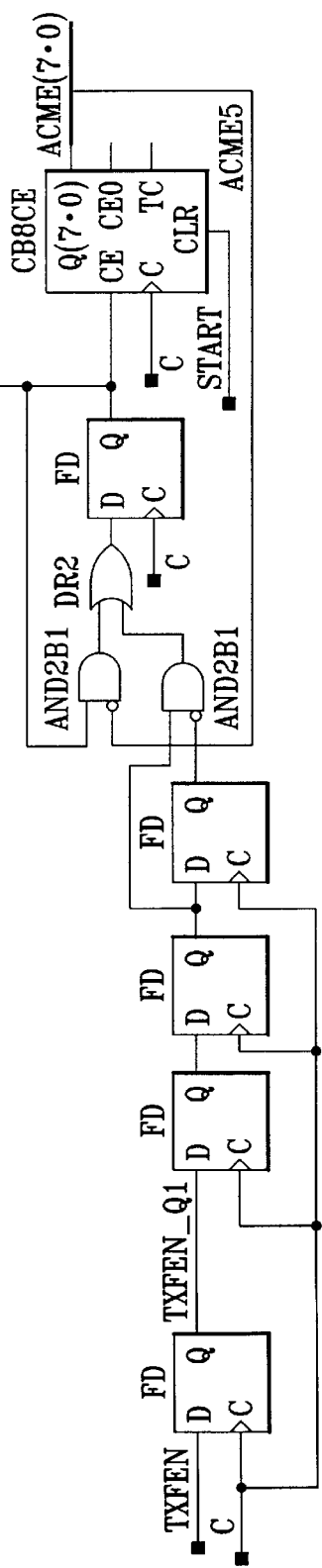
Figures 2, 12K:
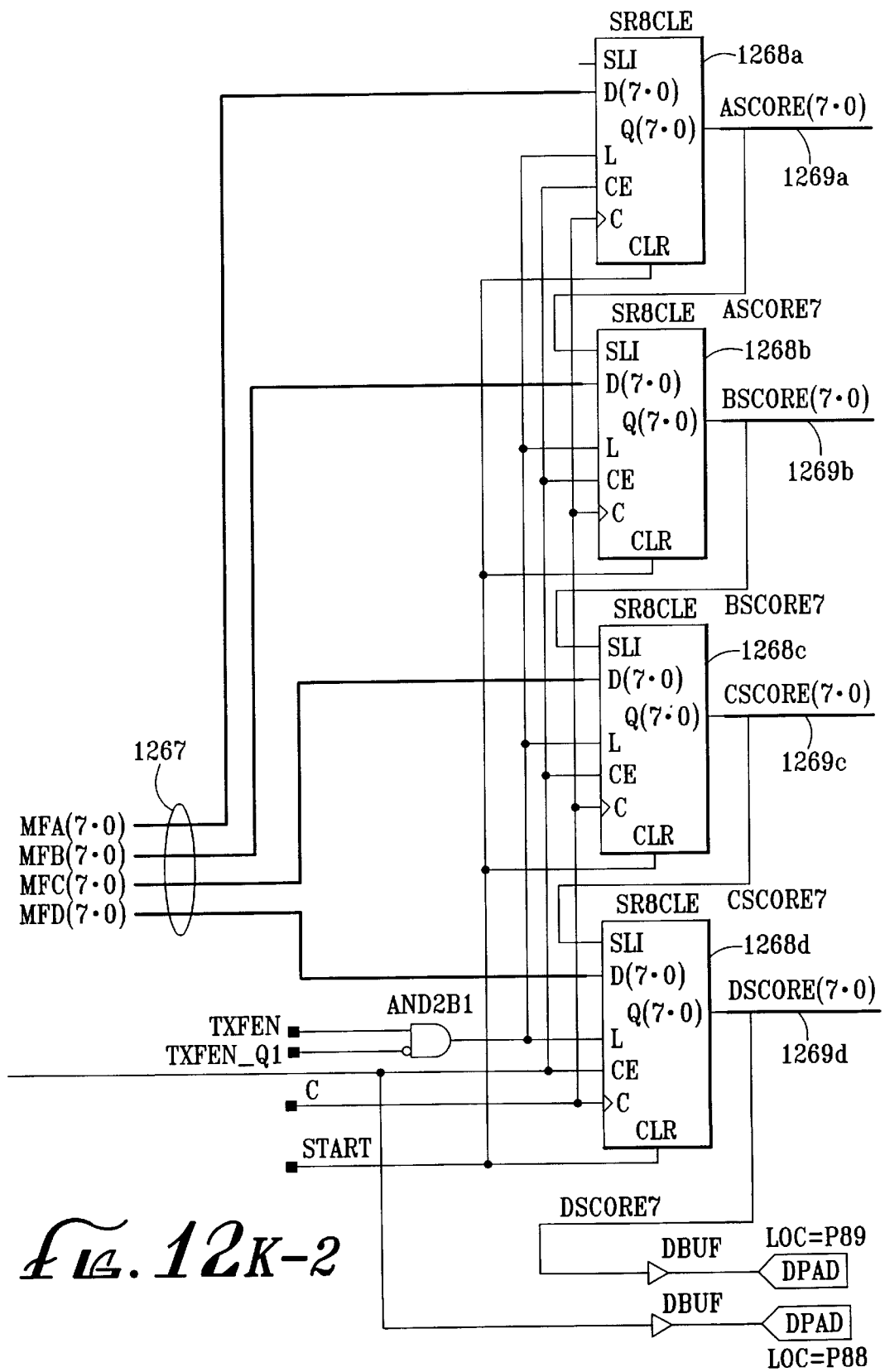
Figures 1, 12M:
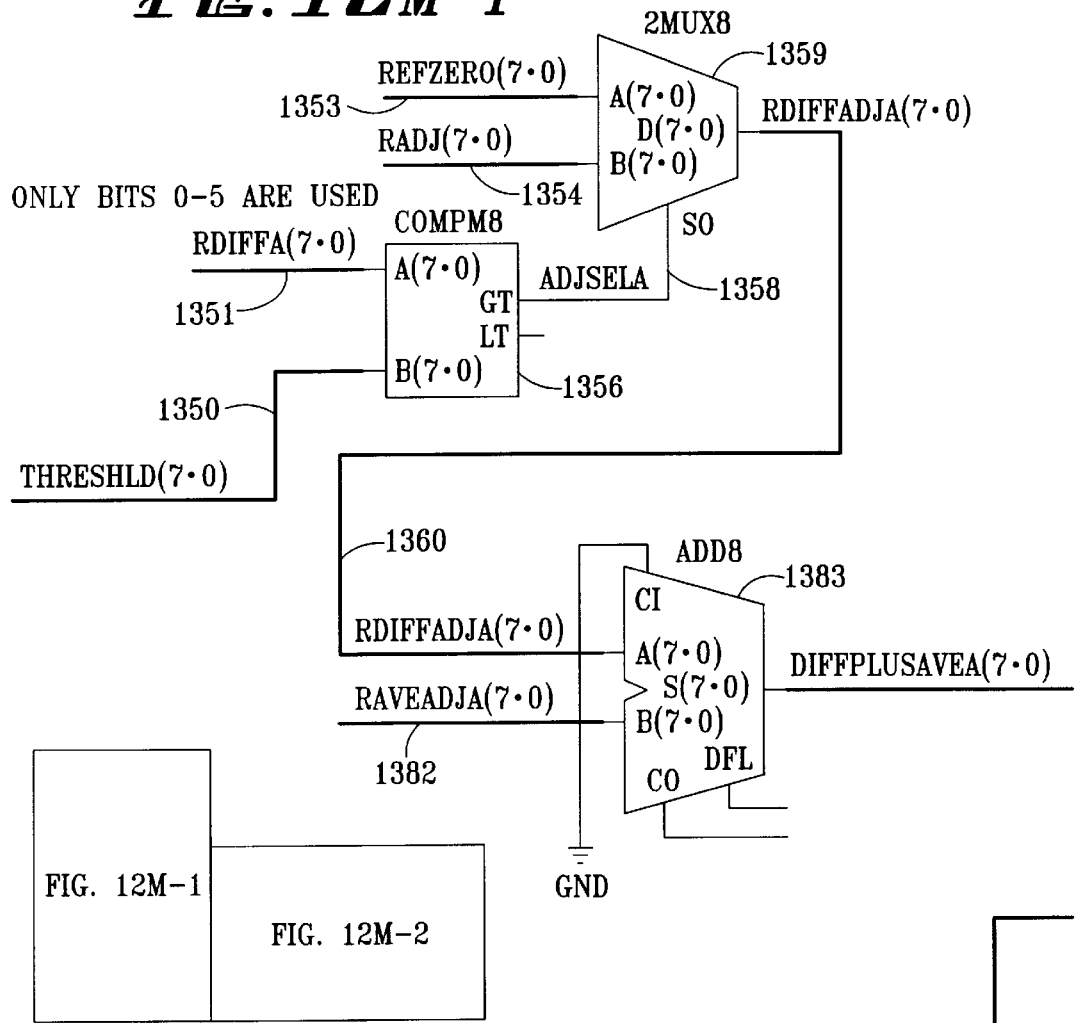
Figure 12M:
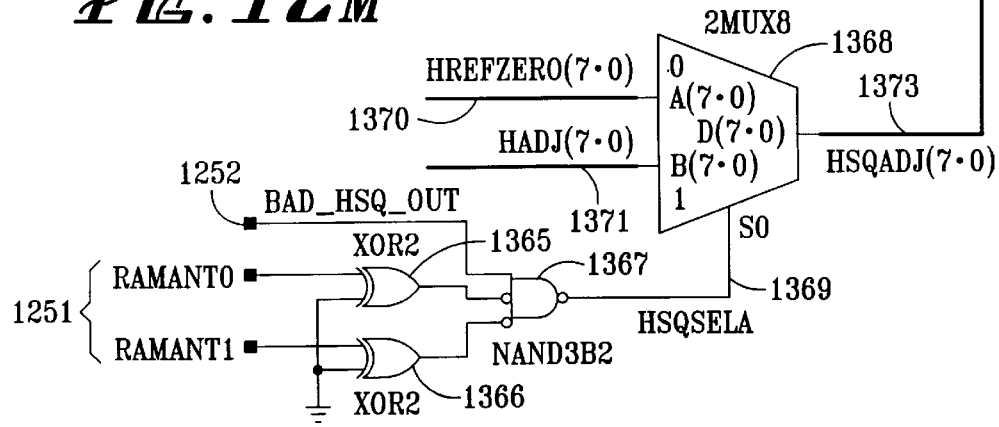
Figures 2, 12M:
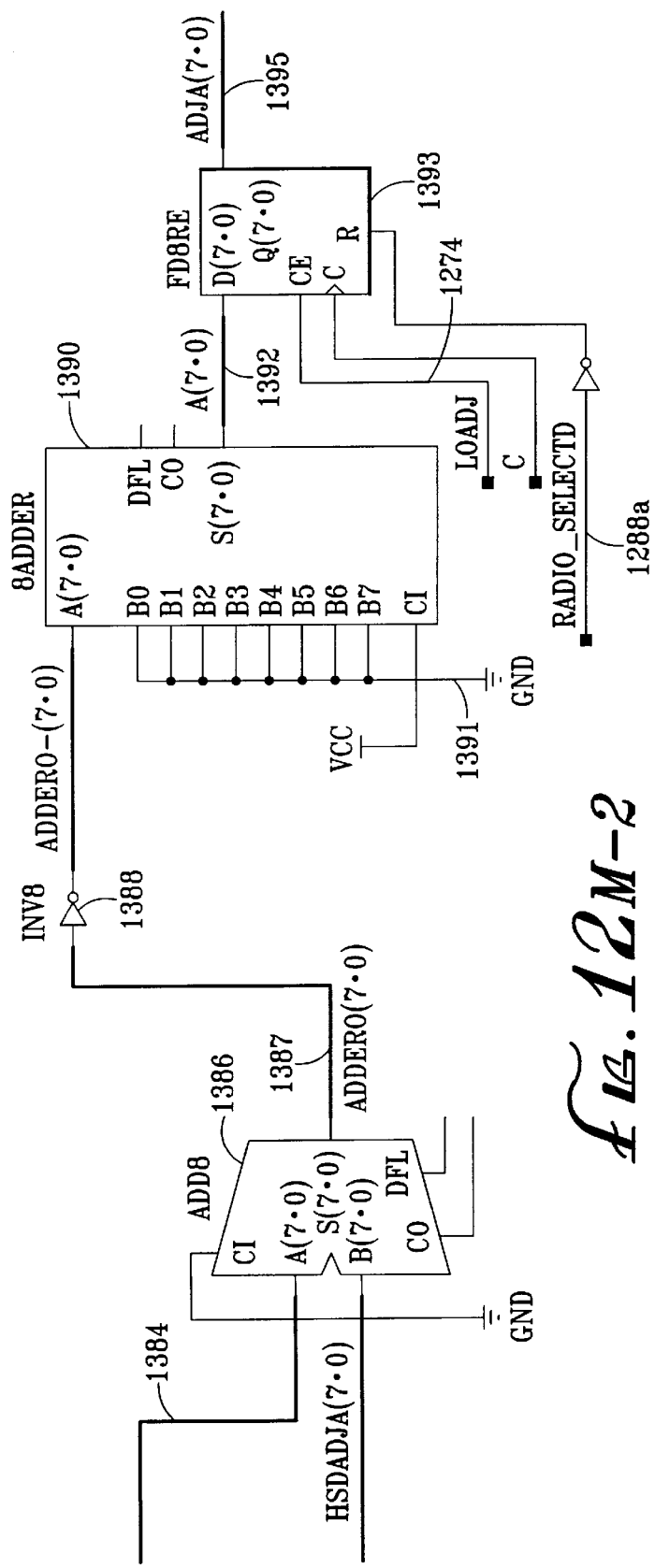
Figure 12P:
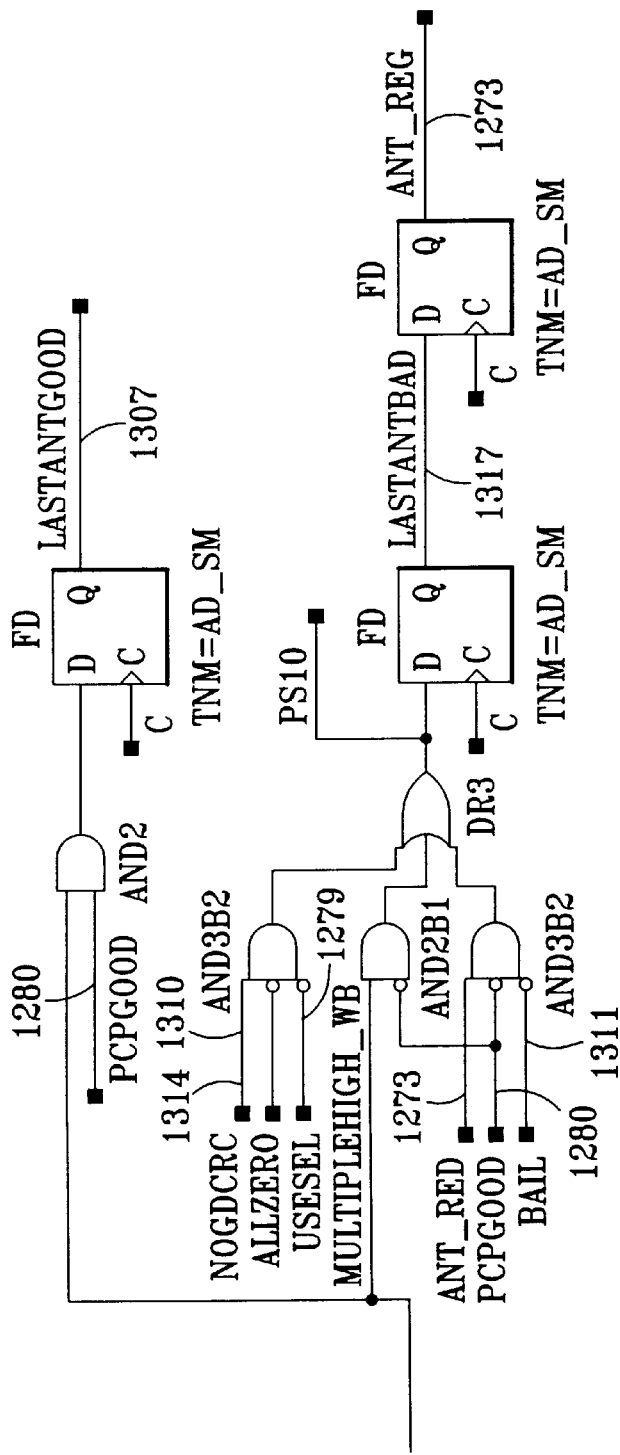
Figure 2:
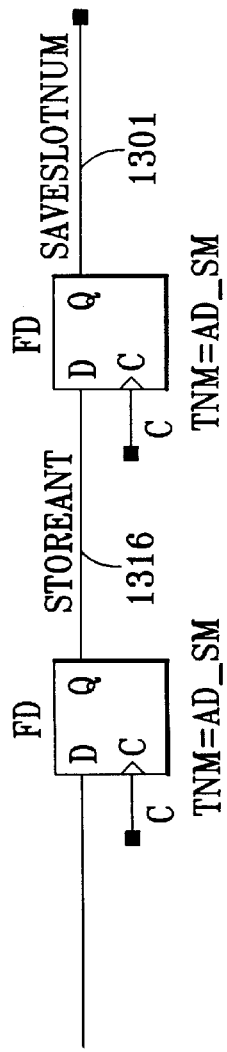
Figure 12Q:
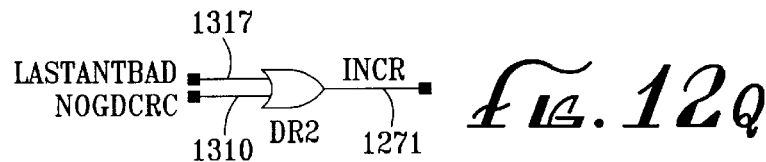
Figure 12R:
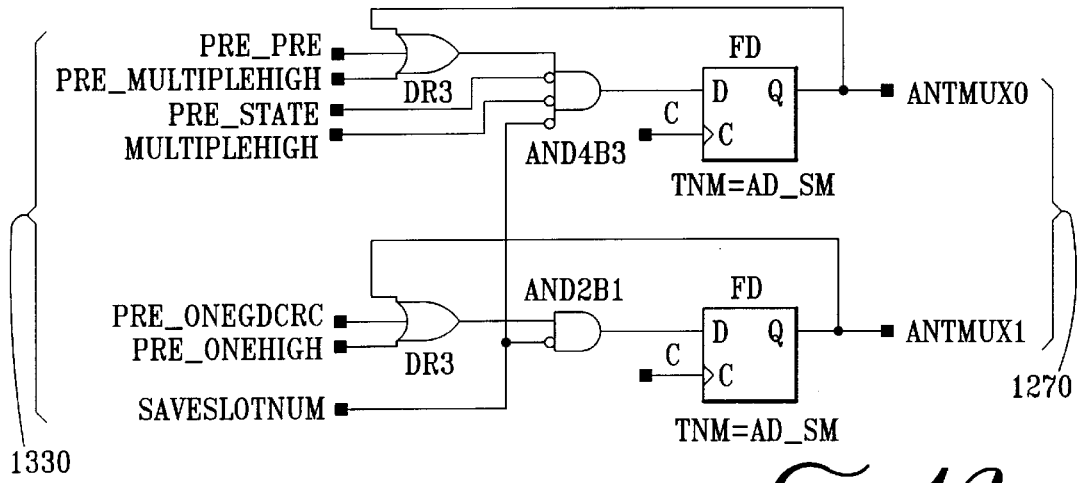
Figure 12S:
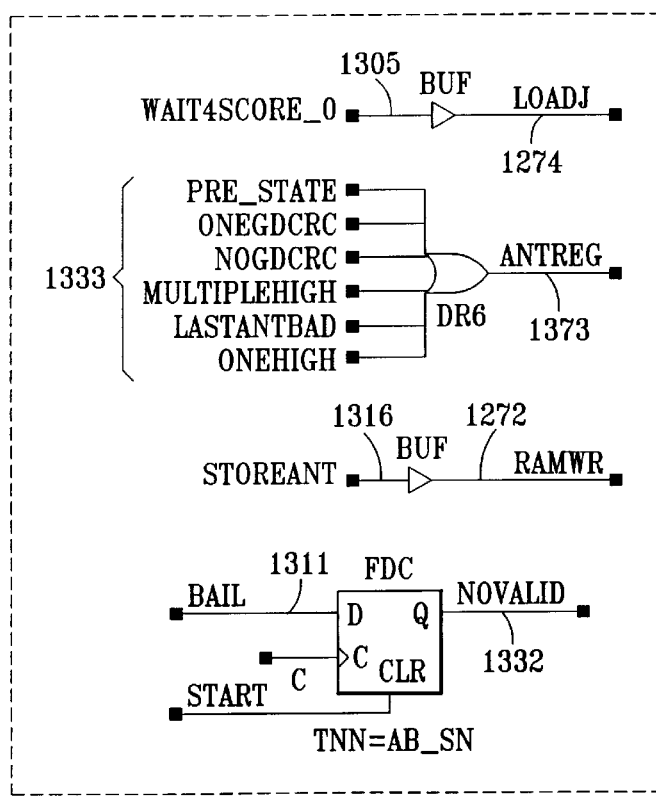
Figures 3, 12U:
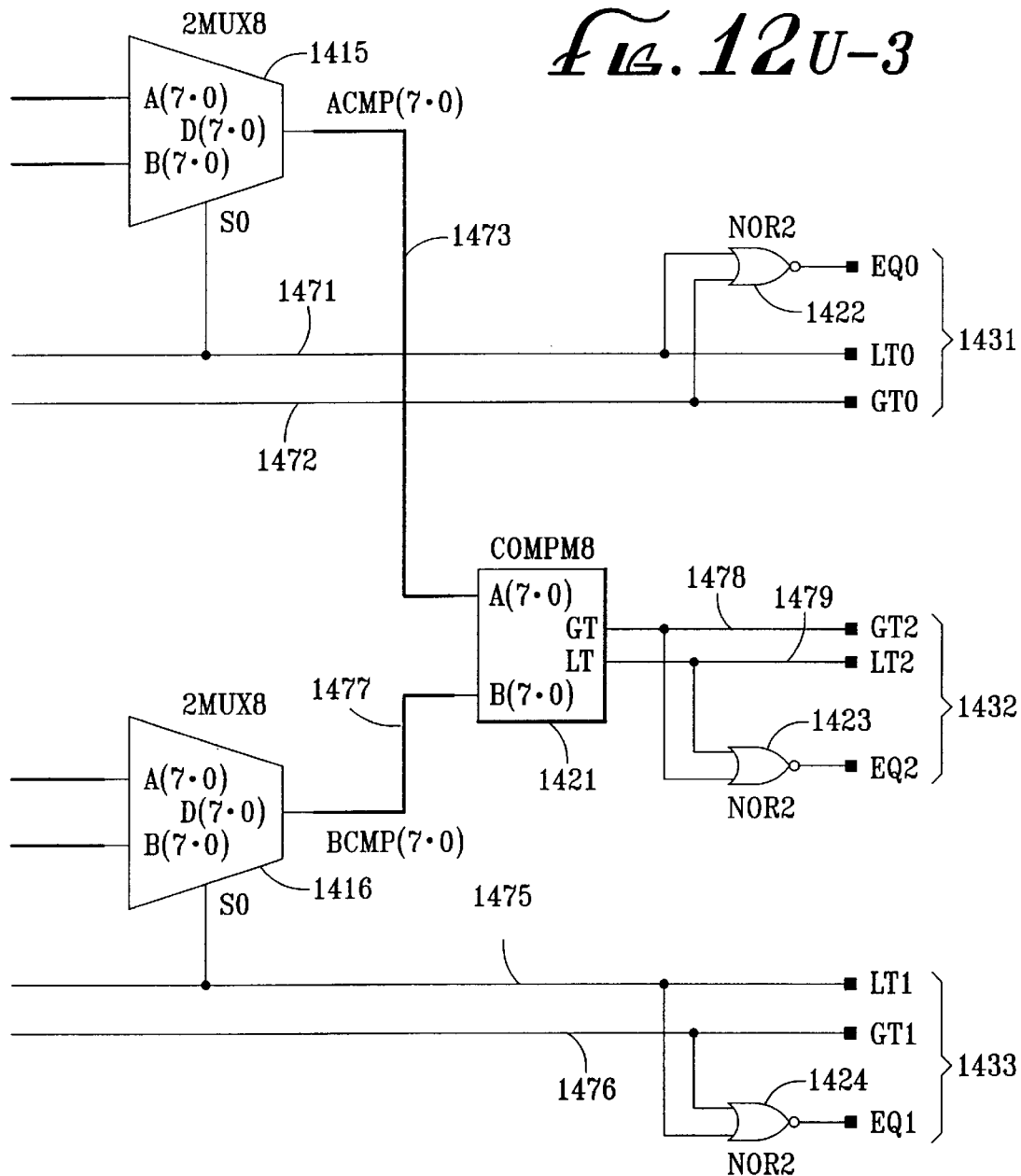
Figure 12U:
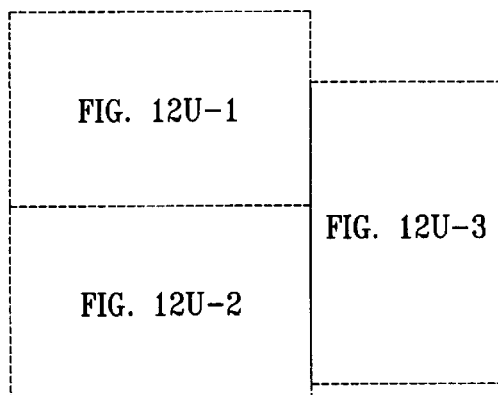
Figures 2, 12U:
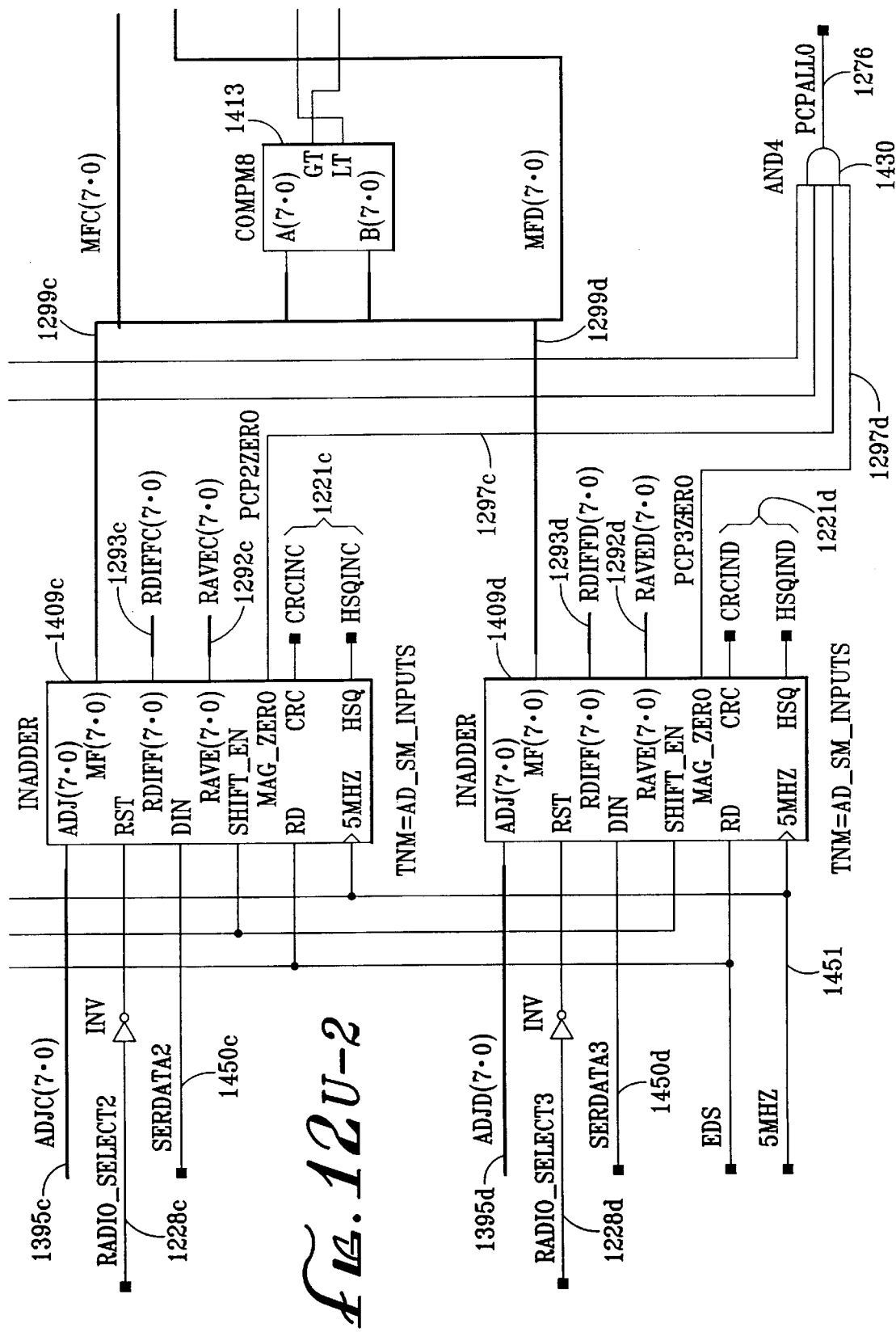

A preferred circuit embodiment generally in accordance with various aspects of the antenna scoring system block diagram of FIG. 14 and the antenna scoring and selection process depicted in FIGS. 10A–10B is shown in FIGS. 12A–12U.

FIG. 12U depicts circuitry for receiving a plurality of serial data streams 1450a–1450d (one from each radio unit 802), deriving the individual quality metric components (i.e., data words or bits/flags) from each of serial data streams 1450a–1450d, and performing some or all of the general functions explained previously with regard to FIGS. 10A and 10B. The circuitry of FIG. 12U processes its inputs to arrive at antenna score comparison output signal sets 1431, 1432 and 1433, whose functions generally correspond to the signals output from FIG. 10B, as described in more detail below. Antenna score comparison output signal sets 1431, 1432 and 1433 are utilized by other circuitry depicted in FIGS. 12A–12T to arrive at a final antenna selection.

In more detail, the circuitry of FIG. 12U receives serial data streams 1450a–1450d from radio units 802a–802d, respectively. Each serial data stream 1450a–1450d comprises a quality metrics serial data packet 550, as shown, for example, in FIG. 5. Each of the serial data streams 1450a–1450d is connected to one of a plurality of processing blocks 1409a–1409d. Processing blocks 1409a–1409d collectively output a plurality of RSSI average score signals 1292a–1292d, a plurality of RSSI difference score signals 1293a–1293d, a plurality of final antenna score signals 1299a–1299d, a plurality of preamble zero flags 1297a–1297d, a plurality of CRC and HSQ flags 1221a–1221d. Each processing block 1409a–1409d outputs the signals with the same corresponding letter identifier (e.g., processing block 1409a outputs RSSI average score signal 1292a, RSSI difference score signal 1293a, etc.).

Processing block 1409a–1409d are also shown having input connections to intermediate antenna adjustment score lines 1395a–1395d and radio select signals 1228a–1228d. Both the intermediate antenna adjustment score lines 1395a–1395d and the radio select signals 1228a–1228d are received from circuitry depicted in FIG. 12L (and, on an individual basis, from circuitry shown FIG. 12M), described in more detail later herein. The circuitry of FIG. 12L (and FIG. 12M) utilizes, among other things, the RSSI average score signals 1292a–1292d and RSSI difference score signals 1293a–1293d as inputs.

FIG. 12J depicts a preferred embodiment of the internals of any one of processing blocks 1409a–1409d (each of which is substantially identical in configuration). FIG. 12J shows a serial data input line 1450 (which comprises any of serial data stream signals 1450a–1450d). Information from serial data input line 1450 is, under control of a clock signal 1451 (running at, e.g., 5 MHz), clocked into serial-to-parallel registers 1291a–1291c, from which are derived the RSSI average score signal 1292, the RSSI difference score signal 1293, the preamble correlation score signal 1289, the handset quality flag signal 1295, and the CRC flag signal 1294 for the particular radio unit 802. Serial clocking of the information from the serial data input line 1450 is commenced or terminated under control of a serial data shift enable signal 1402 (also appearing in FIG. 12U).

The RSSI average score signal 1292, RSSI difference score signal 1293, and handset quality flag signal 1295 are provided to the circuitry of FIG. 12L (and FIG. 12M) for derivation of the intermediate antenna adjustment score, as will be described in more detail hereinafter. The circuitry of FIG. 12L outputs intermediate antenna adjustment score signal 1395 for each processing block 1409. The intermediate antenna adjustment score signal 1395 is shown in FIG. 12J connected to one set of inputs of an adder 1298. Selected lines from the preamble correlation score lines 1289 are connected to the other set of inputs of adder 1298. Specifically, the four most significant bits of the preamble correlation score on preamble correlation score lines 1289 are connected to the "B" inputs of adder 1298 starting from the 5th bit position B4 down to the 2nd bit position B1, so as to effectively scale the preamble correlation score with respect to the other antenna selection parameters described herein.

Also connected to the "B" inputs of adder 1298 are two adjustment signals 1457, 1458 derived from a radio enabled signal 1455 and the CRC flag signal 1294. As described with respect to FIG. 10A and the pseudo-code previously appearing herein, if the radio is enabled (as indicated by radio enabled signal 1455), then an antenna score adjustment of 128 is made to the antenna score. This antenna score adjustment is effectuated by applying the radio enabled signal 1455 through logic gate 1460 to the 8th bit position B7 of the "B" input of adder 1298, thereby properly scaling the antenna score adjustment for the radio enabled signal 1455 with respect to the preamble correlation score and other antenna scoring parameters. Similarly, an antenna score adjustment of 64 is made to the antenna score if the CRC passes. This antenna score adjustment is effectuated by applying the CRC flag signal 1294 and radio enabled signal 1455 to logic gate 1461, and applying the output of logic gate 1461 to the 6th bit position B5 of the "B" input of adder 1298. If the radio is not enabled (i.e., the radio enabled signal 1455 is not asserted), then serial-to-parallel registers 1291*a*–1291*c* are reset, causing preamble correlation score lines 1289 to be set to zero.

Adder 1298 outputs a final antenna score signal 1299 by combining the intermediate antenna adjustment score (derived in FIGS. 12L and 12M) with a scaled version of the preamble correlation score and with adjustment signals 1457 and 1458 derived from the CRC flag signal 1294 and radio enabled signal 1455. The final antenna score signal 1299 for all the antennas 807 (shown collectively as signals 1267 in FIG. 12K) are provided to registers 1269*a*–1269*d*, each final antenna score signal 1299 being connected to a different register 1269*a*–1269*d*.

The processing block 1409 of FIG. 12J also generates a preamble magnitude zero flag signal 1297, based on a comparison of the preamble correlation score on preamble correlation score lines 1289 with a scalar zero value on zero signal lines 1290. The preamble magnitude zero flag signals 1297*a*–1297*d* for all of the processing blocks 1409*a*–1409*d* are combined by logic gate 1430 in FIG. 12U and, if all are true (indicating that the preamble correlation score for each processing block 1409*a*–1409*d* is equal to zero), then an all-zero preamble score flag signal 1276 is asserted. The all-zero preamble score flag signal 1276 is utilized by the circuitry in FIGS. 12I and 12P, as further described herein.

The final antenna score signals 1299*a*–1299*d* are processed by the circuitry of FIG. 12U to arrive at various antenna score comparison signals as detailed hereinafter. The final antenna score signal 1299*a* from the first processing block 1409*a* and the final antenna score signal 1299*b* from the second processing block 1409*b* are connected to a comparator 1412, which compares its inputs and generates, based on the comparison, a greater-than signal 1472 (designated "GT0") and a less-than signal 1471 (designated "LT0"). The greater-than signal 1472 is applied to the select input of a multiplexer 1415, which selects the greater of either the first final antenna score signal 1299*a* or the second final antenna score signal 1299*b*. The output signal 1473 of multiplexer 1415 is connected to one input of another comparator 1421.

Similarly, the final antenna score signal 1299*c* from the third processing block 1409*c* and the final antenna score signal 1299*d* from the fourth processing block 1409*d* are connected to a comparator 1413, which compares its inputs and generates, based on the comparison, a greater-than signal 1476 (designated "GT1") and a less-than signal 1475 (designated "LT1"). The greater-than signal 1476 is applied to the select input of a multiplexer 1416, which selects the greater of either the third final antenna score signal 1299*c* or the fourth final antenna score signal 1299*d*. The output signal 1477 of multiplexer 1416 is connected to the other input of comparator 1421.

Comparator 1421 outputs a greater-than signal 1478 (designated "GT2") and a less-than signal 1479 (designated "LT2"), similar to comparators 1412 and 1413. The greater-than signal 1478 and less-than signal 1479 are connected to logic gate 1423 (i.e., a NOR gate), which outputs a signal (designated "EQ2") that, when having a high value, indicates that the two inputs to comparator 1421 are of equal magnitude. Similarly, the greater-than signal 1472 and less-than signal 1471 output from comparator 1412 are connected to logic gate 1422, which outputs a signal (designated "EQ0") that, when having a high value, indicates that the two inputs to comparator 1412 are of equal magnitude. Similarly, the greater-than signal 1476 and less-than signal 1475 output from comparator 1413 are connected to logic gate 1424, which outputs a signal (designated "EQ1") that, when having a high value, indicates that the two inputs to comparator 1413 are of equal magnitude.

The signals output from comparators 1412, 1413, and 1421 are designated as antenna score comparison signal sets 1431, 1432 and 1433, as shown in FIG. 12U, and basically equate in functionality to the output signals shown in FIG. 10B. The antenna score comparison signal sets 1431, 1432 and 1433 are provided to circuitry shown in FIGS. 12A–12D for further processing, and to select the best antenna for communication based thereon.

FIG. 12A shows a set of input signals 1283 (specifically, the signals denoted EQ0, EQ1 and EQ2 output from logic gates 1422, 1423 and 1424 in FIG. 12U) connected to a logic gate 1480. Logic gate 1480 outputs a signal 1277 which, when TRUE (i.e., having a high value), indicates that all of final antenna scores are equal.

FIG. 12B shows a set of input signals 1235 connected to various logic gates 1481 which, in turn, have outputs connected to another logic gate 1482 (an OR gate). The input signals 1235 comprise signals denoted LT0, LT1, LT2, GT0, GT1 and GT2 described previously with respect to FIG. 12U. Logic gate 1482 outputs a signal 1279 (designated "USESEL") which indicates, when true, that there is exactly one highest final antenna score.

FIG. 13 is a truth table showing a determination of which of the final antenna score signals 1299*a*–*d* is the highest one in the situation where exactly one highest final antenna score exists. According to the truth table in FIG. 13, the first final antenna score signal 1299*a* comprises the highest antenna score when LT2=0, GT2=1, LT0=0, and GT0=1; the second final antenna score signal 1299*b* comprises the highest antenna score when LT2=0, GT2=1, LT0=1 and GT0=0; the third final antenna score signal 1299*c* comprises the highest antenna score when LT2=1, GT2=0, LT1=0 and GT1=1; and the fourth final antenna score signal 1299*d* comprises the highest antenna score when LT2=1, GT2=0, LT1=1 and GT1=0. Where all of LT0, LT1, LT2, GT0, GT1 and GT0 are zero, the FIG. 13 truth table indicates that the antenna number should be incremented. In all other cases, there are multiple high final antenna scores, and further processing is necessary to determine which antenna should be selected.

FIG. 12C shows a set of input signals 1284 including signals LT0, LT1 and LT2 shown in FIG. 12U. Signals LT0 and LT1 are connected to the inputs of a multiplexer 1483, and signal LT2 is connected to a select input of multiplexer 1483. A pair of output signals 1223 (designated SELANT1 and SELANT0) are derived from the circuitry of FIG. 12C, with SELANT0 comprising the output of multiplexer 1483, and SELANT1 taking the same value as signal LT2. The pair of output signals 1223 is provided to circuitry shown in FIG. 12G, explained in more detail hereinafter.

FIG. 12D depicts circuitry that outputs a logic-level signal 1280 indicating, for a particular antenna, whether that antenna has a final antenna score equal to the high final antenna score. As inputs, FIG. 12D shows input signals 1236 which comprise signals designated EQ0, EQ1, EQ2, LT0, LT1, LT2, GT0, GT1, and GT2 received from the circuitry of FIG. 12U, along with select signals 1227 received from circuitry shown in FIG. 12G, explained in more detail hereinafter. Input signals 1236 are provided to logic gates 1485 with the connections shown in FIG. 12D. Logic gates 1485 output four signals 1285a–1285d, each one indicating whether the respective final antenna score is equal to the high antenna score. Signal 1285a indicates whether the first final antenna score signal 1299a equals the high antenna score; signal 1285b indicates whether the second final antenna score signal 1299b equals the high antenna score; and so on.

Signals 1285a–1285d are connected to the data inputs of a multiplexer 1486. Select signals 1227 are connected to the select inputs of the multiplexer 1486. The select signals 1227 comprise a two-bit code (assuming use of four antennas 807) that correspond to the selected antenna number. Multiplexer 1486 outputs a high logic-level signal when the final antenna score for the selected antenna equals the high antenna score. More than one antenna 807 may have the high antenna score.

The HSQ and CRC flag signals 1221a–1221d shown in FIG. 12U are also further processed to derive parameters used in the ultimate selection of an antenna. The CRC flag signal 1294 derived from each radio unit 802 is provided to logic gates as shown in FIG. 12E. The same set of four CRC flag signals 1241 is input to each of logic gates 1242a–1242e. Logic gate 1242a outputs a no-good-CRC signal 1246 if each of the CRC flags indicate a CRC failure (i.e., each CRC flag signal 1294 output from processing blocks 1409a–1409d have been set low), meaning that none of the radio units 802 returned a valid CRC.

In addition, each of logic gates 1242b–1242e outputs a high logic-level signal if exactly one of the CRC flags indicates a CRC pass but the rest of the CRC flags indicate a CRC failure. Each of logic gates 1242b–1242e is configured to test a CRC flag from a different radio unit 802a–802d. Only one of the logic gates 1242b–1242e can output a high signal at a time; if none of the CRC flags indicate a "valid" CRC (i.e., a CRC pass), or multiple CRC flags are returned indicating a valid CRC, then none of the logic gates 1242b–1242e will output a high signal.

Logic gate 1243 combines the outputs from each of the logic gates 1242b–1242e, and outputs a one-good-CRC signal 1248 that, when set high, indicates exactly one CRC flag is valid. If multiple CRC flags are returned valid, then logic gate 1243 will output a low signal, and logic gate 1242a will also output a low signal. Consequently, logic gate 1244 outputs a multiple-good-CRC signal 1247 indicating that more than one CRC flag was returned as valid.

The no-good-CRC signal 1246, multiple-good-CRC signal 1247, and one-good-CRC signal 1248 are all connected to an antenna diversity state machine 1285, as depicted in FIG. 12I. The antenna diversity state machine 1285 is also connected to various other signals whose functions are explained further herein.

Details of the antenna diversity state machine 1285 of FIG. 12I are shown in FIGS. 12G and 12N–12S. In general, the circuitry shown in FIGS. 12N–12S receives signals from the antenna scoring and comparison circuitry shown in FIGS. 12A–12E and 12U, processes the information received from these signals, and outputs signals used by the local state machine shown in FIG. 12G. The circuitry of FIG. 12G loops through the antennas so as to determine which antenna has the highest score and make the ultimate antenna selection.

In more detail, to commence the antenna selection process, a start signal 1275 is applied to an input of the state machine circuitry shown in FIG. 12N. The start signal 1275 may be derived from an internal counter that keeps track of the start of each time slot, or may instead be provided from an external stimulus, such as detection by the receiver of an incoming signal in a predefined time window. The start signal 1275, when asserted, causes a signal to ripple along a chain of flip-flops 1398, the purpose of which is to provide a sufficient delay time for the antenna scoring circuitry to yield antenna score values, which are then processed by the antenna state machine circuitry. When output signal 1305 switches states, all of the antenna scores for each of the four antennas 807 have been calculated.

The output signal 1305 (designated "WAIT4SCORE__D") is connected to additional state machine circuitry shown in FIGS. 12-O and 12P. The output signal 1305 and one-good-CRC signal 1248 (from the circuitry of FIG. 12E) are gated into a flip-flop 1399, the output of which is a gated one-good-CRC signal 1306. The gated one-good-CRC signal 1306 is used by the circuitry in FIG. 12P for further processing.

FIG. 12P depicts a portion of the internals of the antenna diversity state machine 1285 shown in block format in FIG. 12I. The circuitry of FIG. 12P receives as inputs signals derived from other portions of the antenna selection system circuitry, including circuitry shown in FIGS. 12A–12E. For example, the circuitry of FIG. 12P receives as inputs the WAIT4SCORE__D signal 1305 (from FIG. 12N), MULTGOODCRC signal 1247 (from FIG. 12E), NOGOODCRC signal 1246 (from FIG. 12E), ALLZERO signal 1314 (from FIG. 12U), USESEL signal 1276 (from FIG. 12B), PCPGOOD signal 1380 (from FIG. 12D), and so on. In addition, an ANT__REG signal 1273 representing an internal state of the state machine is generated during processing by the circuitry of FIG. 12P, and is fed back as an input to the state machine.

The circuitry of FIG. 12P determines, based on its inputs, whether the previous antenna was good, and if so then outputs a high logic-level for a LASTANTGOOD signal 1307. The circuitry of FIG. 12P outputs a store antenna signal 1316, which indicates that a suitable antenna has been selected and may be stored.

FIG. 12G depicts a slave state machine 1226 (i.e., a loadable counter) controlled by the state machine 1285 of FIG. 12P that cycles through the antennas as part of the process of determining the best antenna for communication, as described elsewhere herein. At the start of the time slot 202, the previously used antenna number for the "active" antenna is read out from the active antenna RAM 1250 (generally corresponding to active antenna RAM 844 in FIG. 8, for example), shown in FIG. 12F, over active antenna lines 1251 (denoted "RAMANT0" and "RAMANT1" in FIG. 12G). More particularly, as shown in FIG. 12F, a plurality of slot counter lines 1240 (in this example, four slot counter lines, for counting up to 16 time slots) are connected to the address inputs of the active antenna RAM 1250. In operation, for each time slot 202, the antenna number of the previously used antenna is read out of the active antenna RAM 1250 and is output over lines 1251. When a new antenna is selected, the antenna number of the new antenna is written to the active antenna RAM 1250 by activating RAM write enable signal 1272 (denoted "RAMWR" in FIG. 12F) and providing the new antenna number over lines 1220 (denoted "ANT0" and "ANT1" in FIG. 12F).

Returning to the description of FIG. 12G, active antenna lines 1251 are connected to one set of inputs of multiplexer 1441. The pair of output signals 1223 (SELANT1 and SELANT0, derived from the circuitry of FIG. 12C) are also connected to multiplexer 1441. Next-antenna-state feedback signals 1227 (designated "NXS0" and "NXS1"), output from an adder 1225, are also connected as inputs to multiplexer 1441. Connected to the select inputs of multiplexer 1441 are select signals 1270 (designated "ANTMUX0" and "ANTMUX1"), which are derived from a set of input signals 1330 (most of which are received from the FIG. 12P circuitry) as illustrated in FIG. 12R.

Multiplexer 1441 sends its output signals to the slave antenna state machine 1226. The slave antenna state machine 1226 also receives as inputs an ANTREG signal 1373 (different than ANT_REG signal 1273), which is, through a logical "OR" operation, asserted when any of six other logic signals 1333 is asserted, as shown in FIG. 12S. In operation, the slave antenna state machine 1226 starts with the antenna number read out of the active antenna RAM 1250 and cycles through the antennas under control of an increment signal 1271, which increments the antenna number by causing adder 1225 to increment periodically. The increment signal 1271 is asserted whenever either LASTANTBAD signal 1317 or NOGDCRC signal 1310, both derived from the circuitry of FIG. 12P, is asserted, as shown in FIG. 12Q.

For each selected antenna, the circuitry of FIG. 12G gates the antenna number with antenna enable signals 1228 (one for each antenna 807) to ensure that the selected antenna is enabled. Logic gates 1440 perform this operation, and if the selected antenna 807 is enabled, then an antenna valid signal 1229 is asserted. If, however, the antenna 807 associated with the antenna number returned from the active antenna RAM 1450 is not enabled, then the antenna valid signal 1229 is not asserted. The antenna valid signal 1229 is fed back to the antenna diversity state machine 1285 of FIG. 12P, and if not asserted causes the slave antenna state machine 1226 to cycle to the next antenna under the control of the antenna diversity state machine 1285, until an enabled antenna 807 is found. When an enabled antenna 807 is found, its antenna number is read over antenna lines 1220 (designated "ANT0" and "ANT1") and stored in active antenna RAM 1250 (see FIG. 12F) when the RAM-write signal 1272 is asserted. RAM-write signal 1272 is asserted when a store antenna signal 1316 is asserted, as shown in FIGS. 12P and 12S.

Antenna lines 1220 are gated into a receiver antenna register 1445 through logic gates 1446 and multiplexers 1232. By operation of logic gates 1446, only one antenna select signal is asserted, while simultaneously erasing the previous antenna select signal. Multiplexers 1232 allow for a "manual override" of the antenna selection system. When a manual radio select signal 1447 is asserted, radio select signals 1228a–1228d select one or more antennas for communication, without regard for the antenna selected by the antenna selection system. Antenna select lines 1449 output from receiver antenna register 1445 thereby select one of the antennas 807 for reception.

Antenna select lines 1449 are optionally output into a transmitter antenna register 1231. The transmitter antenna register 1231 outputs a second set of antenna select lines 1230 which select one antenna for communication in a subsequent time slot (e.g., the following time slot). The second set of antenna select lines 1230 may be used where a duplex time slot comprises a "virtual" time slot—that is, a forward link of a TDD channel is sent in a first time slot, and the reverse link of the TDD channel is sent in another time slot (such as the immediately following time slot), thereby allowing extra processing time by the base station 104. In this embodiment, the first set of antenna select lines 1449 select a receiving antenna for one line of the TDD channel, and the second set of antenna select lines 1230 uses that same antenna for transmitting in the next time slot.

If the optional transmitter antenna selection register 1231 is not used, then, in a preferred embodiment, antenna select lines 1449 are used for both the receiving antenna and the transmitting antenna in a TDD time slot 202.

A watchdog timer 1448 is employed in the circuitry of FIG. 12P to ensure that an antenna is selected within the necessary amount of time. If no antenna is selected within the prescribed time, then the watchdog timer 1448 times out, causing an abort signal 1311 (designated "BAIL") in FIG. 12P to be asserted. If BAIL signal 1311 is asserted, then NOVALID signal 1332 is asserted, as shown in FIG. 12S, indicating that none of the antennas have been selected. In such a case, an appropriate error condition can be asserted by the antenna selection system, and further processing steps can be taken to determine the cause of the failure to arrive at an antenna selection result. The store antenna signal 1316 periodically resets the watchdog timer 1448 when an antenna is selected.

Details of the generation of the intermediate antenna adjustment score signals 1395a–1395d output from the circuitry of FIG. 12L mentioned earlier will now be explained. Active antenna signal lines 1251, output from the circuitry shown in FIG. 12F, are connected to a first antenna scoring block 1259 as depicted in FIG. 12L. Also connected to the first antenna scoring block 1259 are a bad handset quality indicator flag 1252 (derived from the circuitry of FIG. 12F) and handset quality adjustment value signals 1222.

Also shown in FIG. 12L are a second antenna scoring block 1258 and a third antenna scoring block 1257. The second antenna scoring block 1258 is connected to a plurality of RSSI average score signals 1256, one for each radio unit 802, and the third antenna scoring block 1257 is connected to a plurality of RSSI difference score signals 1255, one for each radio unit 802, as well as to various RSSI difference adjustment signals 1234 (including an RSSI difference adjustment signal, an RSSI difference zero adjustment signal, and an RSSI difference threshold signal, explained further with respect to FIG. 12M).

The antenna scoring blocks 1257, 1258 and 1259 are each connected to a scoring calculation block 1263. Antenna scoring block 1257 outputs to the scoring calculation block 1263 a plurality of RSSI difference adjustment signals 1260, one for each radio unit 802. Antenna scoring block 1258 provides as outputs to the scoring calculation block 1263 a plurality of RSSI average adjustment signals 1261, one for each radio unit 802. Antenna scoring block 1259 provides as outputs to the scoring calculation block 1263 a plurality of handset quality adjustment signals 1262, one for each radio unit 802. The scoring calculation block 1263 outputs a plurality of total antenna score adjustment signals 1265. A plurality of external radio select signals 1228 (one for each radio unit 802) are received by the circuitry of FIG. 12L, one radio select signal 1228 for each radio unit 802, indicating whether the particular radio unit 802 is enabled.

The antenna scoring blocks 1257, 1258 and 1259 and scoring calculation block 1263 collectively perform the antenna scoring calculations generally described previously with respect to FIG. 10A and the pseudo-code appearing previously herein. The internals of a portion of the antenna scoring blocks 1257, 1258 and 1259, scoring calculation block 1263 as well as additional functions are shown for one radio unit 802 in FIG. 12M, with the configuration of the scoring calculation block circuitry for the other antennas 807 being similar.

As shown in FIG. 12M, the RSSI difference signal 1351 is compared against an RSSI difference threshold signal 1350 by comparator 1356, which outputs a select signal 1358 to a multiplexer 1359. Multiplexer 1359 outputs either an RSSI difference adjustment value 1354, or an RSSI difference zero adjustment value 1353, depending on the state of select signal 1358. The output 1360 of multiplexer 1359 is connected to an input of an adder 1383, along with an RSSI average signal 1382. The output of adder 1383 is connected to another adder 1386. The other input of adder 1386 is connected to the output of a multiplexer 1368.

Multiplexer 1368 selects either a handset quality adjustment value 1371 or a handset quality zero adjustment value 1370, depending on the state of the select signal 1369. Select signal 1369 is derived from the active antenna number signals 1251 and the handset quality flag signal 1252, according to the general process previously described with respect to FIG. 10A and the pseudo-code appearing previously herein. If the current antenna is the same as the previously used antenna, and the handset quality flag indicated poor reception at the user station 102, then logic gates 1365, 1366 and 1367 work in unison to produce a select signal 1369 such that the handset quality adjustment signal 1371 is output from multiplexer 1368; otherwise, handset quality zero adjustment signal 1370 is selected.

The output 1387 of adder 1386 is inverted by inverter 1388 and connected to another adder 1390 with the carry set, such that the output of adder 1386 is converted into a two's-complement format. The output of adder 1390 is connected to a register 1393, and is read out over intermediate antenna adjustment score lines 1395 as long as the radio select signal 1228a for the particular radio unit 802 is active. If the radio select signal 1228a is low (indicating that the particular radio unit 802 is not enabled), then the reset input of the register 1393 is held in an active state such that the output of the register 1393 (i.e., the intermediate antenna adjustment score 1395) remains zero. The intermediate antenna adjustment score lines 1395 are, as previously noted, connected to the circuitry shown in FIG. 12U, and used in the antenna selection process described in detail above.

After an antenna is selected, a signal is derived indicating whether or not the antenna received a bad handset reception quality indication. In FIG. 12H, the antenna number is applied as a select signal 1220 to a multiplexer 1233, and an output of the CRC flag signal and HSQ flag signal from a plurality of flag signals 1221 are output from the multiplexer 1233 as signals 1224. Signals 1224 are shown as inputs in FIG. 12F, where they are combined by AND gate 1286 and, if the CRC flag indicates a valid CRC and the handset quality flag indicates poor user station reception, signal 1252 is activated.

The circuitry of FIG. 12A–12U thereby allows selection of an antenna in a rapid and relatively efficient manner, taking into account the quality of preamble correlation and signal characteristics, the quality of the signal transmitted from the previously used antenna as perceived by the handset, and the quantity of errors in the data received (as indicated by the CRC pass/fail flag).

In a preferred embodiment, the base station 104 comprises two collocated "sub-base stations," each using a different frequency and/or spread spectrum code (or code group), and each employing a TDMA time frame such as that depicted in FIG. 2. In this embodiment, the diversity controller 415 preferably comprises a Xilinx-4013 programmable gate array to manage up to eight different radios (and therefore eight different antennas) at the base station 104, with up to four antennas and four radios being used by each sub-base station.

Further details regarding the transfer of information from the radios to the diversity controller are described with respect to FIGS. 11A–11I, which are circuit schematic diagrams illustrating a preferred embodiment of a portion of a preferred base station 104. FIGS. 11A–11I include standard engineering symbols and terminology; it is therefore expected that construction of the circuit depicted in FIGS. 11A–11I is within the scope of one of ordinary skill in the art, and the following description is therefore limited to only a general description of the operation of the circuit of FIGS. 11A–11I.

FIG. 11A is a diagram showing a RAM bus 1131 connected to a RAM bus latch 1132 and a buffer 1133. Data from the RAM bus 1131 is loaded into parallel-to-serial registers 1134, each of which is, for example, an 8-bit register. The loading of the parallel-to-serial registers 1134 is conducted under the control of various control signals, including a load RSSI average control signal 1137 ("LOAD_AVG"), a load RSSI difference signal 1138 ("LOAD_DIFF"), and a load preamble correlation magnitude signal 1139 ("LOAD_PAMAG").

When a serial data enable signal 1140 ("SERDATEN") is enabled, the information stored in parallel-to-serial registers 1134 is clocked out at a rate determined by clock signal 1142, which is 5 MHz in the exemplary embodiment of FIG. 11A. Data is clocked out over serial data output signal 1141 first from register 1134c, then from register 1134b, and then from register 1134a, with the registers 1134 being connected in a chain to facilitate clocking out of the data stored therein. The serial data output signal 1141 is inverted to generate serial data output signal 1146.

The load RSSI average control signal 1137, load RSSI difference signal 1138, and a load preamble correlation magnitude signal 1139 are developed by a state machine as shown in part on FIG. 11B. The circuitry of FIG. 11B also generates an RSSI read signal 1144 which controls reading of the RSSI information developed by the radio. The serial data enable signal 1140 is received from the circuitry appearing in FIG. 11C, which inverts a serial data enable signal 1145 input to it from the microprocessor (not shown). When the serial data enable signal 1145 is enabled, the circuitry of FIG. 11C selectively transmits serial data to the diversity controller (such as diversity controller 830 of FIG. 8). A serial data multiplexer 1149 under control of state machine circuitry in FIG. 11C selectively passes through the serial data from the serial data output signal 1146 (see FIG. 11A), followed later by a CRC bit 1147 and then by an HSQ bit 1148. Output signal 1150 comprises serial data that is transmitted to the diversity controller.

Data from the microprocessor (such as RSSI calculations) can be stored in the dual-port RAM 815 (see, e.g., FIG. 8)

by transferring data over data bus 1159, which appears in FIG. 11D. RSSI address signals 1162 are selected by multiplexer 1155 for use as RAM index address signals 1157. As shown in FIG. 11E, the RAM index address signals 1157 are translated to RAM absolute address signals 1160 and results in address signals 1161. As shown in FIG. 11F, the address signals 1161 are multiplexed with other address signals and results in RAM address signals 1163. Data is read out of the dual-port RAM 815 over the RAM bus 1131 and into parallel-to-serial registers 1134, as described previously.

Figure 11I:
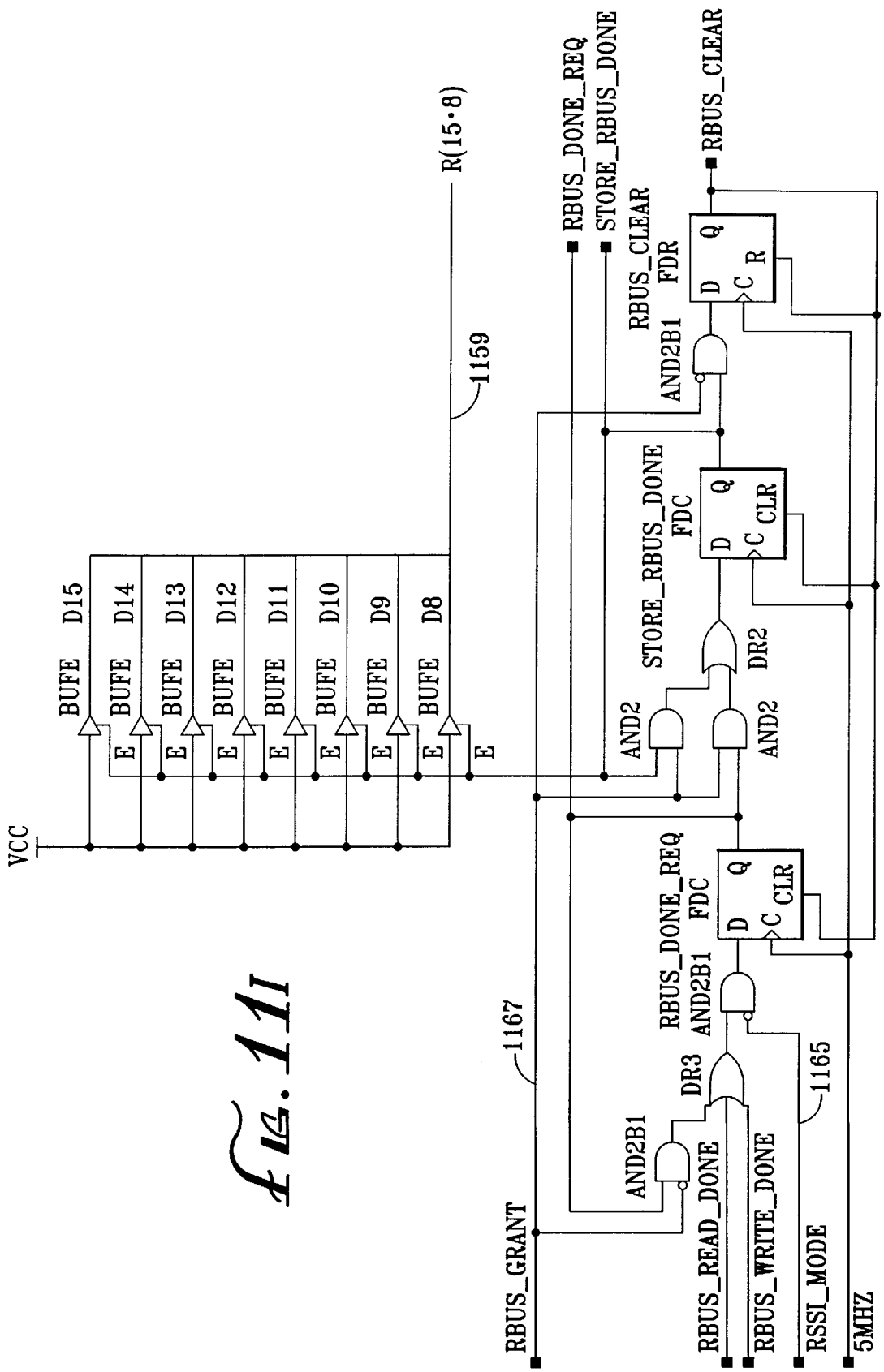

Additional details of the RAM controller are shown in FIGS. 11G–11I. FIGS. 11G–11I illustrate control signals including an RSSI mode signal 1165, and RAM bus grant signal 1167, and an RSSI read control signal 1168. The RSSI mode signal 1165 indicates that the data packet 850 (see FIG. 5) comprising the antenna quality metrics can start being sent to the diversity controller 830. The RAM bus grant signal 1167 authorizes the RAM controller 812 (see FIG. 8) to use the RAM bus 1131 for the transfer of the antenna quality metrics. The RSSI read control signal 1168 controls reading of the stored quality metrics from the dual-port RAM 815.

In some embodiments, a single user station 102 may be capable of communicating in multiple time slots 202 of a single polling loop 201 (see FIG. 2) with the same base station 104. To support such a capability, the antenna selection system at the base station 104 is preferably modified so that the most current historical data associated with the user station 102 is utilized. For example, where two time slots 202 are assigned to a single user station 102, the "previous" active antenna in the second time slot is that used in the first time slot, not in the second time slot of the previous time frame. The base station 104 preferably comprises processing logic and/or circuitry to keep track of the most recent time slot previously used by each user station 102.

In embodiments in which a single user station 102 is capable of communicating in multiple time slots 202 (with reference to the time frame 201 shown in FIG. 2), several alternative antenna selection system embodiments exist. In one such embodiment, each time slot 202 is treated independently for antenna selection purposes, and antenna selection for a first time slot 202 assigned to a user station 102 does not affect antenna selection for a second different time slot 202 assigned to that same user station 102. In another embodiment, antenna selection is based on the antenna selected for the immediately preceding time slot 202 that is assigned to the same user station 102. These approaches are described in more detail with respect to FIGS. 6 and 7.

Figure 6:
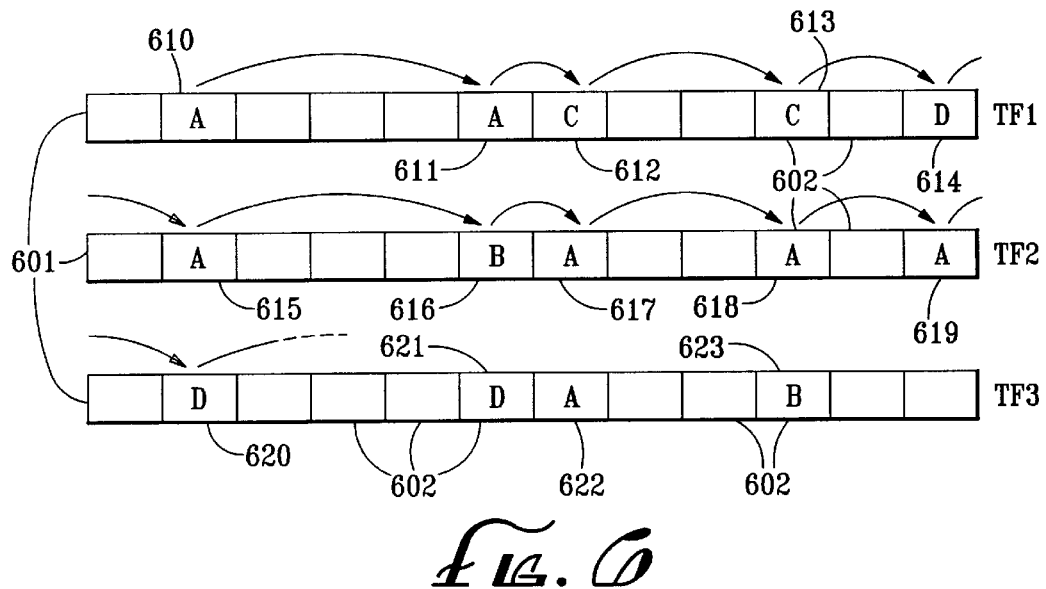
FIG. 6 is a diagram illustrating a first embodiment of a rotating antenna selection scheme.

FIG. 6 shows a series of time frames 601 (or polling loops), designated as time frames TF1, TF2, TF3, ..., each comprising a sequential series of time slots 602. For the purposes of FIG. 6, it is assumed that the base station 104 is using four antennas, designated as antennas A, B, C and D. It is further assumed, for the purposes of FIG. 6, that a single user station 102 has been assigned five time slots 610 through 614 of the twelve total time slots 602 in the first time frame TF1.

The letter A, B, C or D appearing in each time slot 602 indicates which antenna is selected by the base station 104 for communication in that time slot 602. Thus, in a first time slot 610 of time frame TF1, antenna A is selected (for example, antenna A may have returned the highest antenna score in the first time slot 610). In the next time slot 611, antenna A is selected as again having returned the highest antenna score for the time slot 611. Likewise, in time slots 612 and 613, antenna C returns the highest antenna score and is thus selected. Accordingly, the base station 104 may select different antennas to communicate with a single user station 102 within a single time frame 601.

With regard to the next time slot 614, FIG. 6 illustrates operation of a particular antenna selection system in a situation where none of the antennas A, B, C or D return a high score (due to, for example, none of the CRC's passing). Such a situation may be caused, for example, by temporary interference over the frequency band of communication. In time slot 614, according to a particular antenna selection process, the selected antenna 807 is incremented from antenna C to antenna D in response to none of the antennas A, B, C or D returning a high score.

Likewise, in the next time slot 615, none of the antennas A, B, C or D returns a high score in the antenna scoring process, and the selected antenna is therefore incremented from antenna D to antenna A (i.e., rotated back to the first antenna (antenna A) after reaching the last antenna (antenna D)). The selected antenna is incremented each time slot (or rotated back to the first antenna in a cyclic fashion after the last antenna is reached), as shown in FIG. 6, until at least one good antenna is found. In time slot 617, antenna B returns the highest antenna score and also has a good CRC, so it is selected.

After time slot 616, FIG. 6 shows the situation wherein at least one good antenna is returned in each time remaining time slot in which the particular user station 102 is communicating. Thus, in time slots 617 through 619, antenna A returned the highest antenna score. In time slots 620 and 621, antenna D returned the highest antenna score. In time slot 622, antenna A once again returned the highest antenna score, and in time slot 623, antenna B returned the highest antenna score. In each of time slots 617 through 623, because at least one good antenna is returned, the antenna selection system selects the antenna with the highest antenna score, rather than incrementing the selected antenna.

In one aspect, the antenna selection process of FIG. 6 provides cyclic rotation of the selected antenna in each time slot 602 in which a user station 102 communicates, so as to rapidly identify the best antenna A, B, C or D in a situation where, for example, none of the antennas A, B, C or D is returning a good CRC. Rotating the antennas A, B, C and D allows the user station 102 a chance to receive a signal over each of the antennas A, B, C or D, and to compare reception quality over each of the antennas.

Figure 7:
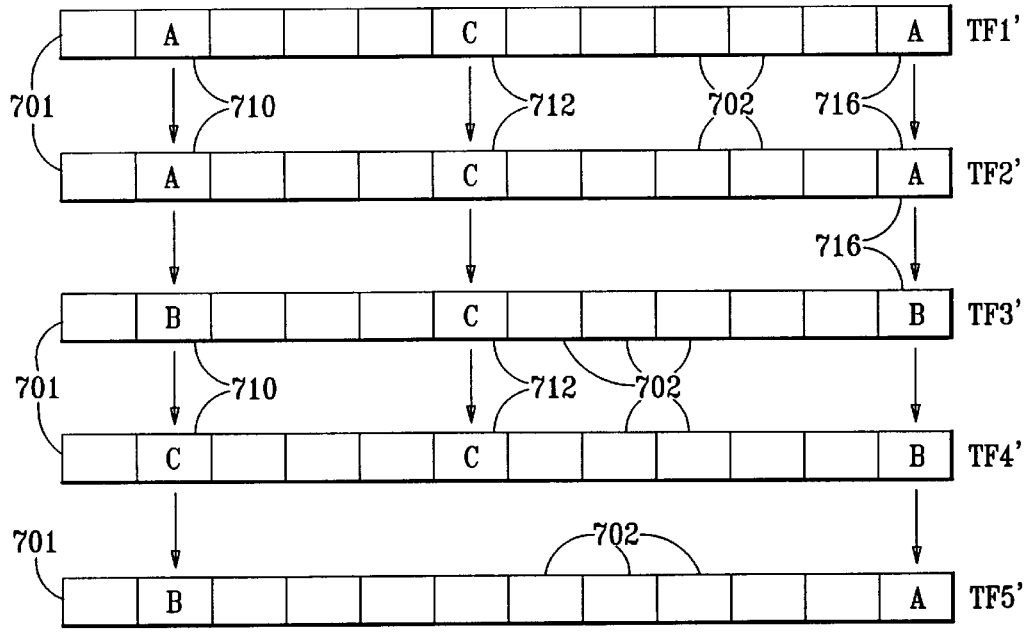
FIG. 7 is a diagram illustrating another embodiment of a rotating antenna selection scheme.

FIG. 7 shows an alternative antenna rotating scheme, wherein the selected antenna is rotated independently for each time slot utilized by the user station 102. In FIG. 7, a series of time frames 701 (or polling loops), designated as time frames TF1', TF2', TF3', ..., each comprises a sequential series of time slots 702. It is assumed, for purposes of FIG. 7, that a single user station 102 has been assigned multiple time slots 710, 712, and 716. It is further assumed that the base station 104 is using four antennas, designated as antennas A, B, C and D, which have a similar meaning as in FIG. 6.

FIG. 7 shows the operation of a particular antenna selection scheme over five time frames TF1', ..., TF5', where the user station 102 is initially communicating in three time slots 710, 712, and 716 in the first time frame TF1'. In the FIG. 7 antenna selection scheme, as in the FIG. 6 antenna selection scheme, the base station 104 may communicate with the same user station 102 using different antennas in the same time frame 701. In time slot 710, for example, antenna A is selected; in time slot 712, antenna C is selected; and in time slot 716, antenna A is again selected.

In the time frame TF2' following the first time frame TF1', the same antenna is selected in each of the time slots 710, 712 and 716, illustrating a situation where a high antenna score is yielded by the incumbent antenna in each case. In the second time frame TF2', as in the first time frame TF1', antenna A is selected in time slot 710; antenna C is selected in time slot 712; and antenna A is again selected in time slot 716.

For the next time frame TF3', FIG. 7 illustrates operation in a situation where, for example, interference occurs during time slots 712 and 716. In those time slots 712 and 716 of the third time frame TF3', none of the antennas A, B, C or D return a high score. In time slots 710 and 716, according to an alternative antenna selection process, the selected antenna is independently incremented from antenna A to antenna B in each of time slots 710 and 716 in response to none of the antennas A, B, C or D returning a high score. In contrast, the same antenna (antenna C) is selected in the third time frame TF3' as had been selected in the second time frame TF2'.

In the next time frame TF4' of FIG. 7, again none of the antennas A, B, C or D return a high score in time slot 710. In time slot 710, according to the alternative antenna selection process, the selected antenna is incremented from antenna B to antenna C in response to none of the antennas A, B, C or D returning a high score. In time slot 712, in contrast, antenna C returns the highest antenna score and is selected. In time slot 712 of the fourth time frame TF4', the user station 102 terminates communication in that time slot 712, but continues to communicate in the other time slots 710 and 716. In time slot 716, antenna B returns the highest antenna score and is selected.

In the next time frame TF5' of FIG. 7, antenna B returns the highest antenna score in time slot 710 and is selected. The user station 102 has terminated communication in time slot 712, and so the next available and enabled antenna is selected for communication in that time slot (e.g., for transmitting a general polling signal). In time slot 716 of time frame TF5', antenna A returns the highest antenna score and is selected for communication.

In one aspect, the antenna selection process of FIG. 7 provides independent rotation of the selected antenna in each time slot 702 in which a user station 102 communicates so as to rapidly identify the best antenna A, B, C or D, in a situation where, for example, none of the antennas A, B, C or D is returning a good CRC. Similar to the antenna selection scheme of FIG. 6, rotating the antennas A, B, C and D allows the user station 102 a chance to receive a signal over each of the antennas A, B, C or D, and to compare reception quality over each of the antennas. Unlike FIG. 6, the antennas are rotated independently for each time slot 702.

While the above antenna rotating schemes have been described for the situation in which a user station 102 is in active communication with a base station 104, the same principles of antenna rotation are applicable where the base station 104 selects antennas for a plurality of unused time slots over the duration of a time frame. For example, in one embodiment, in each time slot that is available for communication, a general polling message is transmitted by the base station 104 indicating the availability of the time slot. The selected antenna may be rotated each time frame independently for each available time slot (similar to FIG. 7), or, alternatively, the selected antenna may be rotated from available time slot to available time slot (similar to FIG. 6).

The number and type of antennas 403 connected to the base station 104, may depend in part on the particular nature of the system in which the base station 104 is deployed. For low density suburban or rural applications, an omnidirectional antenna is preferable to provide maximum coverage with the fewest base stations 104. For example, an omnidirectional antenna may be employed having a vertical gain of approximately 9 dB. The 9 dB of gain permits a relatively large radius cell even with an omnidirectional horizontal pattern.

A single steered phased array antenna is preferred for applications requiring a high gain, highly directional antenna. For example, to permit a single base station 104 to cover large, sparsely populated area, a steered phased array antenna with up to 20 dB of horizontal directivity is preferred. The steered phased array antenna preferably utilizes circular polarization so that high level delayed clutter signals reflected from buildings or other obstructions within the beam path do not interfere with the received signals from the user stations 102. Because reflected signals are typically reversed in polarization, they will be largely rejected by circularly polarized antennas.

In suburban and low density urban areas, directional antennas with 120-degree azimuth beamwidths and 9 dB vertical gain are preferred so that a cell can be divided into three sectors, with each sector accommodating a full load of user stations (e.g., 16 or 32 user stations 102). The use of high gain, directional antennas reduces the delay spread in severe multipath environments by rejecting multipath components arriving from outside the main beam of the antenna. Additionally, directional antennas reduce interference to user stations 102 in neighboring cells and fixed microwave facilities which may be operating nearby.

In more dense urban areas and other areas with significant multipath problems, the number of directional antennas used by a base station 104 is preferably increased to provide antenna diversity as a means of combatting signal degradations from multipath propagation. When multiple antennas are employed, circuitry for selecting an antenna for each transmission which best matches the communication channel between the base station 104 and user station 102 is preferred.

In one embodiment, the user station 102 embodied as a handset employs a halfwave dipole antenna which is linearly polarized and provides a gain of 2 dB with an omnidirectional pattern perpendicular to the antenna axis. At a nominal frequency of 1900 MHz, a half wavelength is approximately 3 inches, which is fitted within a handset.

In a presently preferred embodiment, two sub-base stations, each having full base station capability, are "stacked" or collocated at a single location to collectively form a single base station 104 with increased user capacity. Each of the two sub-base stations is assigned a distinguishable frequency and/or code combination, and each of the two sub-base stations preferably uses the same TDMA structure. Each sub-base station preferably employs four linear dipole antennas, so that a total of eight antennas are located at the same site.

A user station 102 preferably initiates communication with a base station 104 according to techniques described in, for example, U.S. Pat. No. 5,455,822, hereby incorporated by reference as if set forth fully herein.

A preferred technique for initiating and maintaining communication is as follows. During at least one or more of the base transmit frames 225 of a time slot 202, the base station 104 transmits a base station transmission comprising a general poll signal, preferably indicating which, if any, time slots 202 are currently unassigned—i.e. available for communication with a user station 102. The particular user station 102 seeking to establish a communication link acquires a time slot 202 for communication with the base station 104 by monitoring the loop for the base station general poll signal. Upon receiving the general poll, the user station 102, depending upon the information contained in the general poll signal, transmits during the user station transmit frame 210 of an available time slot 202 a user station transmission comprising a general poll response signal. The general poll response signal indicates a desire to establish communication with the base station 104 and identifies the particular user station 102 by including, for example, a unique ID number corresponding to that particular user station. The general poll response signal also provides information for sounding the available communication links between the base station 104 and the user station 102.

The general poll response is preferably received by the base station 104 during the user station transmit frame 210 of the time slot 202. The base station antennas each receive the user station transmission and preferably provide quality metrics information to a diversity controller in the base station during the user station transmit frame 210. Each base station radio preferably also stores the data (including the quality metrics information) in a data buffer. The base station 104 preferably processes the quality metrics information during the guard interval 220 and chooses the radio which exhibited the best channel characteristics.

Based upon the channel characterization information, the base station selects an antenna and transmit power level for transmitting the base station transmission during the base transmit frame 225 in a time slot 202. In response to the general poll response signal, the base station 104 preferably transmits a specific poll signal including identification information corresponding to the particular user station desiring to acquire the particular time slot. Because the base station 104 preferably transmits on the antenna having the best received signal quality as determined from the information contained in the user station transmission, the user station 102 benefits even when it does not have antenna diversity capabilities itself.

A system employing a user-first transmission protocol (such as described above with respect to FIG. 2) preferably includes a base station 104 with a processor having sufficient speed and power to perform all required computations and comparisons of channel sounding information during the time available between the end of a user station frame 210 and the start of the base station transmit frame 225—i.e., no longer than the guard interval 220. In a preferred embodiment, the guard interval 220 is less than 75 $\mu$sec, and may be, e.g., about 10.4 $\mu$sec. To reduce the base station processor requirements, a user-first protocol may operate with a loop having "virtual time slots," as described with respect to U.S. patent application Ser. No. 08/668,483, previously incorporated herein by reference as if fully set forth herein.

A preferred embodiment also includes circuitry and/or logic or software for carrying out closed loop power control of mobile station transmissions. In a preferred embodiment, the base station transmission includes a power adjustment command, preferably a single bit, and preferably contained within the header of each message sent to the user station 102. In this embodiment, the user station 102 temporarily stores the power adjustment bit until after receipt of the next power adjustment bit. The user station 102, before each transmission, adjusts its transmission power based on the state of the current received power adjustment bit and the value of the previous stored power adjustment bit.

In one preferred embodiment, the user stations 102 utilize FDMA techniques. In this embodiment each user station 102 comprises a frequency synthesizer which can be programmed to receive and transmit on any of a plurality of frequency channels defined within an assigned frequency band. Where FDMA (or FDD) techniques are used, it may occur that a source of interference with respect to one frequency (e.g., the forward link) may not necessarily be a source of interference with respect to another frequency (e.g., the reverse link). Different antennas may therefore be selected for transmitting and receiving, with the base station relying more heavily on the handset quality reception indication in the selection of the transmitting antenna.

In one alternative embodiment, combining diversity techniques are used such that more than one antenna can be selected for reception in a given time slot. In this embodiment, additional memory overhead may be required to keep track of the additional antennas that are active in each time slot for a particular user station 102. The same quality metrics can be measured and analyzed, and multiple antennas selected whenever, for example, more than one antenna has an antenna score falling within a predefined range or within percentage of the highest antenna score. Although multiple antennas may be selected for reception, in general only one antenna will still be used for transmission.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A method comprising:
   receiving, at each of a plurality of radios, a signal transmitting over a wireless communication link;
   deriving a plurality of quality metrics for each of said radios;
   assigning each of said plurality of quality metrics a numerical value;
   deriving a numerical score for each radio based on said numerical values; and
   selecting at least one radio at least partially based on said numerical scores.

2. The method of claim 1 wherein said signal is a spread spectrum signal.

3. The method of claim 1 wherein said quality metrics comprise a preamble magnitude correlation score and a cyclic redundancy check pass/fail indicator.

4. The method of claim 3 wherein said quality metrics further comprise a received signal strength indication difference score, a received signal strength indication average score, and a handset reception quality indicator.

5. The method of claim 1, wherein a previously activated antenna is selected if said previously activated antenna is one of two or more antennas with said high score.

6. The method of claim 1 wherein said selected at least one radio has a highest numerical score.

7. A method comprising:
   receiving, at each of a plurality of radios, a signal transmitting over a wireless communication link;
   deriving a plurality of quality metrics for each of said radios, wherein said quality metrics comprise a plurality of components each assigned a numerical value and weighted in relative importance such that a maximum numerical value corresponding to a first component exceeds a maximum sum of the numerical values corresponding to the other components; and selecting at least one radio at least partially based on said plurality of quality metrics.

8. An apparatus comprising:

a plurality of antennas;

a plurality of radios, one of said radios connected to each antenna, and each radio either being enabled or not enabled;

a diversity controller; and a plurality of radio interfaces, each connected on one of said radios and to said diversity controller;

wherein said diversity controller comprises an antenna selector connected to said radio interfaces, said antenna selector configured for receiving a plurality of quality metrics sent from each enabled radio to said diversity controller when receiving a signal over a wireless communication channel, assigning each of said plurality of quality metrics a numerical value, deriving a numerical reception quality score for each antenna based on said numerical values, and selecting at least one of said radios for reception at least partially based upon said numerical reception quality scores.

9. The apparatus of claim 8 wherein said antenna selector comprises a state machine which cycles through each of said antennas until an antenna is chosen or until all of said antennas have been cycled through.

10. The apparatus of claim 9 wherein said quality metrics comprise at least one received signal strength score and a handset reception quality indicator.

11. The apparatus of claim 9 wherein each of said radio interfaces comprises a serial-to-parallel interface for converting serial data received from the radio to which the radio interface is connected to parallel data for transfer to said diversity controller.

12. The apparatus of claim 8 wherein said quality metrics comprise a preamble magnitude correlation score and a cyclic redundancy check pass/fail indicator.

13. The apparatus of claim 8 wherein said selected at least one of said radios has a highest numerical reception quality score.

14. In a time division multiple access communication system having time frames divided into time slots, a method comprising:

(a) receiving, at each of a plurality of base station radios, a signal transmitted by a user station over a wireless communication link;

(b) deriving a plurality of quality metrics for each of said base station radios based on reception characteristics of said signal;

(c) assigning each of said plurality of quality metrics a numerical value;

(d) assigning a numerical score to each of said base station radios based on said numerical values;

(e) selecting for communication at least one of said base station radios at least partially based on said numerical scores; and (f) repeating (a) through (e) for another time slot in which said user station communicates with said base station.

15. The method of claim 14 further comprising the step of repeating steps (a) through (d) for each time slot in which said user station communicates with said base station.

16. The method of claim 14 wherein said signal is a spread spectrum signal.

17. The method of claim 14 wherein said quality metrics comprise a preamble magnitude correlation score and a cyclic redundancy check pass/fail indicator.

18. The method of claim 14 wherein said quality metrics comprise a received signal strength indication difference score, a received signal strength indication average score, and a handset reception quality indicator.

19. In the time division multiple access communication system of claim 14 wherein said selected at least one base station radio has a highest numerical score.

20. In a time division multiple access communication system having time frames divided into time slots, a method comprising:

(a) receiving, at each of a plurality of base station radios, a signal transmitted by a user station over a wireless communication link;

(b) deriving a plurality of quality metrics for each of said base station radios based on reception characteristics of said signal, wherein said quality metrics comprise a plurality of components each assigned a numerical value and weighted in relative importance such that a maximum numerical value corresponding to a first component exceeds a maximum sum of the numerical values corresponding to the other components;

(c) selecting for communication at least one of said base station radios at least partially based on said plurality of quality metrics; and (d) repeating (a) through (c) for another time slot in which said user station communicates with said base station.

21. A method for antenna selection, comprising:

transmitting a spread spectrum signal from a transmitter to a receiver;

receiving said spread spectrum signal at a plurality of antennas connected to said receiver;

correlating said spread spectrum signal separately for each of said antennas;

deriving a plurality of quality metrics for each of said plurality of antennas, said plurality of quality metrics including a correlation score;

assigning a numerical score to each of said antennas based on said plurality of quality metrics; and selecting, from among said antennas, an antenna for reception at least partially based on said numerical scores.

22. The method of claim 21 wherein said spread spectrum signal comprises a link quality indicator, and wherein said step of selecting an antenna for reception is further based on said link quality indicator.

23. A method comprising:

receiving, at each of a plurality of radios, a signal transmitting over a wireless communication link, wherein said signal comprises a handset reception quality indicator of a link between a previously activated radio and a handset;

deriving a plurality of quality metrics for each of said radios, wherein said plurality of quality metrics for said previously activated radio includes said handset reception quality indicator and a cyclic redundancy check pass/fail indicator; and selecting at least one radio at least partially based on said plurality of quality metrics, wherein said handset reception quality indicator is only considered if said cyclic redundancy check pass/fail indicator indicates a pass.

* * * * *